(12) United States Patent
Wakazono et al.

(10) Patent No.: US 7,630,145 B2
(45) Date of Patent: Dec. 8, 2009

(54) ZOOM LENS AND IMAGE PICKUP APPARATUS

(75) Inventors: Tsuyoshi Wakazono, Utsunomiya (JP); Tomoyuki Nakamura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/187,338

(22) Filed: Aug. 6, 2008

(65) Prior Publication Data
US 2009/0046375 A1    Feb. 19, 2009

(30) Foreign Application Priority Data
Aug. 7, 2007    (JP)    ............... 2007-205097

(51) Int. Cl.
*G02B 15/14* (2006.01)
(52) U.S. Cl. ............... 359/688; 359/686
(58) Field of Classification Search ............... 359/686, 359/688, 734, 684
See application file for complete search history.

(56) References Cited

U.S. PATENT DOCUMENTS

| | | | |
|---|---|---|---|
| 5,745,300 A | 4/1998 | Usui et al. | |
| 5,986,820 A | 11/1999 | Usui et al. | |
| 6,124,982 A | 9/2000 | Usui | |
| 6,545,818 B2 | 4/2003 | Usui et al. | |
| 2003/0007256 A1 | 1/2003 | Usui et al. | |
| 2008/0239504 A1* | 10/2008 | Tsutsumi | ............... 359/676 |

FOREIGN PATENT DOCUMENTS

| | | |
|---|---|---|
| JP | 6-242378 | 9/1994 |
| JP | 11-030749 | 2/1999 |
| JP | 2001-021804 | 1/2001 |

* cited by examiner

*Primary Examiner*—Timothy J Thompson
(74) *Attorney, Agent, or Firm*—Canon USA Inc IP Div

(57) ABSTRACT

A zoom lens has, in order from the object side to the image side, a first lens unit that does not move during zooming and has positive refractive power, a second lens unit that performs zooming and has negative refractive power, a third lens unit that corrects image plane variation caused by zooming and has negative refractive power, and a fourth lens unit that does not move during zooming and has positive refractive power. The first lens unit has, in order from the object side to the image side, a first lens subunit that does not move during focusing and has negative refractive power, a second lens subunit that is configured to move along the optical axis during focusing and has positive refractive power, a third lens subunit that does not move during focusing and has positive refractive power. The second lens subunit has at least one aspherical lens surface AS12.

6 Claims, 36 Drawing Sheets

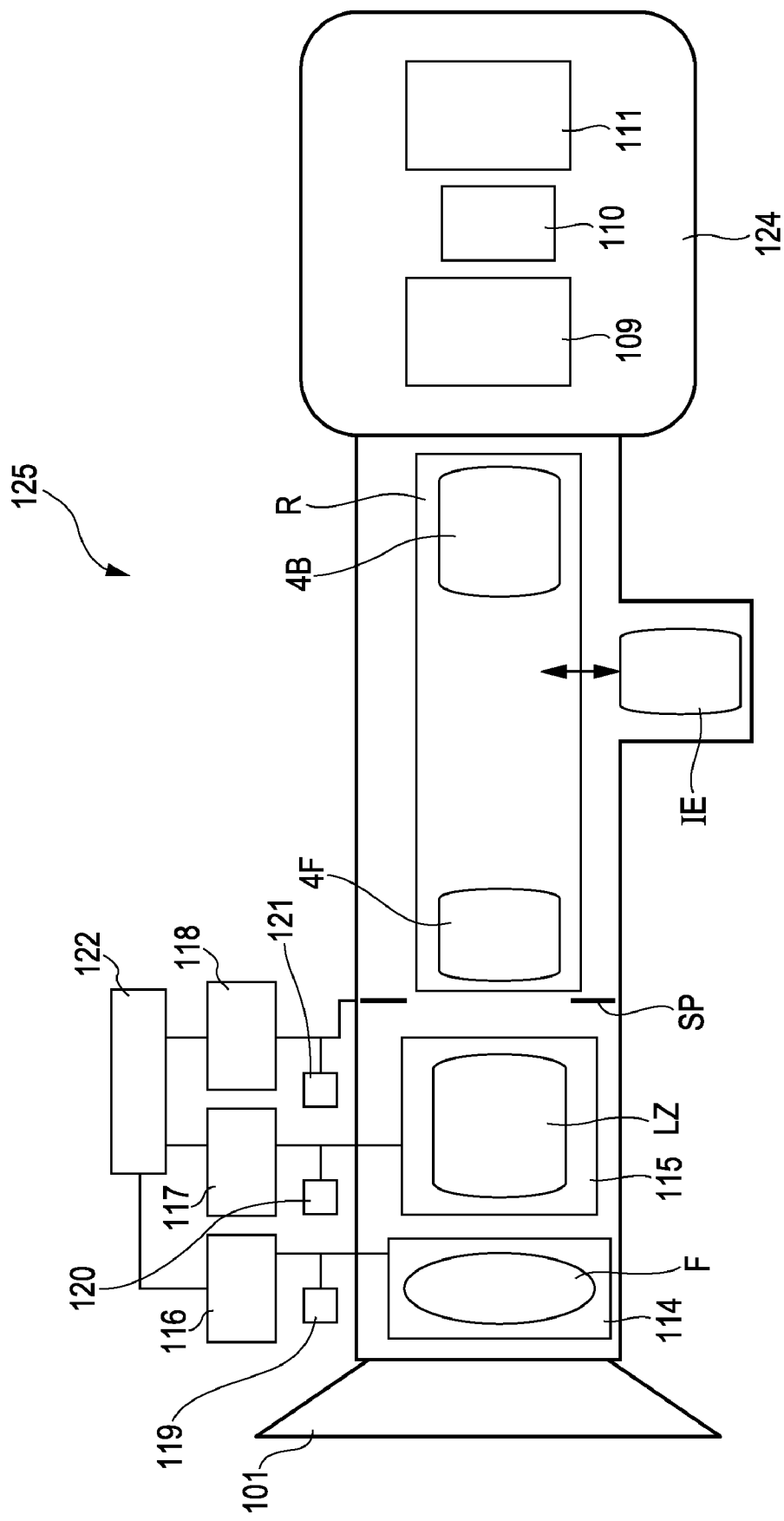

ZOOM LENS AND IMAGE PICKUP APPARATUS

BACKGROUND OF THE INVENTION

1. Field of the Invention

The present invention relates to zoom lenses and image pickup apparatuses having the zoom lenses. The zoom lenses are, for example, suitable for use in broadcast television cameras, video cameras, digital still cameras, or silver-halide film cameras.

2. Description of the Related Art

In recent years, there has been a demand for large diameter, wide field angle, high zoom ratio, and high optical performance zoom lenses for use in image pickup apparatuses, such as television cameras, silver-halide film cameras, digital cameras, and video cameras.

An example of large diameter, wide field angle, and high-zoom-ratio zoom lens is a positive-lead four-unit zoom lens, which consists of four lens units with the lens unit closest to the object side having positive refractive power.

A four-unit zoom lens of this type consists of, in order from the object side to the image side, a first lens unit that includes a focusing lens unit and has positive refractive power; a second lens unit that performs zooming and has negative refractive power; a third lens unit that corrects image plane variation caused by zooming; and a fourth lens unit that forms an image and has positive refractive power.

U.S. Pat. Nos. 5,745,300, 6,545,818, and 6,124,982 disclose four-unit zoom lenses using a three-unit inner-focus system and having a zoom ratio in the range from about 8× to 17.6×, a photographing field angle (field angle) at the wide-angle end in the range from about 65° to 95°, and a minimum shooting distance from the lens surface of about 0.3 m.

Herein, the three-unit inner-focus system refers to a focusing system in which the first lens unit having positive refractive power consists of, in order from the object side to the image side, a first lens subunit having negative refractive power, a second lens subunit having positive refractive power, and a third lens subunit having positive refractive power, and in which the second lens subunit is moved toward the image plane when the zoom lens shifts focus from an object at infinity to an object at a very short distance.

U.S. Pat. No. 5,745,300 discloses a four-unit zoom lens in which the first lens subunit has an aspherical surface. This zoom lens effectively corrects variation of the spherical aberration that occurs when the zoom lens is focused on an object at a very short distance while being set at the telephoto end, and negative distortion or curvature of field that occurs when the zoom lens is set at the wide-angle end.

U.S. Pat. No. 6,545,818 discloses a four-unit zoom lens in which the second lens subunit and the third lens subunit each have an aspherical surface. This zoom lens effectively corrects the negative distortion that occurs when the zoom lens is set at the wide-angle end, and the positive distortion that occurs when the zoom lens is set near a zooming position of zoom ratio $Z^{1/4}$.

U.S. Pat. No. 6,124,982 discloses a four-unit zoom lens in which the first lens subunit has an aspherical surface. This zoom lens effectively corrects the negative distortion that occurs when the zoom lens is set at the wide-angle end.

It is relatively easy to increase the diameter ratio and the zoom ratio of a positive-lead four-unit zoom lens. However, as the zoom ratio increases, variation of aberrations also increases. This makes it difficult to provide a zoom lens having high optical performance over the entire zoom range and object distance range.

The provision of an aspherical surface in the first lens unit of a four-unit zoom lens makes it easy to correct aberrations and produce a zoom lens having high optical performance over the entire object distance range.

However, even if the first lens unit has an aspherical surface, unless the position and shape of the aspherical surface as well as the configuration of the first lens unit having the aspherical surface are appropriately set, effective correction of aberrations to produce a zoom lens having high optical performance over the entire object distance range is difficult.

When a four-unit zoom lens uses a three-unit inner-focus system, appropriate setting of the configuration of the second lens subunit is an important factor to reduce variation of aberrations caused by focusing and increase the field angle and the zoom ratio.

SUMMARY OF THE INVENTION

A zoom lens of the present invention includes, in order from an object side to an image side, a first lens unit that does not move for zooming and has positive refractive power, a second lens unit that is configured to move during zooming and has negative refractive power, a third lens unit that is configured to move during zooming and has negative refractive power, and a fourth lens unit that does not move for zooming and has positive refractive power. The first lens unit has, in order from the object side to the image side, a first lens subunit that does not move during focusing and has negative refractive power, a second lens subunit that is configured to move along the optical axis during focusing and has positive refractive power, and a third lens subunit that does not move during focusing and has positive refractive power. The second lens subunit satisfies conditions $0.95 < hz/htinf < 1.50$, $0.83 < hw/hz < 1.16$, and $htmod/htinf > 1.0$ and has at least one aspherical lens surface AS12, where, in lens surfaces of the second lens subunit, htinf is the maximum height of incidence of axial rays when the zoom lens is set at a telephoto end of the zooming range and focused on an object at infinity, htmod is the maximum height of incidence of the axial rays when the zoom lens is set at the telephoto end of the zooming range and focused on an object at a very short distance, hw is the maximum height of incidence of off-axis rays when the zoom lens is set at a wide-angle end and focused on an object at infinity, and hz is the maximum height of incidence of the off-axis rays when the zoom lens is set at a zoom ratio of $Z^{1/4}$ and focused on an object at infinity, where Z is the maximum zoom ratio. If the aspherical lens surface AS12 has positive refractive power, the aspherical lens surface AS12 is shaped such that the positive refractive power decreases from the center toward the periphery thereof. If the aspherical lens surface AS12 has negative refractive power, the aspherical lens surface AS12 is shaped such that the negative refractive power increases from the center toward the periphery thereof.

Further features of the present invention will become apparent from the following description of exemplary embodiments with reference to the attached drawings.

BRIEF DESCRIPTION OF THE DRAWINGS

FIG. 37 is a schematic view of a relevant part of an image pickup apparatus of the present invention.

DESCRIPTION OF THE EMBODIMENTS

The present invention provides a high-zoom-ratio zoom lens that effectively corrects aberrations and has high optical performance over the entire zoom range and object distance range, and an image pickup apparatus having the zoom lens.

A zoom lens and an image pickup apparatus having the zoom lens according to the embodiments of the present invention will now be described.

The zoom lens of the present invention has, in order from the object side to the image side, a first lens unit that does not move during zooming and has positive refractive power, a second lens unit that performs zooming and has negative refractive power, a third lens unit that corrects image plane variation caused by zooming and has negative refractive power, and a fourth lens unit that does not move during zooming and has positive refractive power.

When the zoom lens zooms from the wide-angle end (short focal length end) to the telephoto end (long focal length end), the second lens unit V moves monotonically (monotonously) toward the image side along the optical axis, and a third lens unit C moves toward the object side along the optical axis.

The first lens unit has, in order from the object side to the image side, a first lens subunit that does not move during focusing and has negative refractive power, a second lens subunit that moves along the optical axis during focusing and has positive refractive power, and a third lens subunit that does not move during focusing and has positive refractive power.

Figure 1:
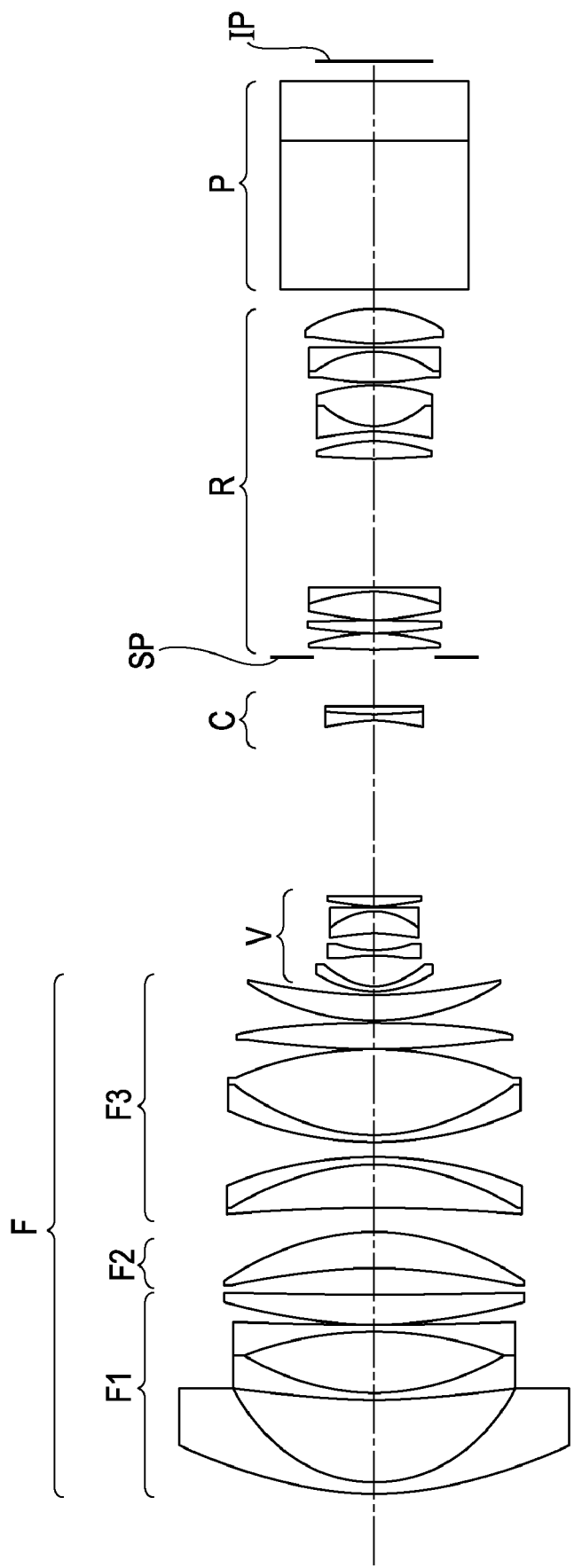
FIG. 1 is a sectional view of a zoom lens according to a first embodiment of the present invention, when set at the wide-angle end of its zooming range.

FIG. 1 is a sectional view of a zoom lens according to a first embodiment of the present invention, when set at the wide-angle end of its zooming range.

Figure 2:
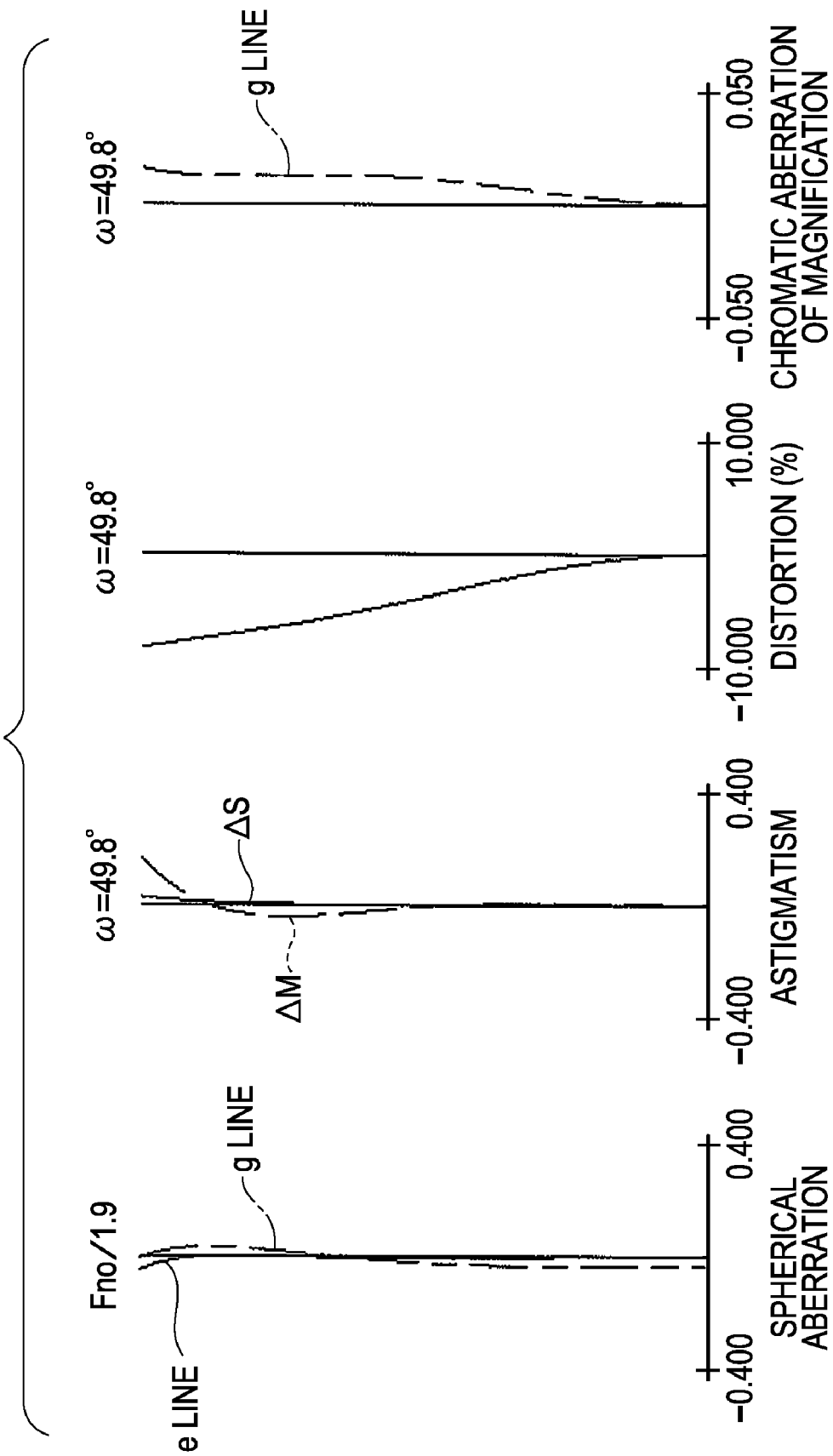
FIG. 2 shows aberration diagrams of the zoom lens according to the first embodiment of the present invention, with a focal length f of 4.45 and when focused on an object at infinity. Note that the units of focal length quoted throughout the description are in mm unless stated otherwise.
Figure 3:
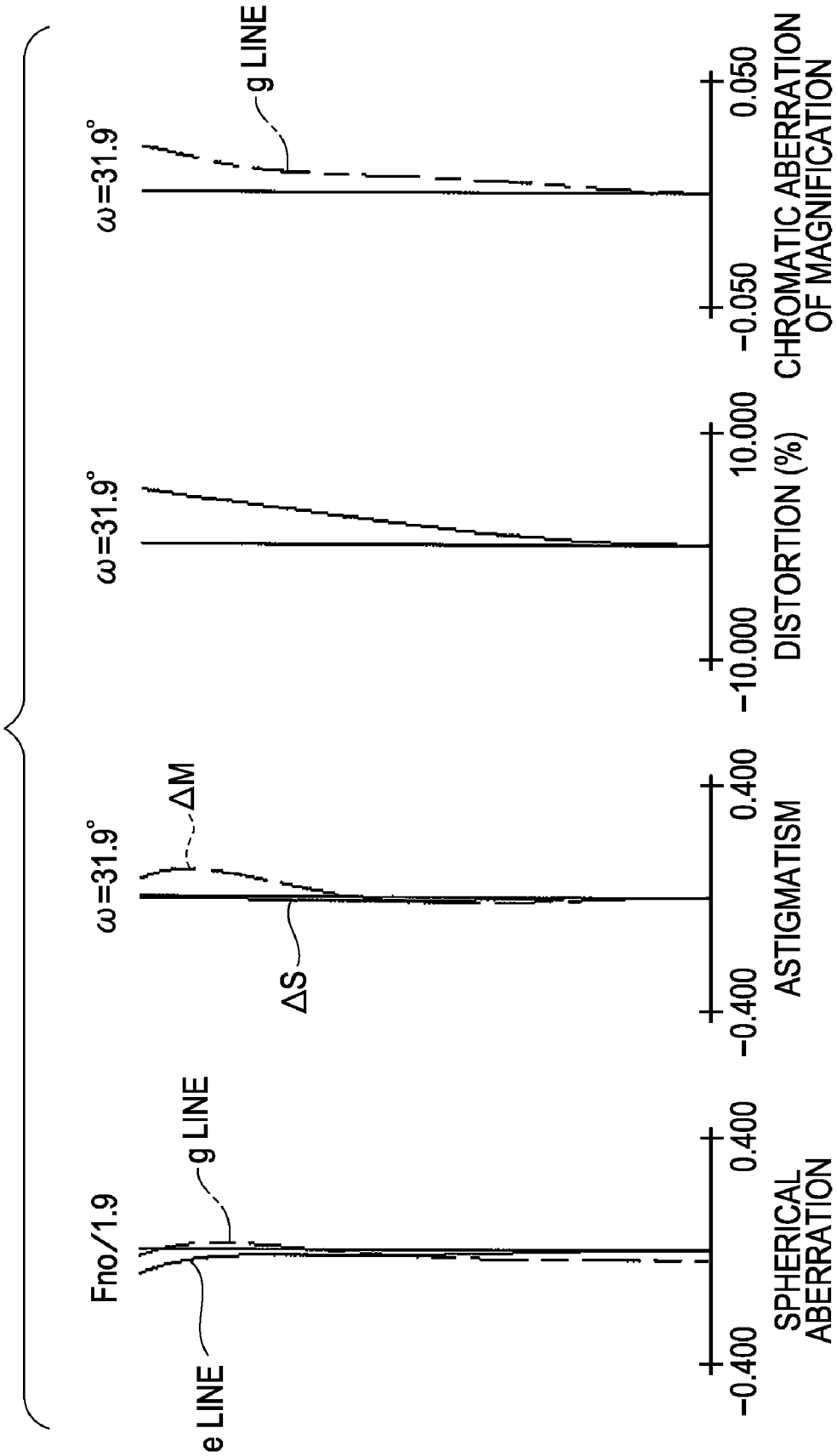
FIG. 3 shows aberration diagrams of the zoom lens according to the first embodiment of the present invention, with a focal length f of 8.83 and when focused on an object at infinity.
Figure 4:
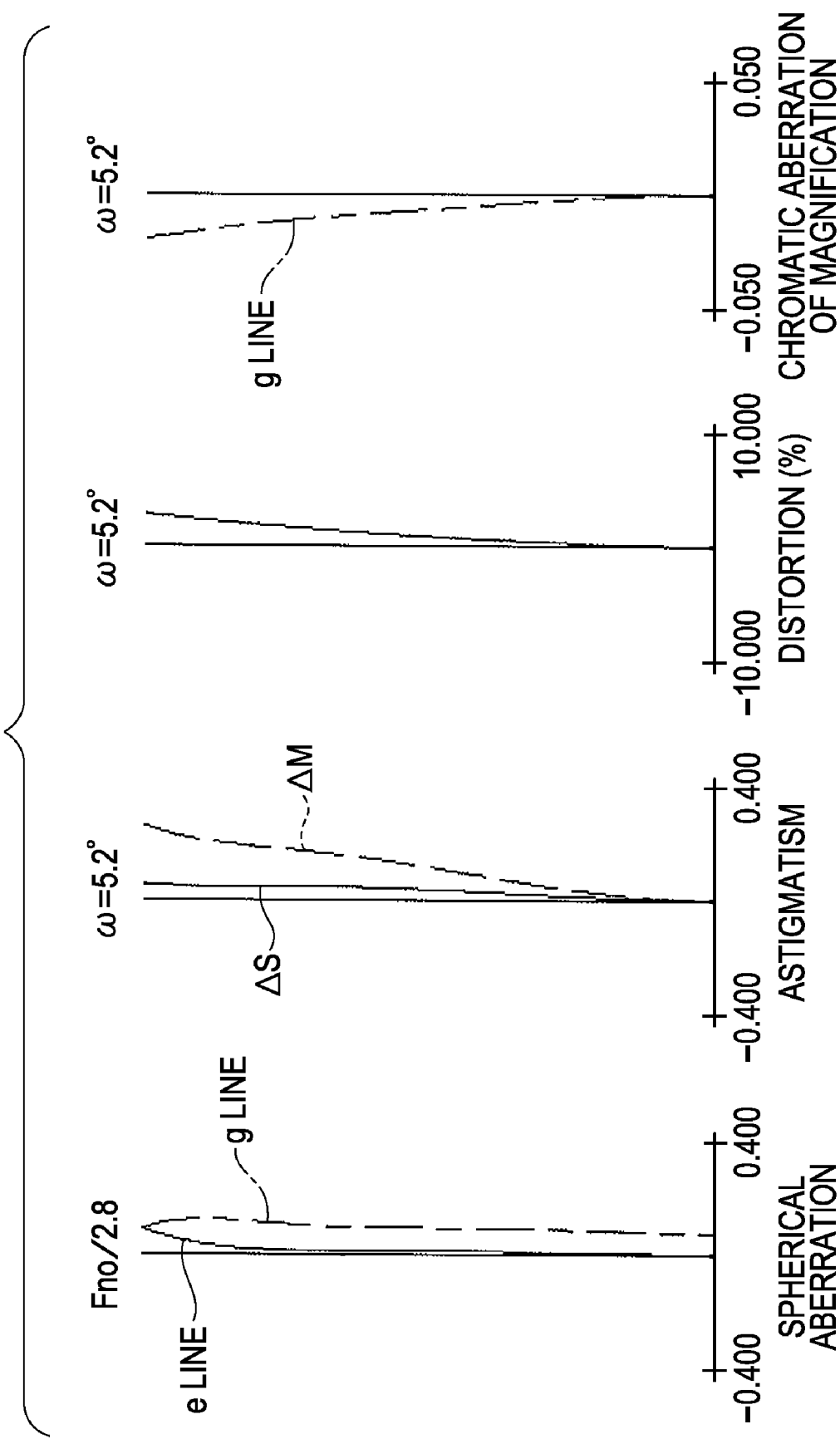
FIG. 4 shows aberration diagrams of the zoom lens according to the first embodiment of the present invention, with a focal length f of 60.45 and when focused on an object at infinity.

FIGS. 2, 3, and 4 each show aberration diagrams of the zoom lens according to the first embodiment, with focal lengths f of 4.45, 8.83, and 60.45, respectively, and when focused on an object at infinity.

Figure 5:
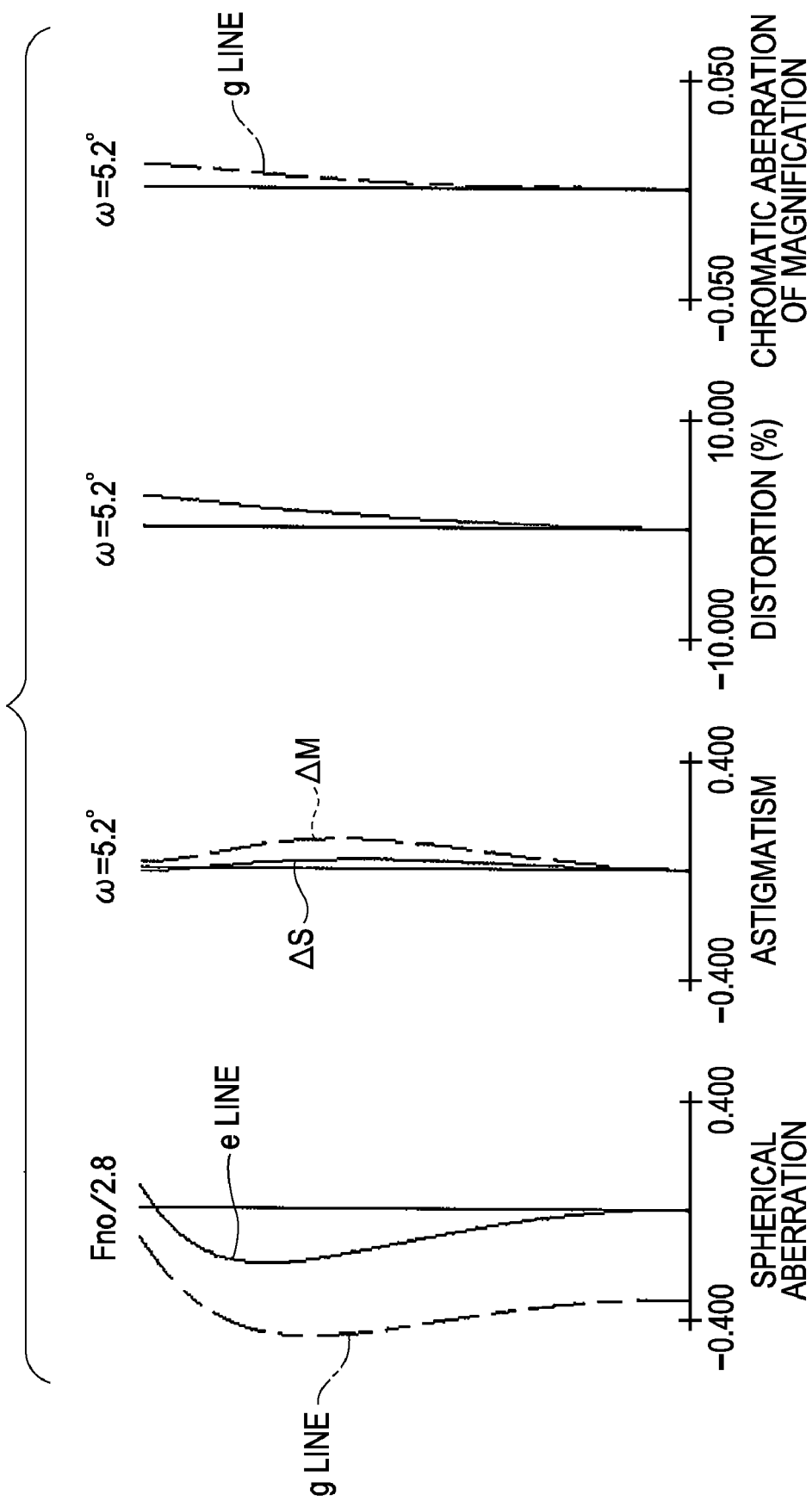
FIG. 5 shows aberration diagrams of the zoom lens according to the first embodiment of the present invention, with a focal length f of 60.45 and when focused on an object at a very short distance.

FIG. 5 shows aberration diagrams of the zoom lens according to the first embodiment of the present invention, with a focal length f of 60.45 and when focused on an object at a very short distance.

Figure 6:
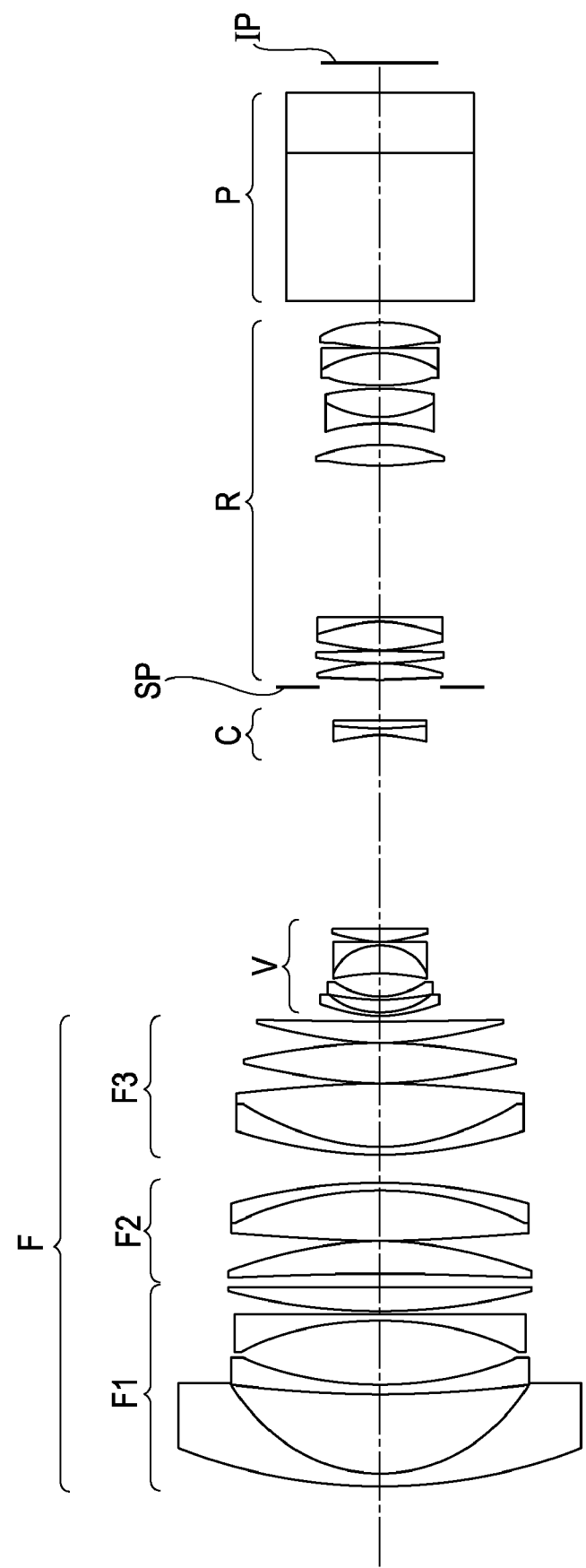
FIG. 6 is a sectional view of a zoom lens according to a second embodiment of the present invention, when set at the wide-angle end of its zooming range.

FIG. 6 is a sectional view of a zoom lens according to a second embodiment of the present invention, when set at the wide-angle end.

Figure 7:
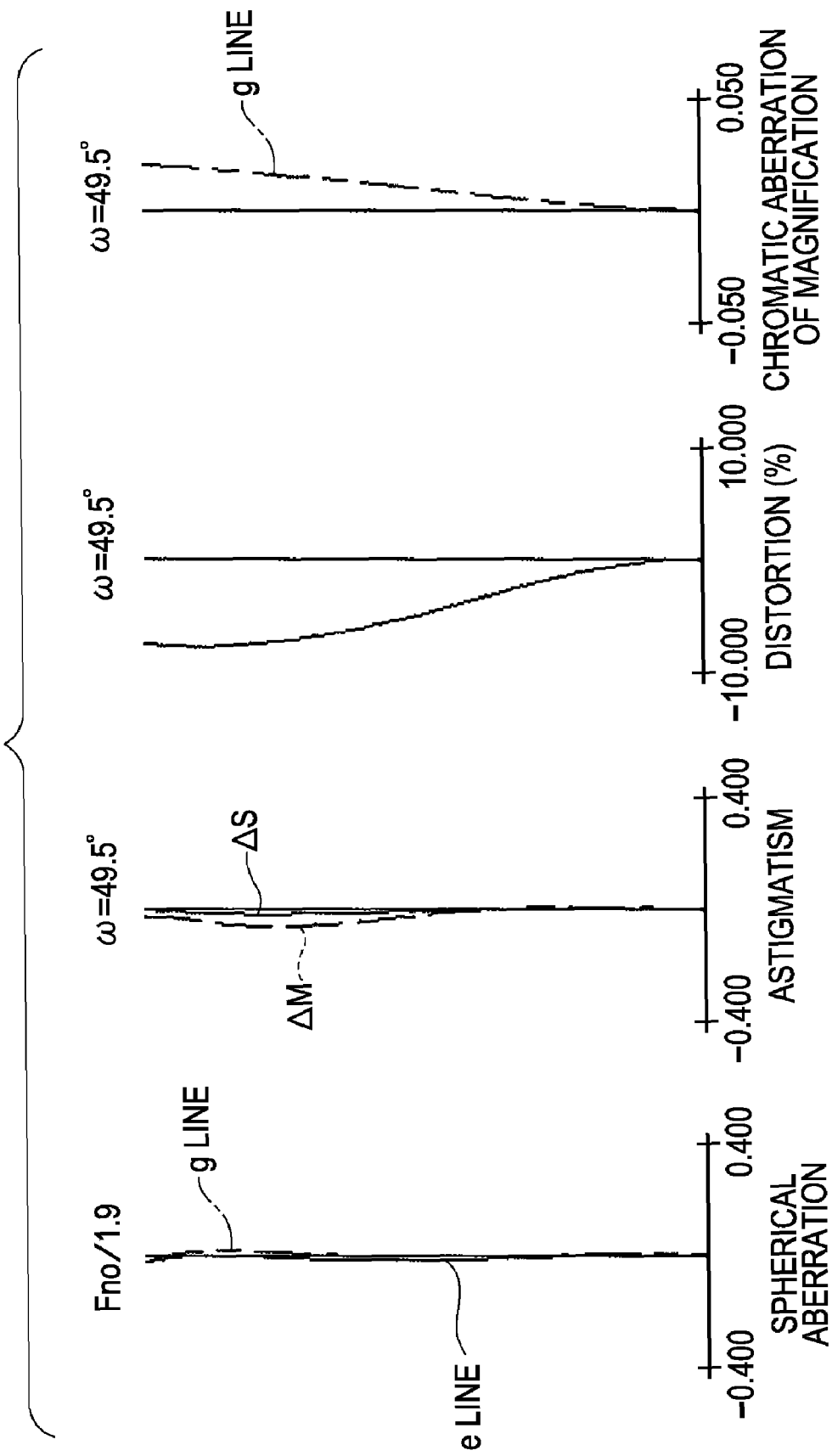
FIG. 7 shows aberration diagrams of the zoom lens according to the second embodiment of the present invention, with a focal length f of 4.70 and when focused on an object at infinity.
Figure 8:
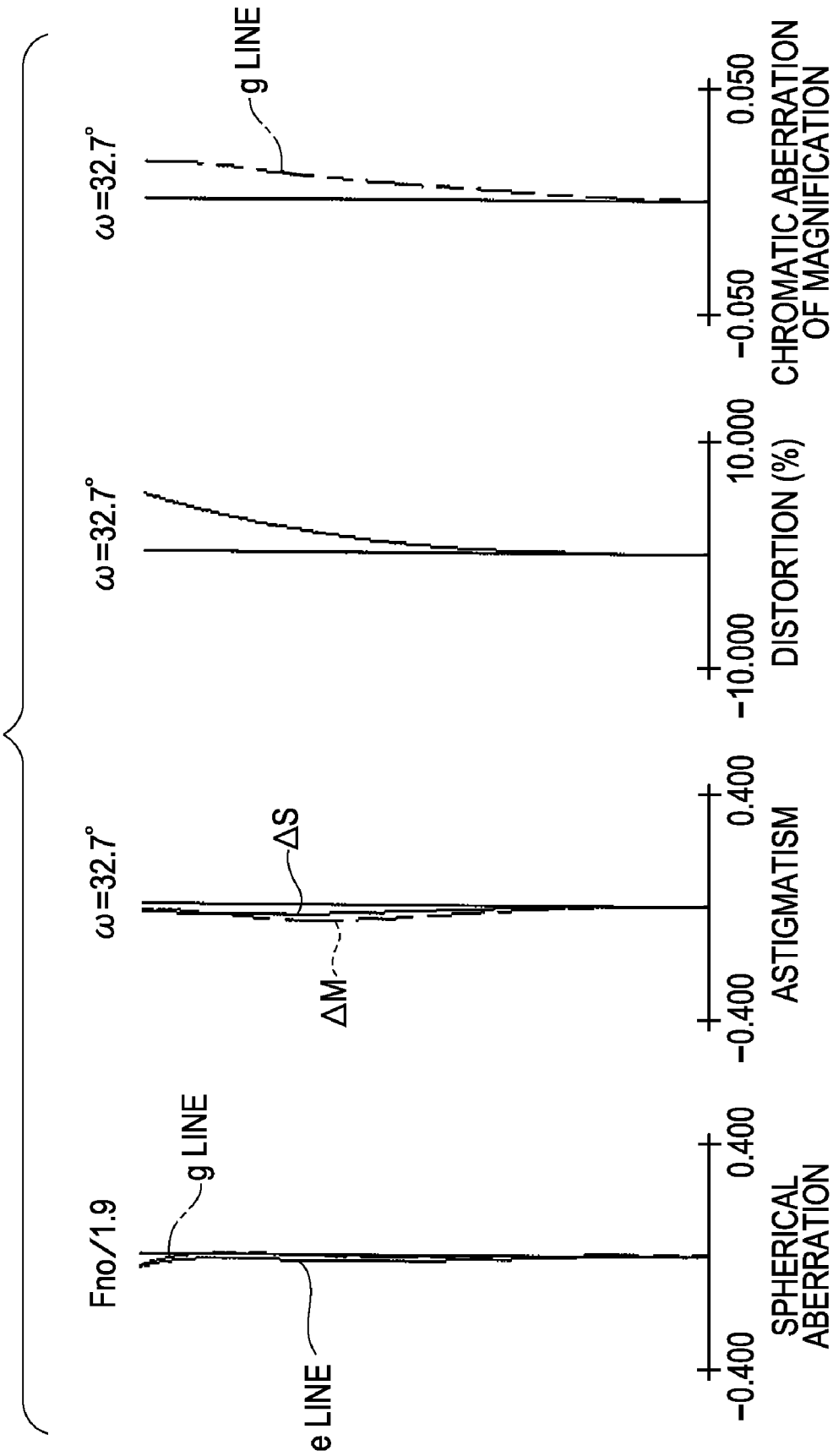
FIG. 8 shows aberration diagrams of the zoom lens according to the second embodiment of the present invention, with a focal length f of 8.56 and when focused on an object at infinity.
Figure 9:
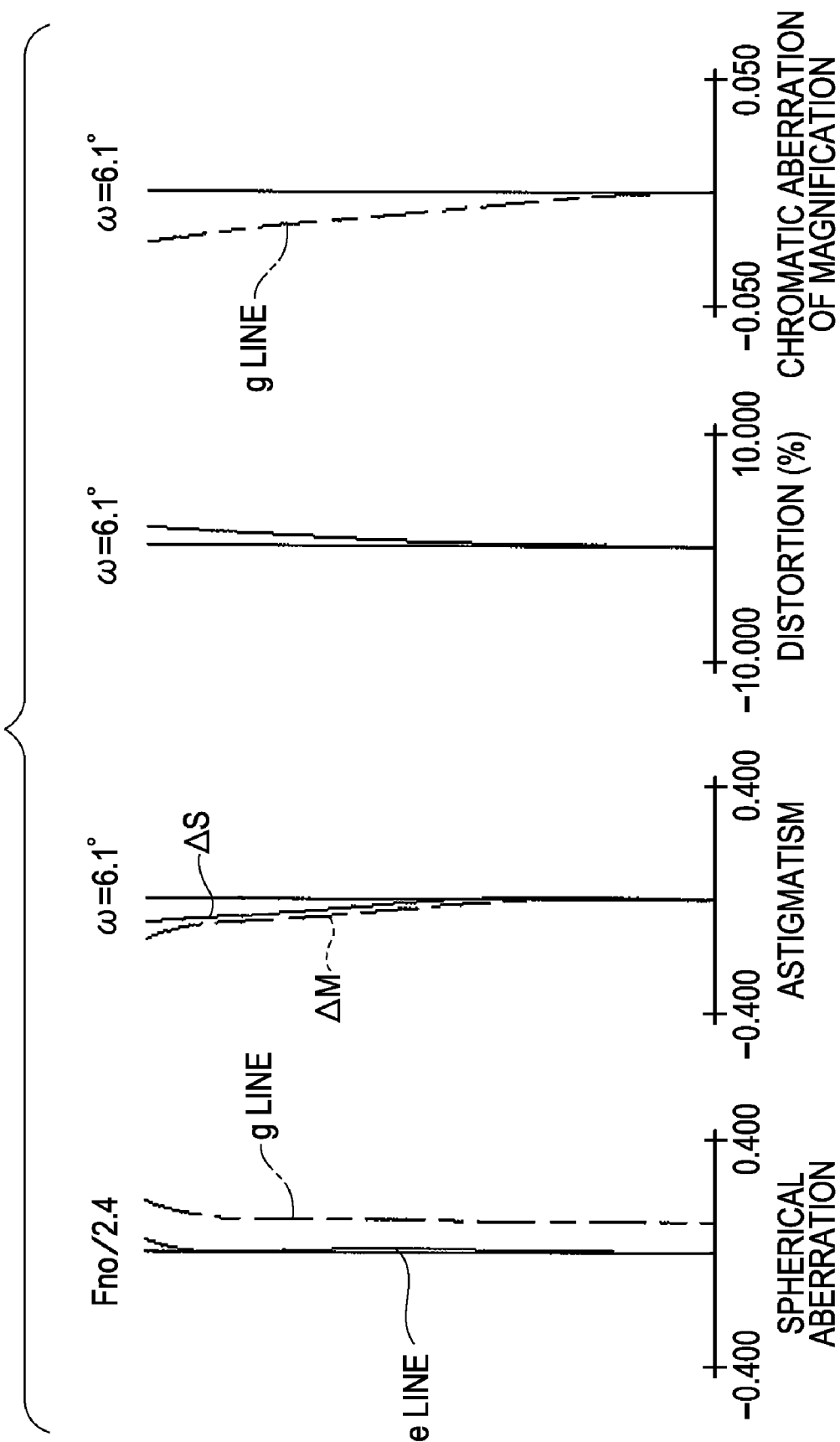
FIG. 9 shows aberration diagrams of the zoom lens according to the second embodiment of the present invention, with a focal length f of 51.70 and when focused on an object at infinity.

FIGS. 7, 8, and 9 each show aberration diagrams of the zoom lens according to the second embodiment of the present invention, with focal lengths f of 4.70, 8.56, and 51.70, respectively, and when focused on an object at infinity.

Figure 10:
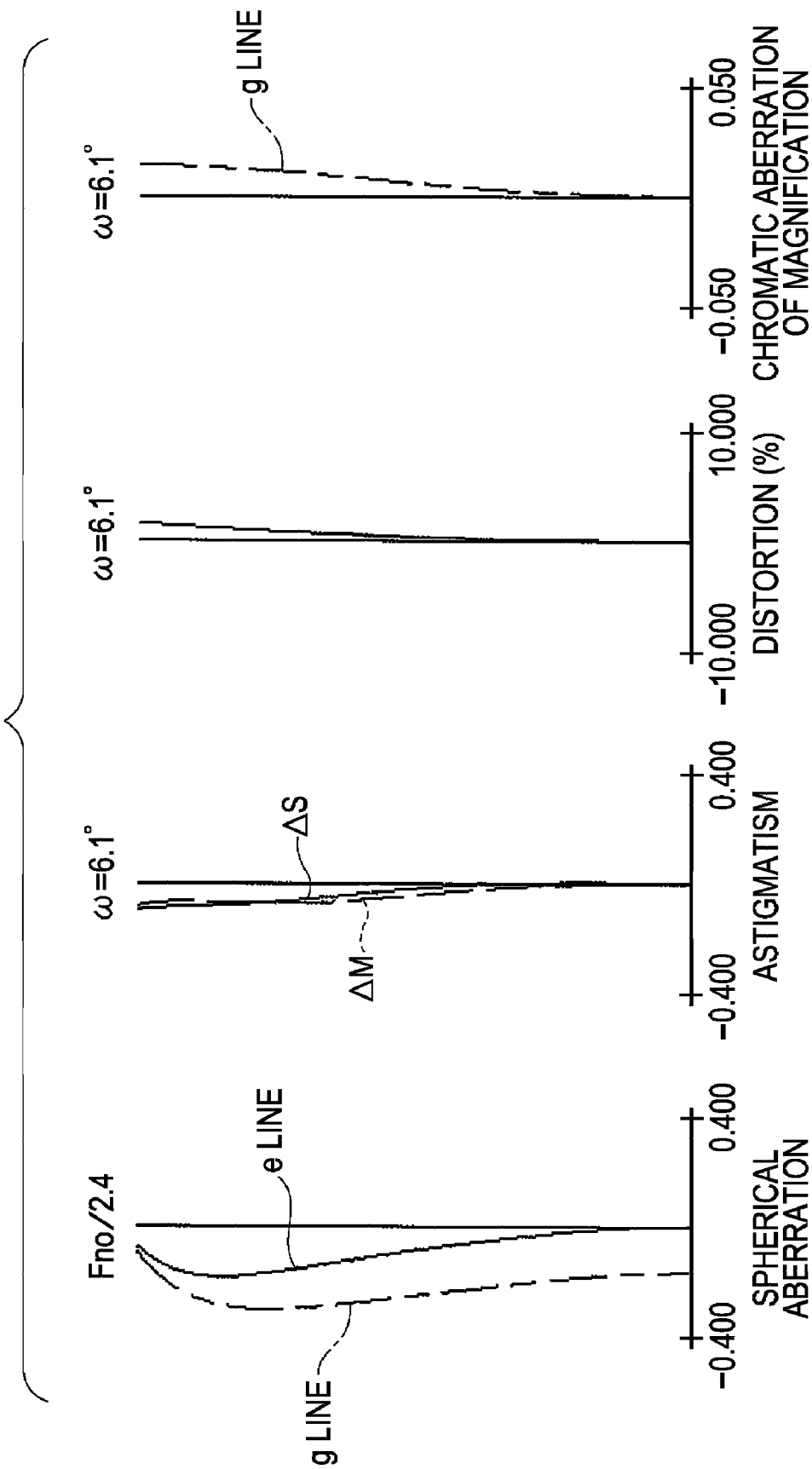
FIG. 10 shows aberration diagrams of the zoom lens according to the second embodiment of the present invention, with a focal length f of 51.70 and when focused on an object at a very short distance.

FIG. 10 shows aberration diagrams of the zoom lens according to the second embodiment of the present invention, with a focal length f of 51.70 and when focused on an object at a very short distance.

Figure 11:
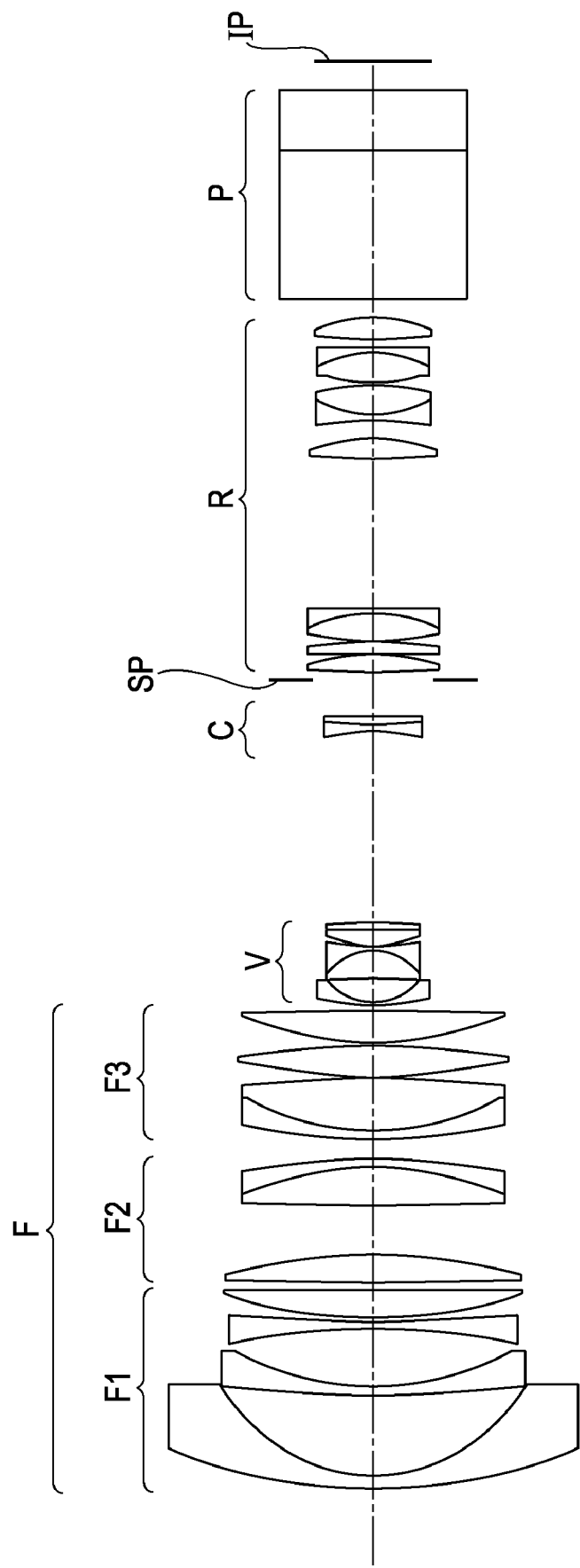
FIG. 11 is a sectional view of a zoom lens according to a third embodiment of the present invention, when set at the wide-angle end of its zooming range.

FIG. 11 is a sectional view of a zoom lens according to a third embodiment of the present invention, when set at the wide-angle end.

Figure 12:
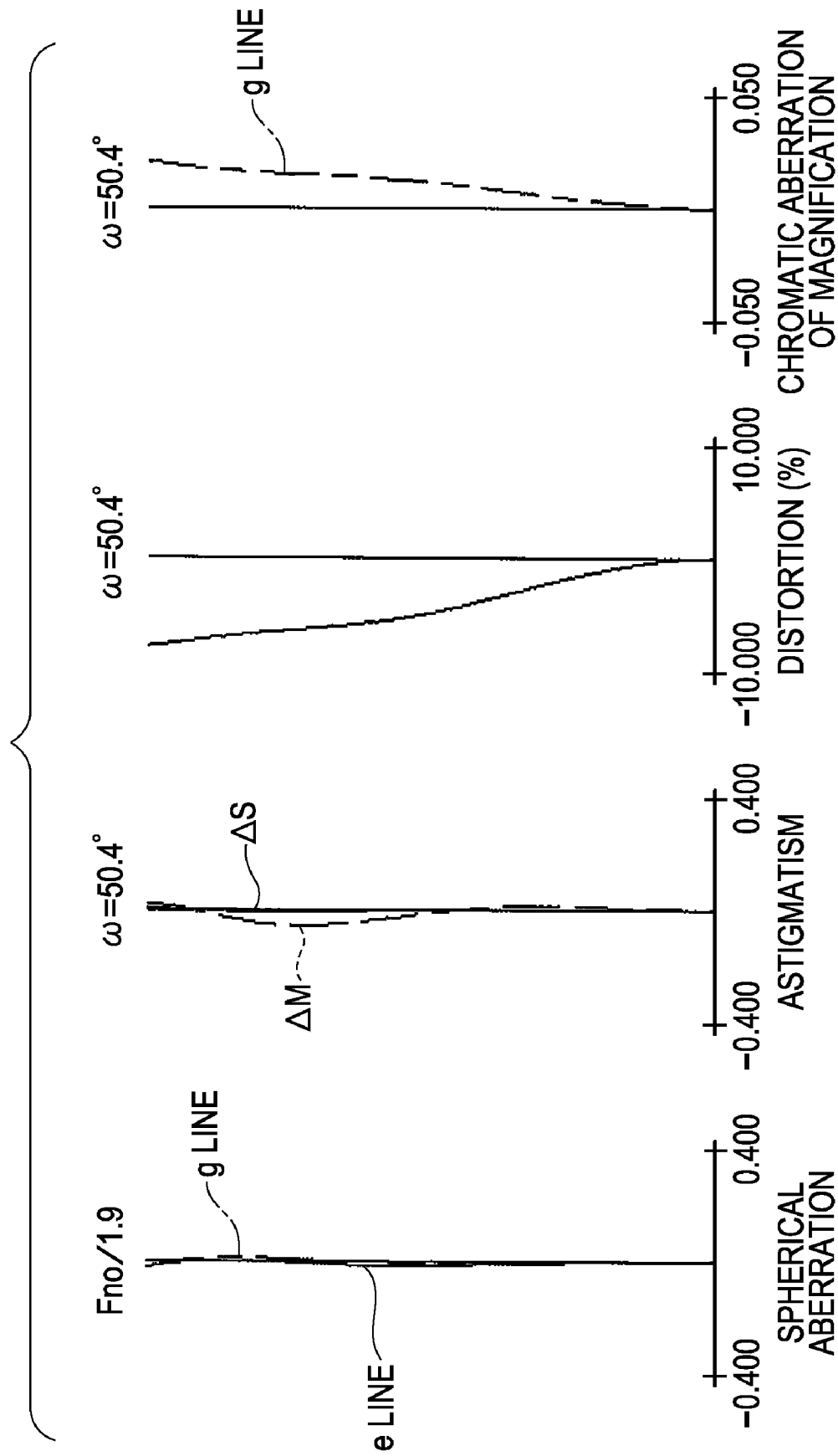
FIG. 12 shows aberration diagrams of the zoom lens according to the third embodiment of the present invention, with a focal length f of 4.55 and when focused on an object at infinity.
Figure 13:
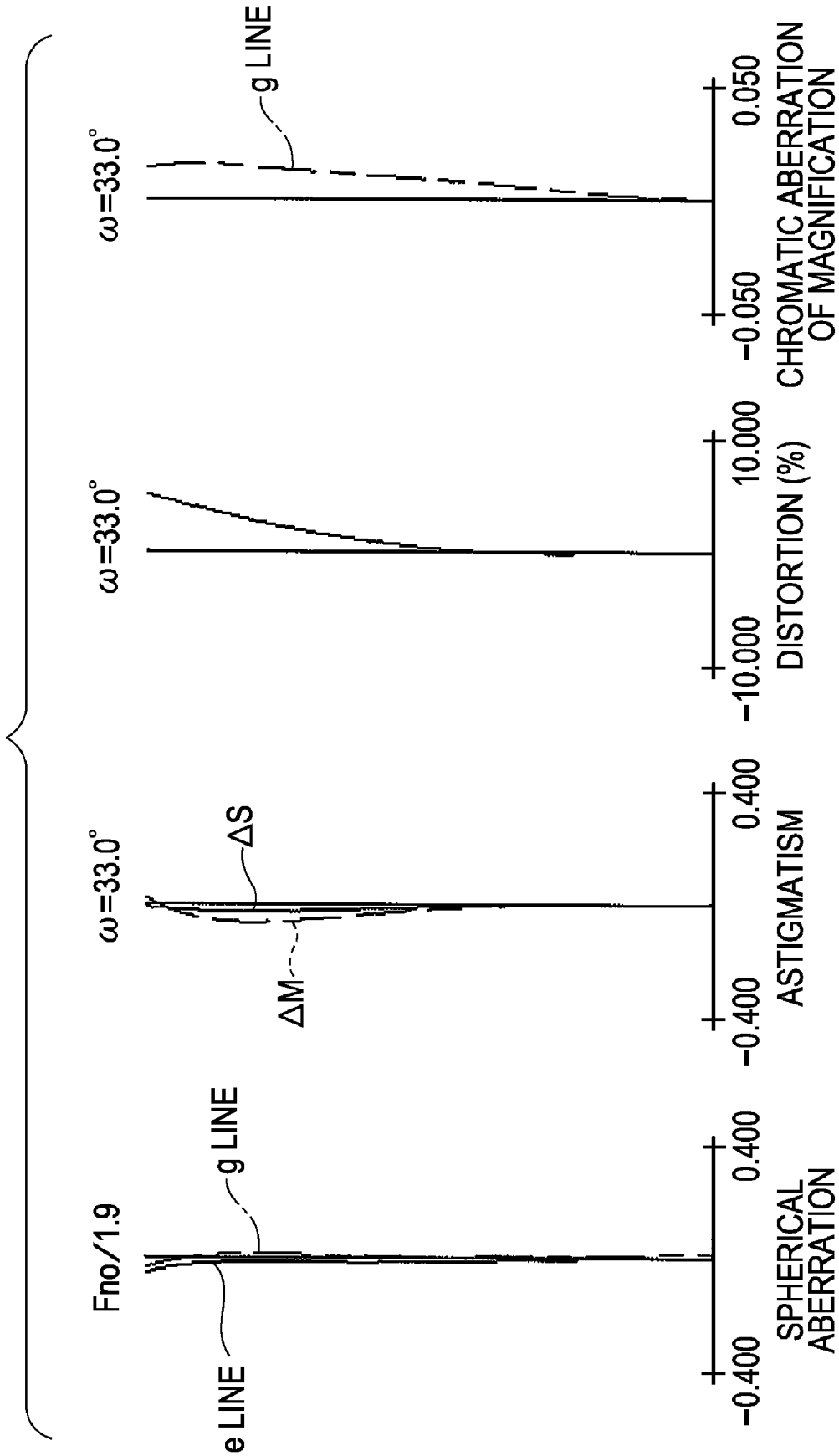
FIG. 13 shows aberration diagrams of the zoom lens according to the third embodiment of the present invention, with a focal length f of 8.47 and when focused on an object at infinity.
Figure 14:
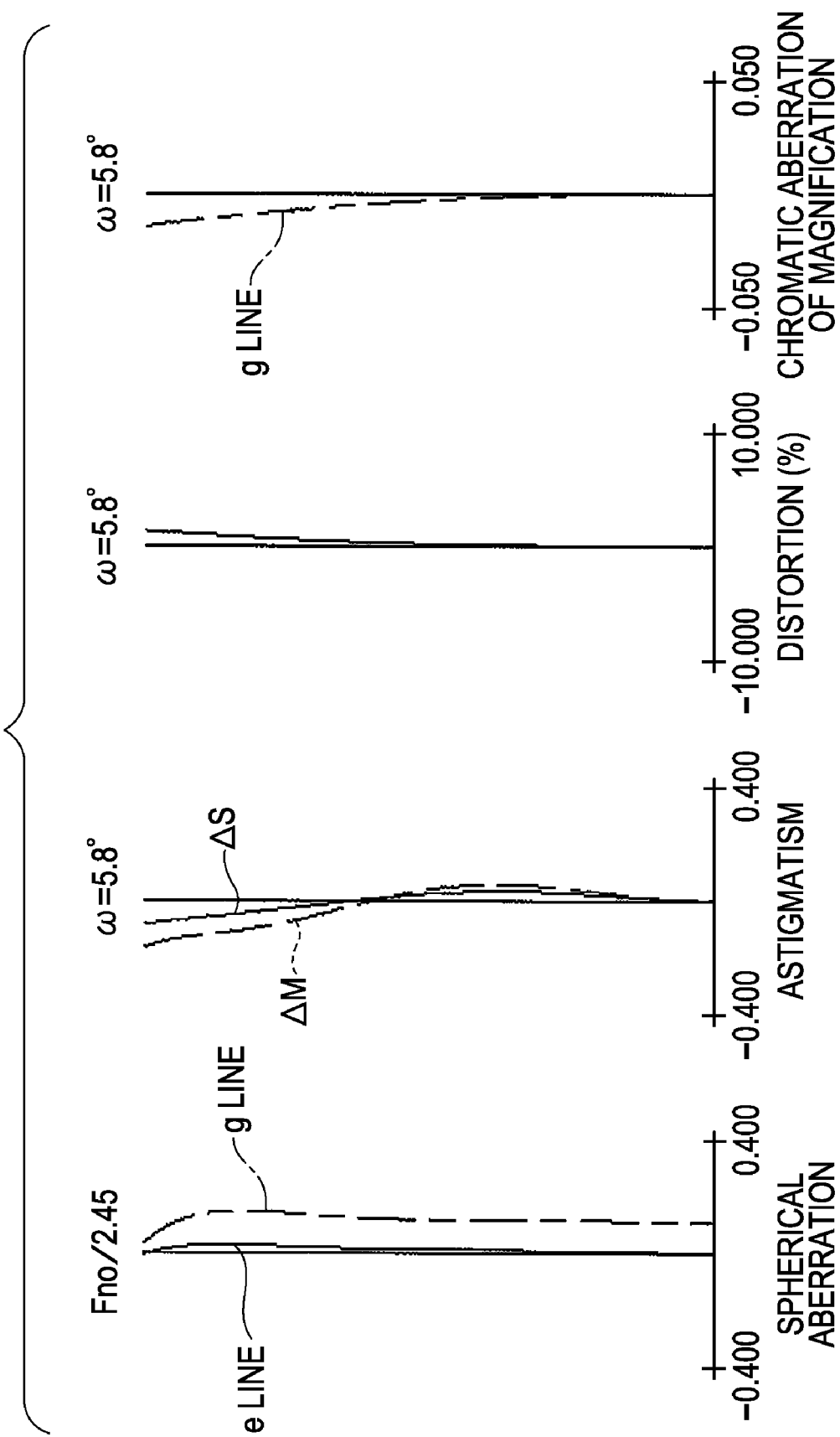
FIG. 14 shows aberration diagrams of the zoom lens according to the third embodiment of the present invention, with a focal length f of 54.60 and when focused on an object at infinity.

FIGS. 12, 13, and 14 each show aberration diagrams of the zoom lens according to the third embodiment of the present invention, with focal lengths f of 4.55, 8.47, and 54.60, respectively, and when focused on an object at infinity.

Figure 15:
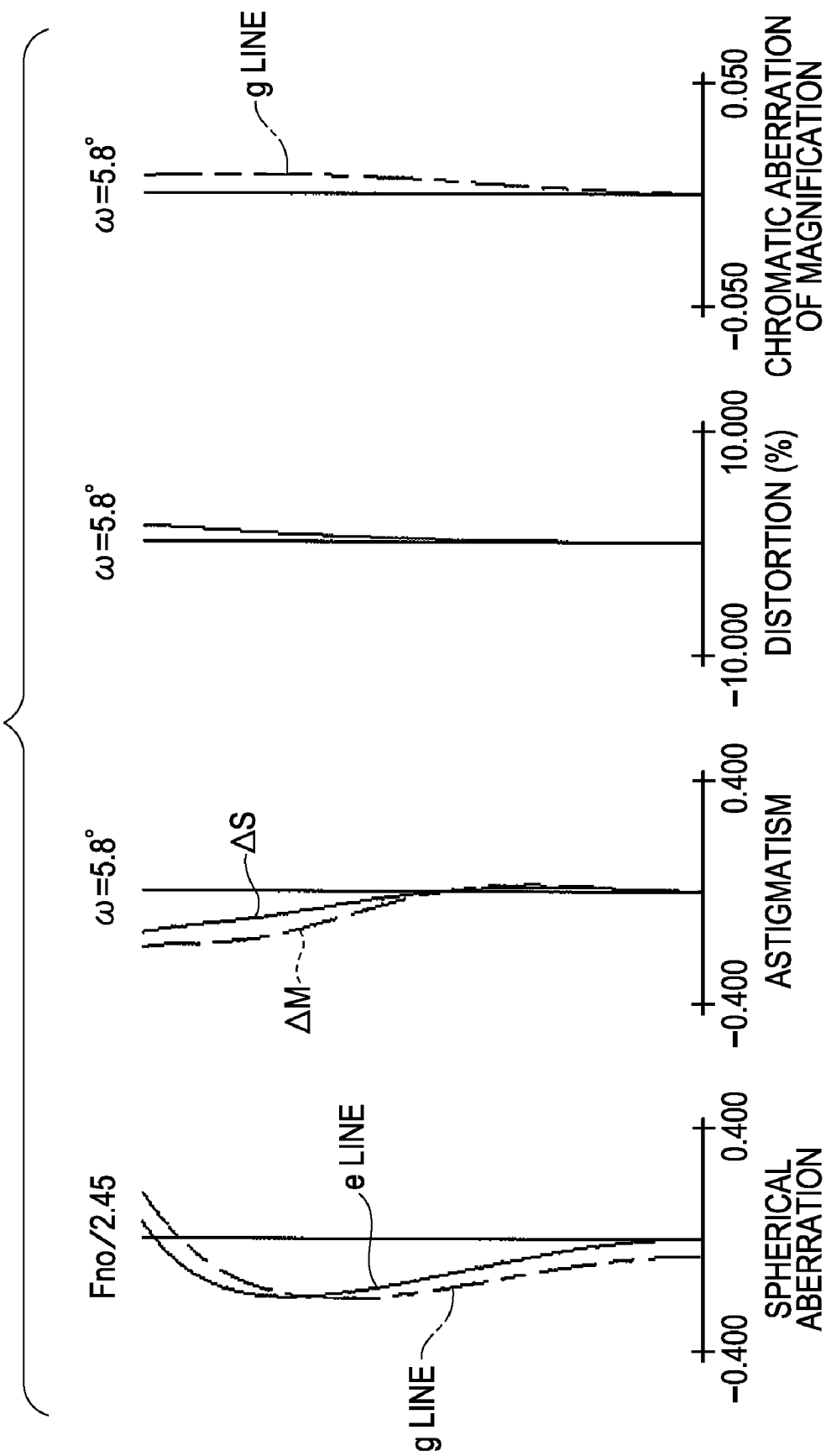
FIG. 15 shows aberration diagrams of the zoom lens according to the third embodiment of the present invention, with a focal length f of 54.60 and when focused on an object at a very short distance.

FIG. 15 shows aberration diagrams of the zoom lens according to the third embodiment of the present invention, with a focal length f of 54.60 and when focused on an object at a very short distance.

Figure 16:
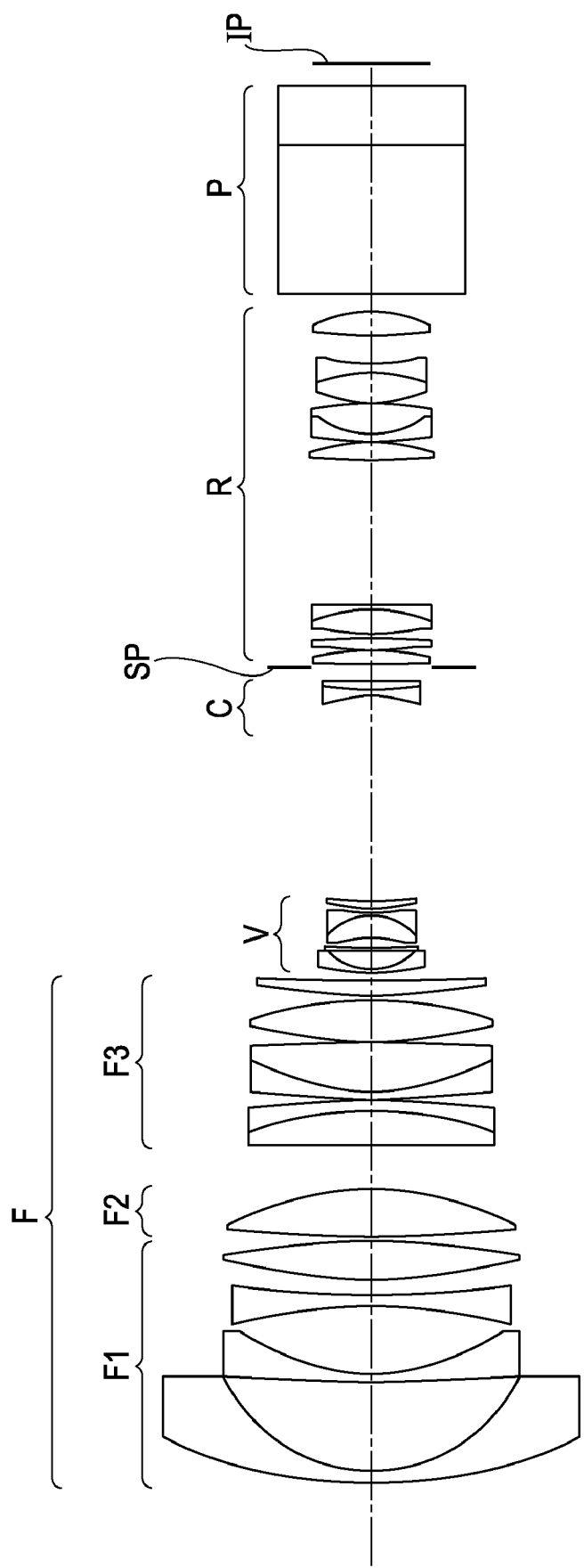
FIG. 16 is a sectional view of a zoom lens according to a fourth embodiment of the present invention, when set at the wide-angle end.

FIG. 16 is a sectional view of a zoom lens according to a fourth embodiment of the present invention, when set at the wide-angle end.

Figure 17:
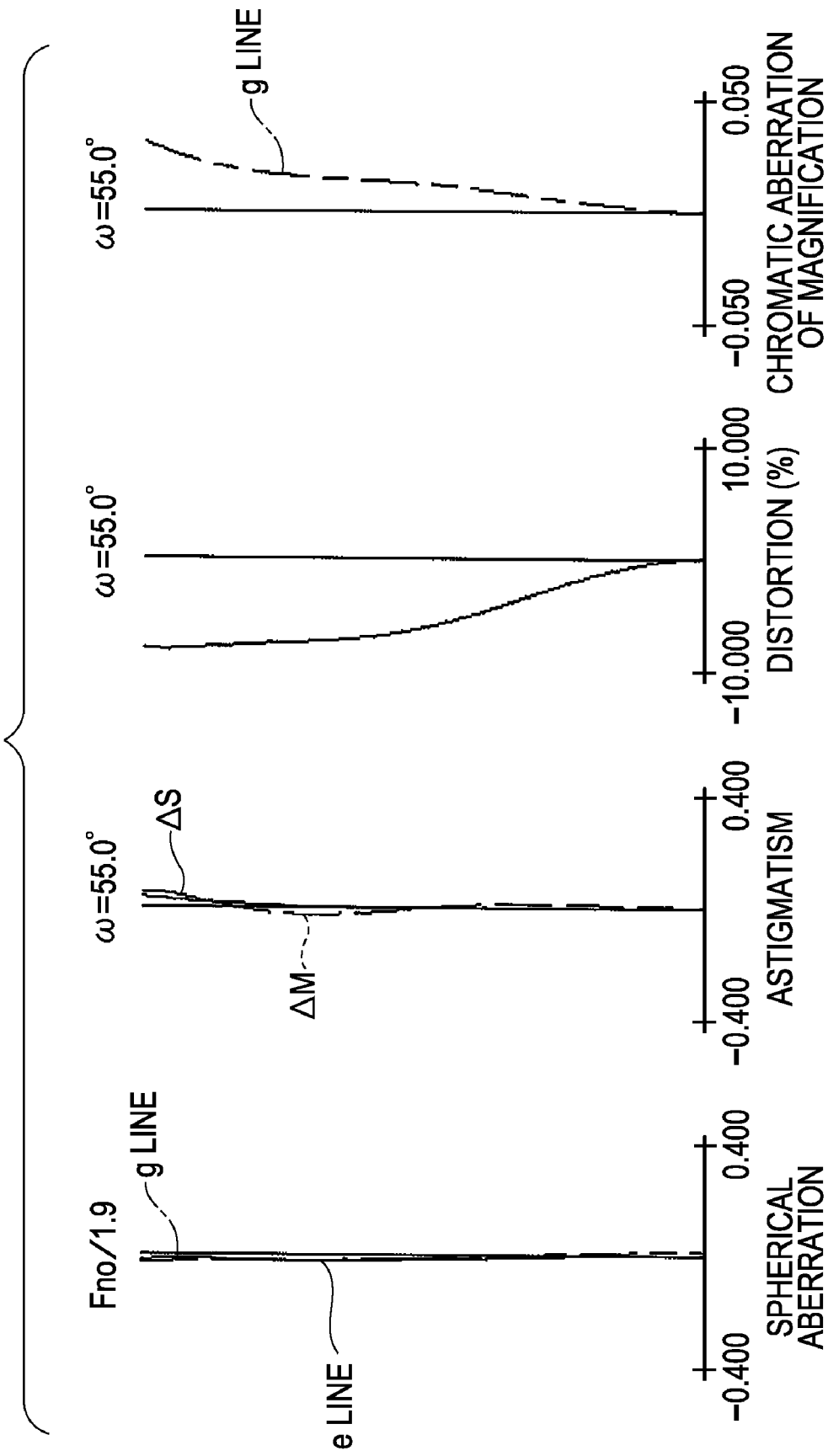
FIG. 17 shows aberration diagrams of the zoom lens according to the fourth embodiment of the present invention, with a focal length f of 3.85 and when focused on an object at infinity.
Figure 18:
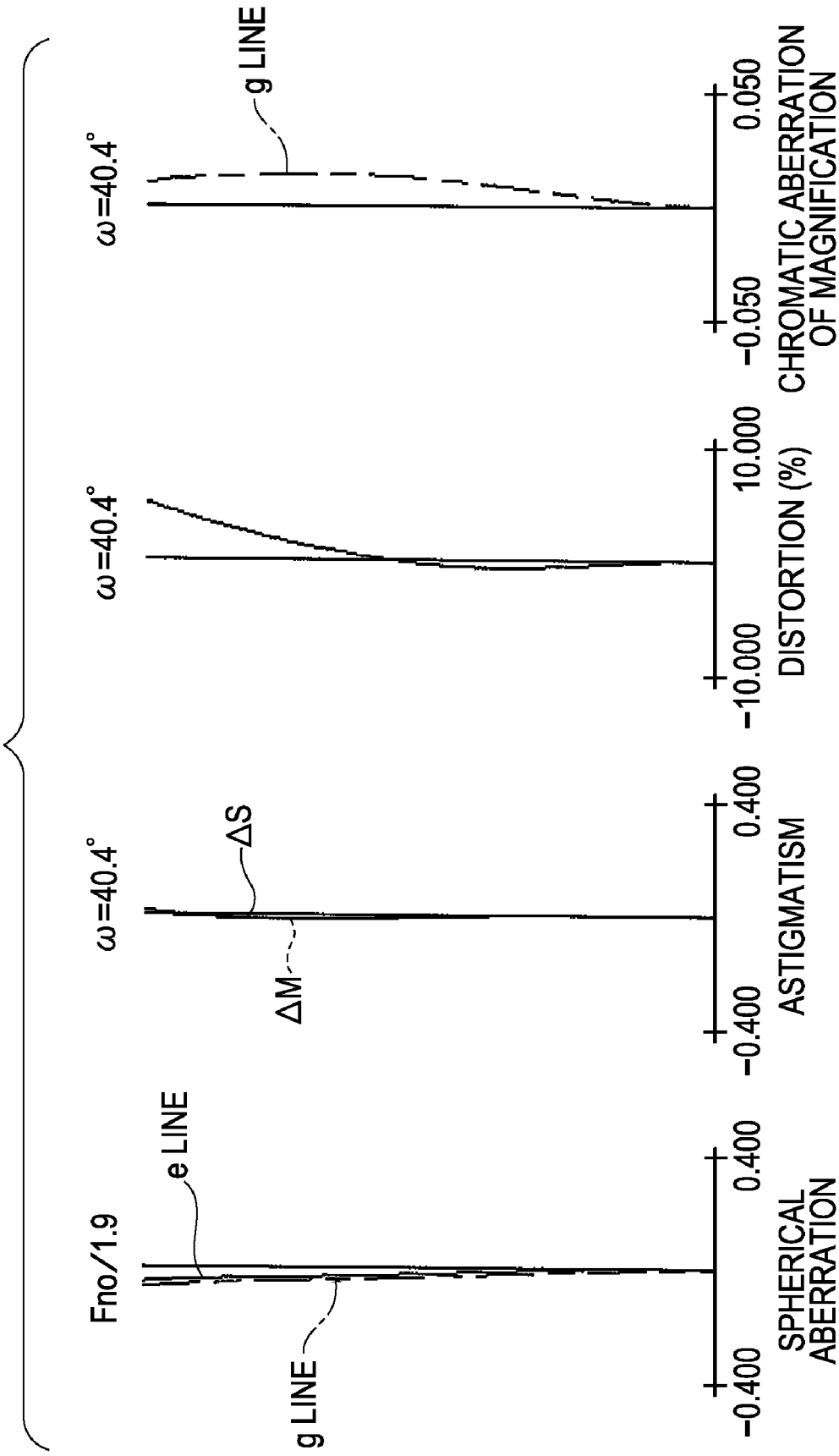
FIG. 18 shows aberration diagrams of the zoom lens according to the fourth embodiment of the present invention, with a focal length f of 6.47 and when focused on an object at infinity.
Figure 19:
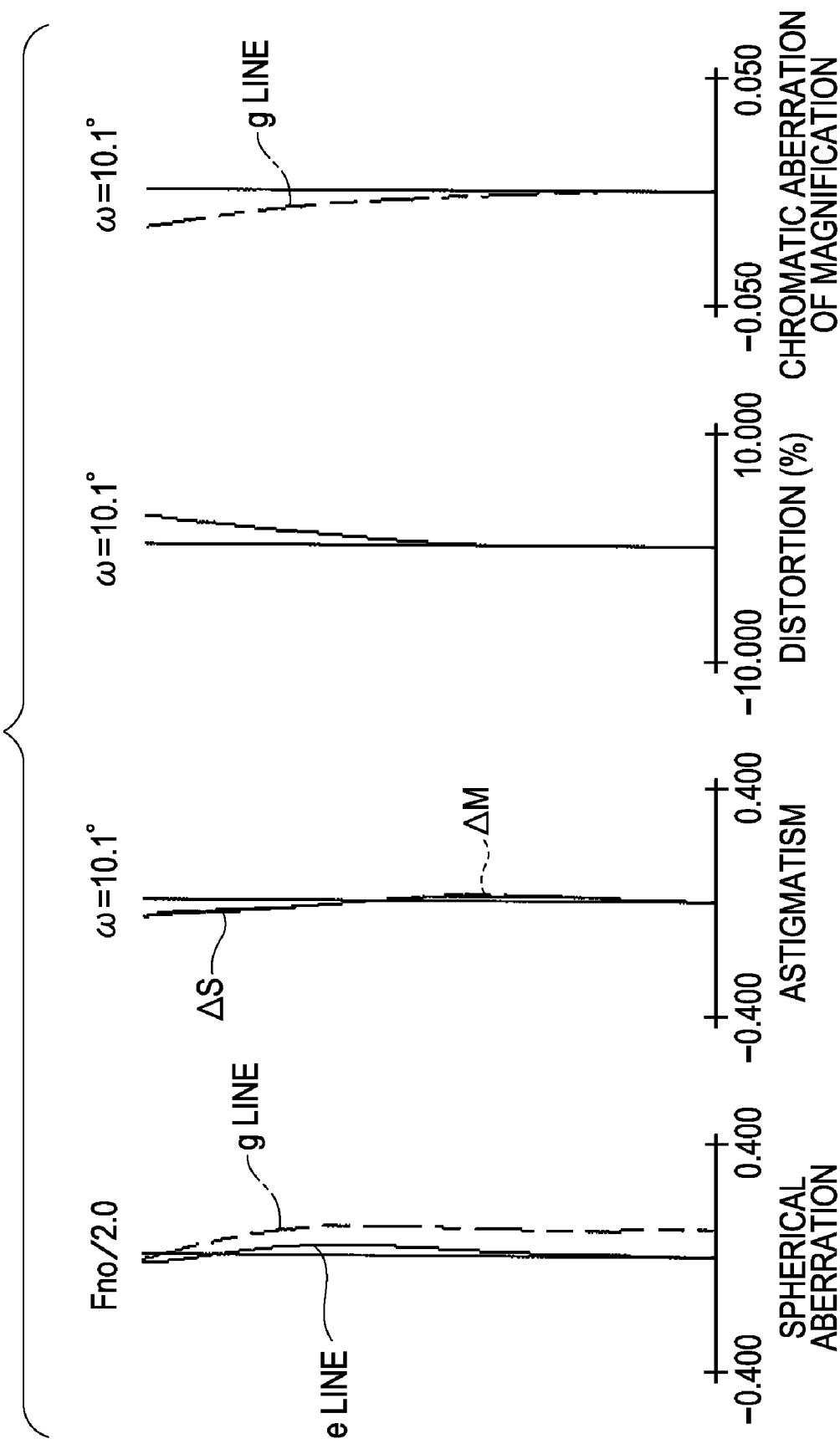
FIG. 19 shows aberration diagrams of the zoom lens according to the fourth embodiment of the present invention, with a focal length f of 30.80 and when focused on an object at infinity.

FIGS. 17, 18, and 19 each show aberration diagrams of the zoom lens according to the fourth embodiment of the present invention, with focal lengths f of 3.85, 6.47, and 30.80, respectively, and when focused on an object at infinity.

Figure 20:
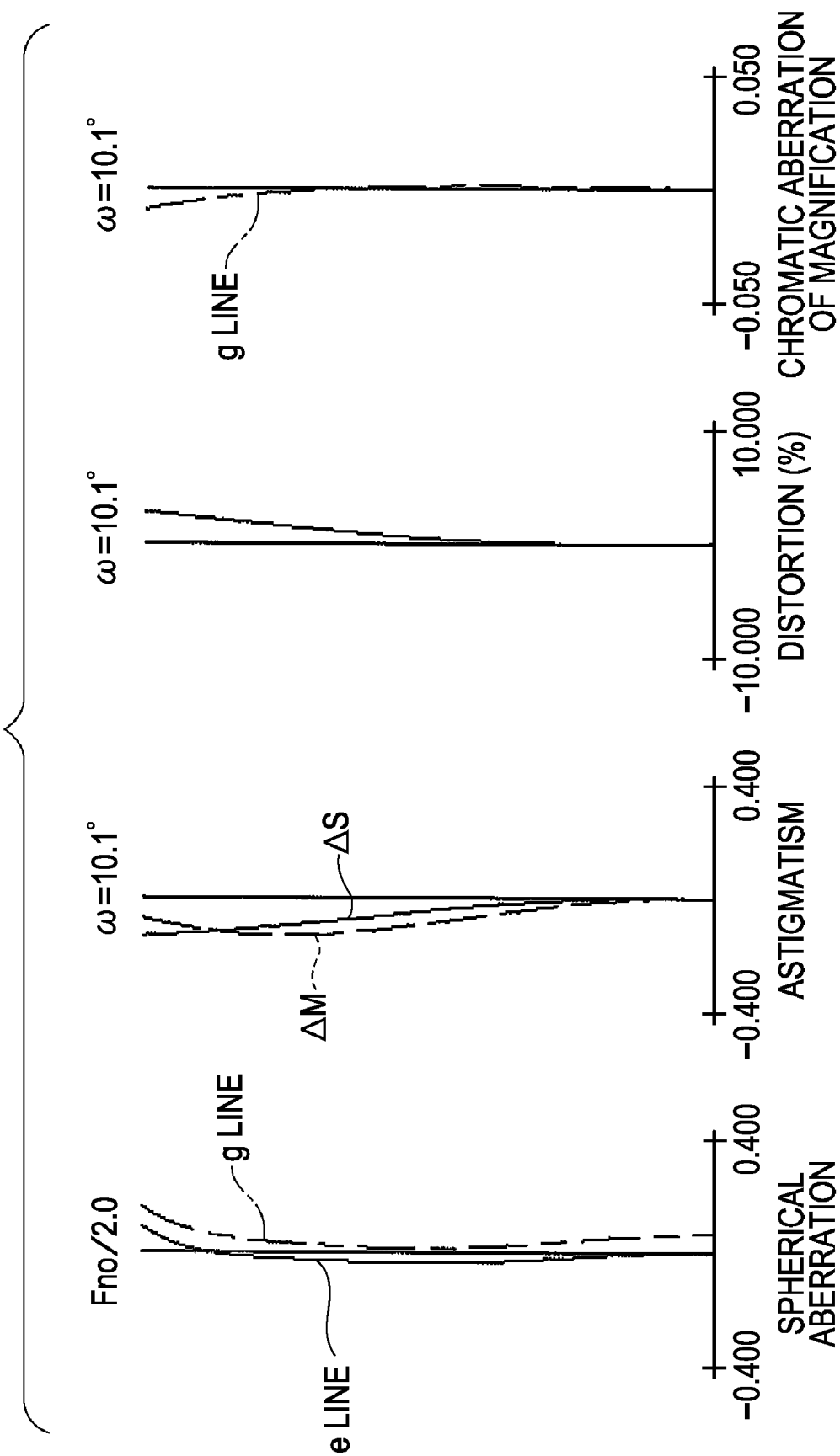
FIG. 20 shows aberration diagrams of the zoom lens according to the fourth embodiment of the present invention, with a focal length f of 30.80 and when focused on an object at a very short distance.

FIG. 20 shows aberration diagrams of the zoom lens according to the fourth embodiment of the present invention, with a focal length f of 30.80 and when focused on an object at a very short distance.

Figure 21:
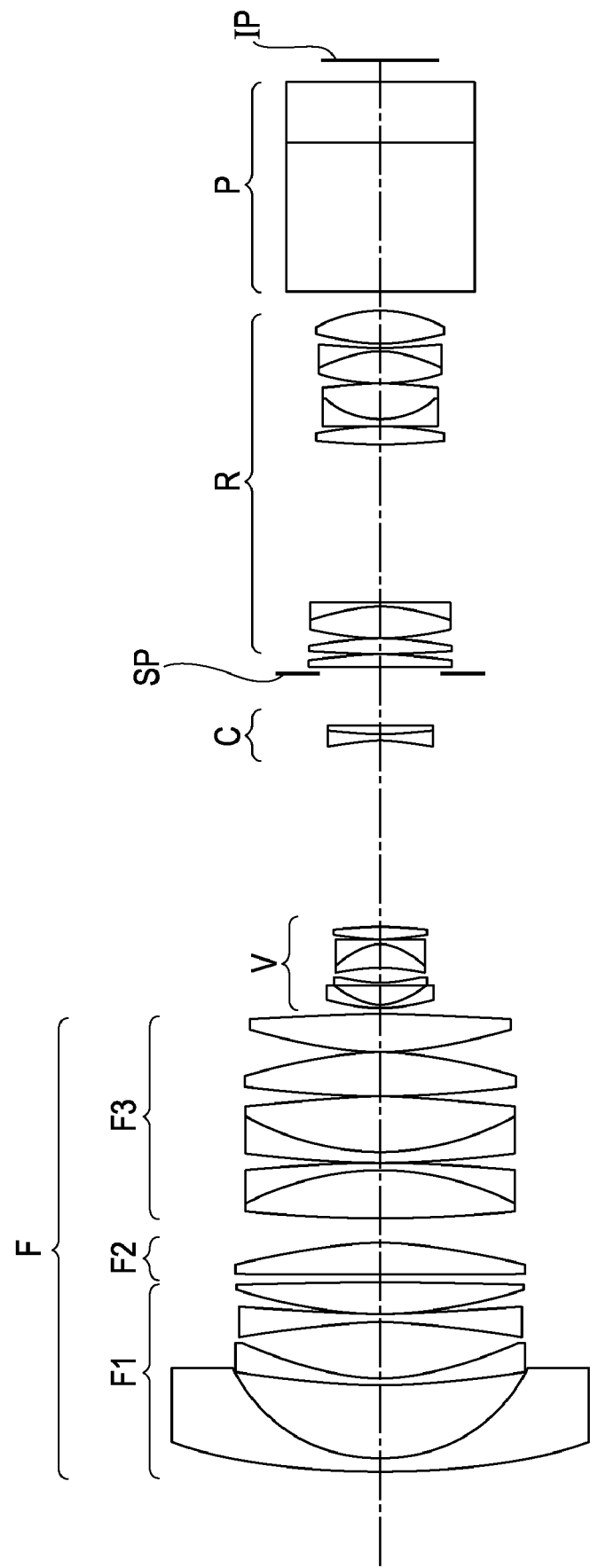
FIG. 21 is a sectional view of a zoom lens according to a fifth embodiment of the present invention, when set at the wide-angle end of its zooming range.

FIG. 21 is a sectional view of a zoom lens according to a fifth embodiment of the present invention, when set at the wide-angle end.

Figure 22:
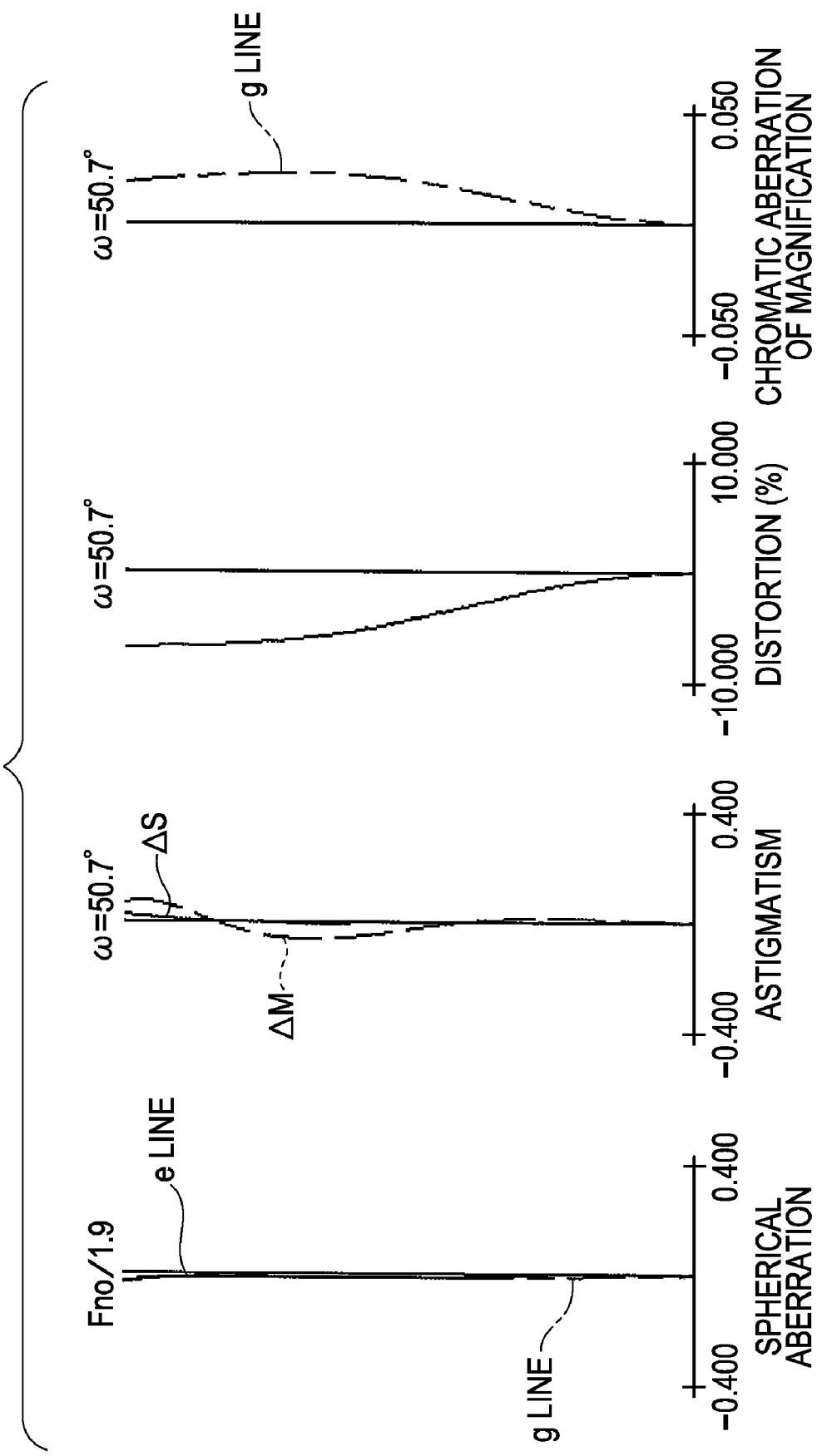
FIG. 22 shows aberration diagrams of the zoom lens according to the fifth embodiment of the present invention, with a focal length f of 4.50 and when focused on an object at infinity.
Figure 23:
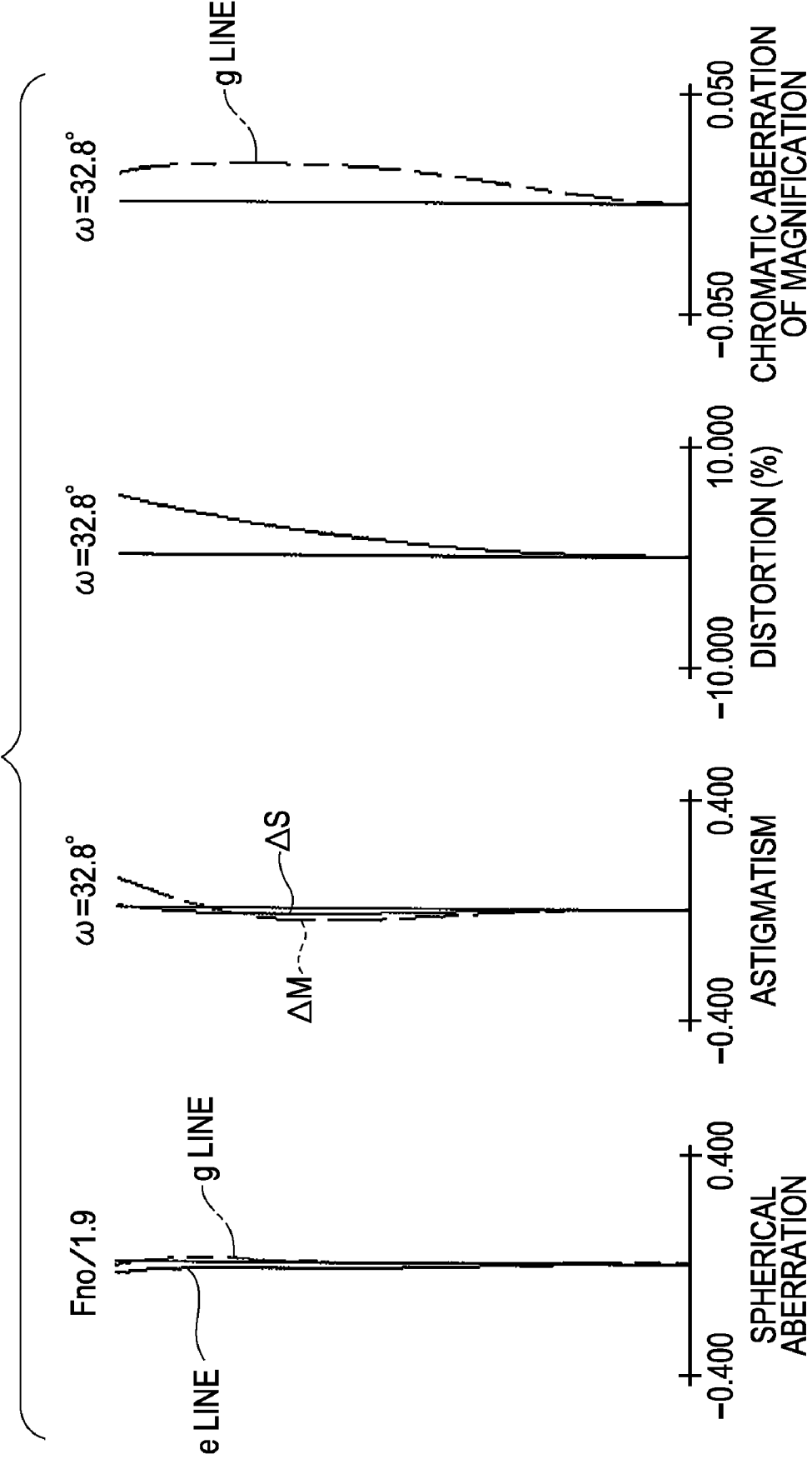
FIG. 23 shows aberration diagrams of the zoom lens according to the fifth embodiment of the present invention, with a focal length f of 8.55 and when focused on an object at infinity.
Figure 24:
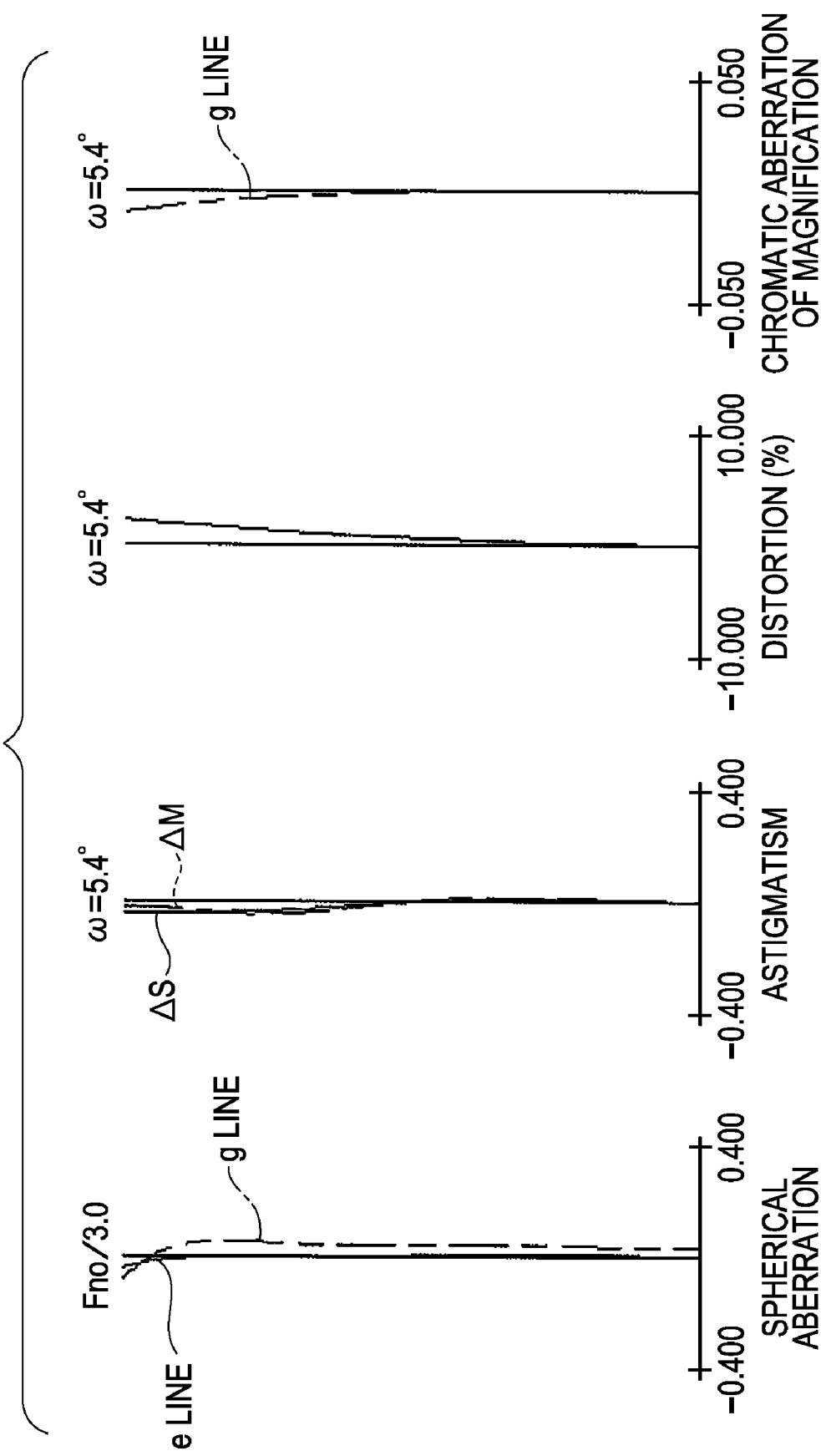
FIG. 24 shows aberration diagrams of the zoom lens according to the fifth embodiment of the present invention, with a focal length f of 58.50 and when focused on an object at infinity.

FIGS. 22, 23, and 24 each show aberration diagrams of the zoom lens according to the fifth embodiment of the present invention, with focal lengths f of 4.50, 8.55, and 58.50, respectively, and when focused on an object at infinity.

Figure 25:
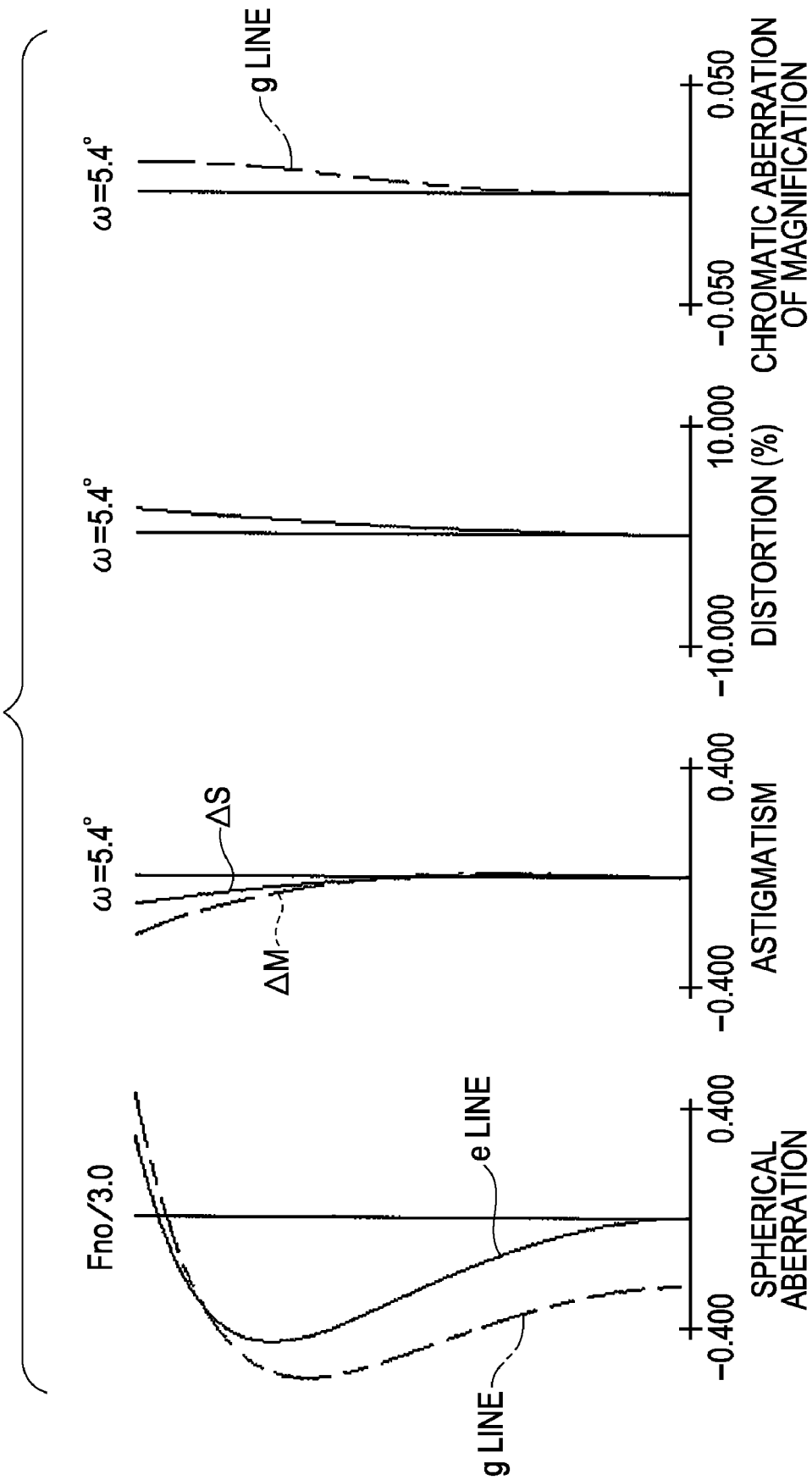
FIG. 25 shows aberration diagrams of the zoom lens according to the fifth embodiment of the present invention, with a focal length f of 58.50 and when focused on an object at a very short distance.

FIG. 25 shows aberration diagrams of the zoom lens according to the fifth embodiment of the present invention, with a focal length f of 58.50 and when focused on an object at a very short distance.

Figure 26:
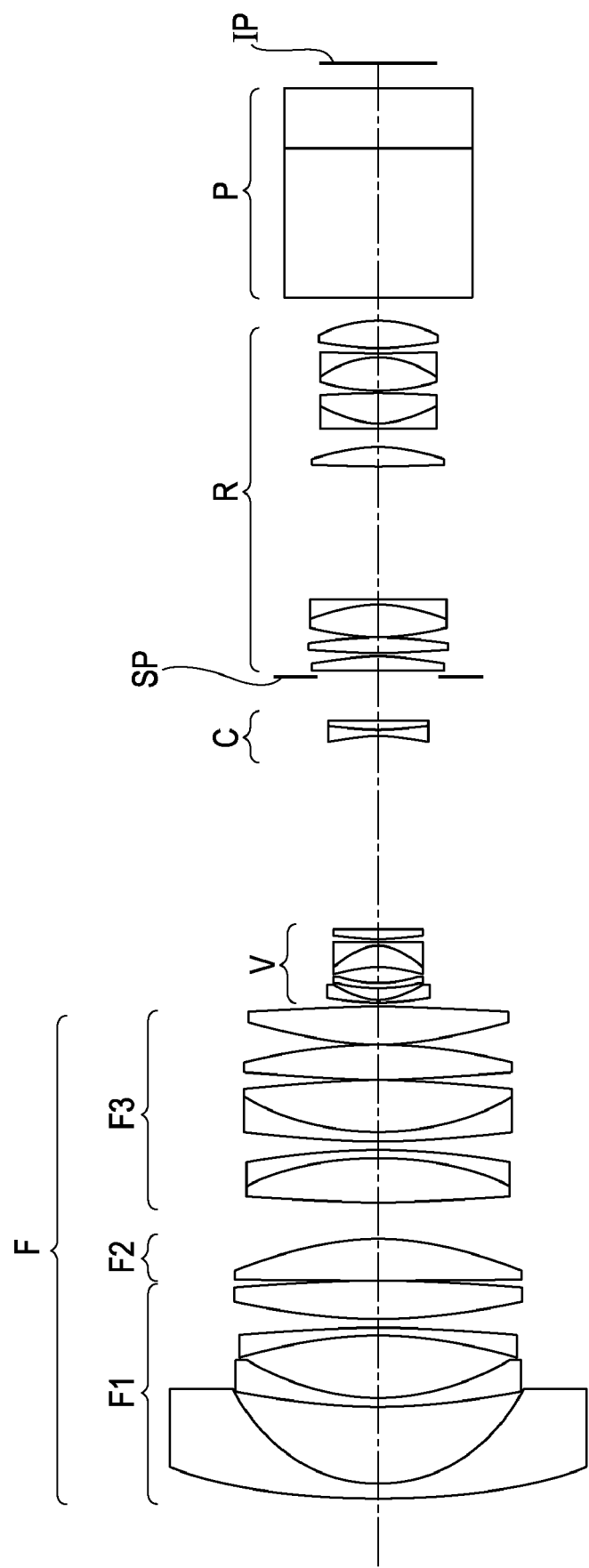
FIG. 26 is a sectional view of a zoom lens according to a sixth embodiment of the present invention, when set at the wide-angle end of its zooming range.

FIG. 26 is a sectional view of a zoom lens according to a sixth embodiment of the present invention, when set at the wide-angle end.

Figure 27:
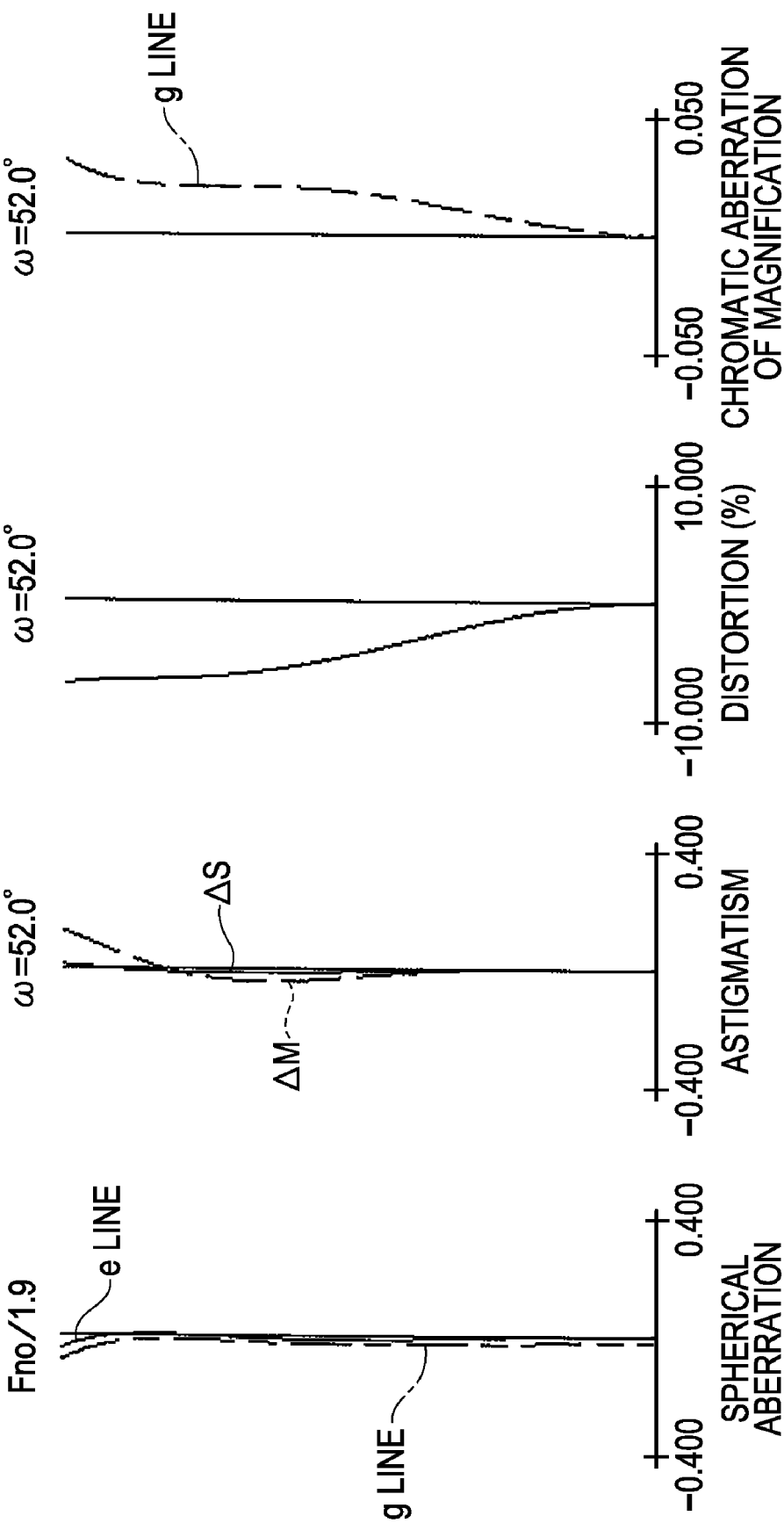
FIG. 27 shows aberration diagrams of the zoom lens according to the sixth embodiment of the present invention, with a focal length f of 4.30 and when focused on an object at infinity.
Figure 28:
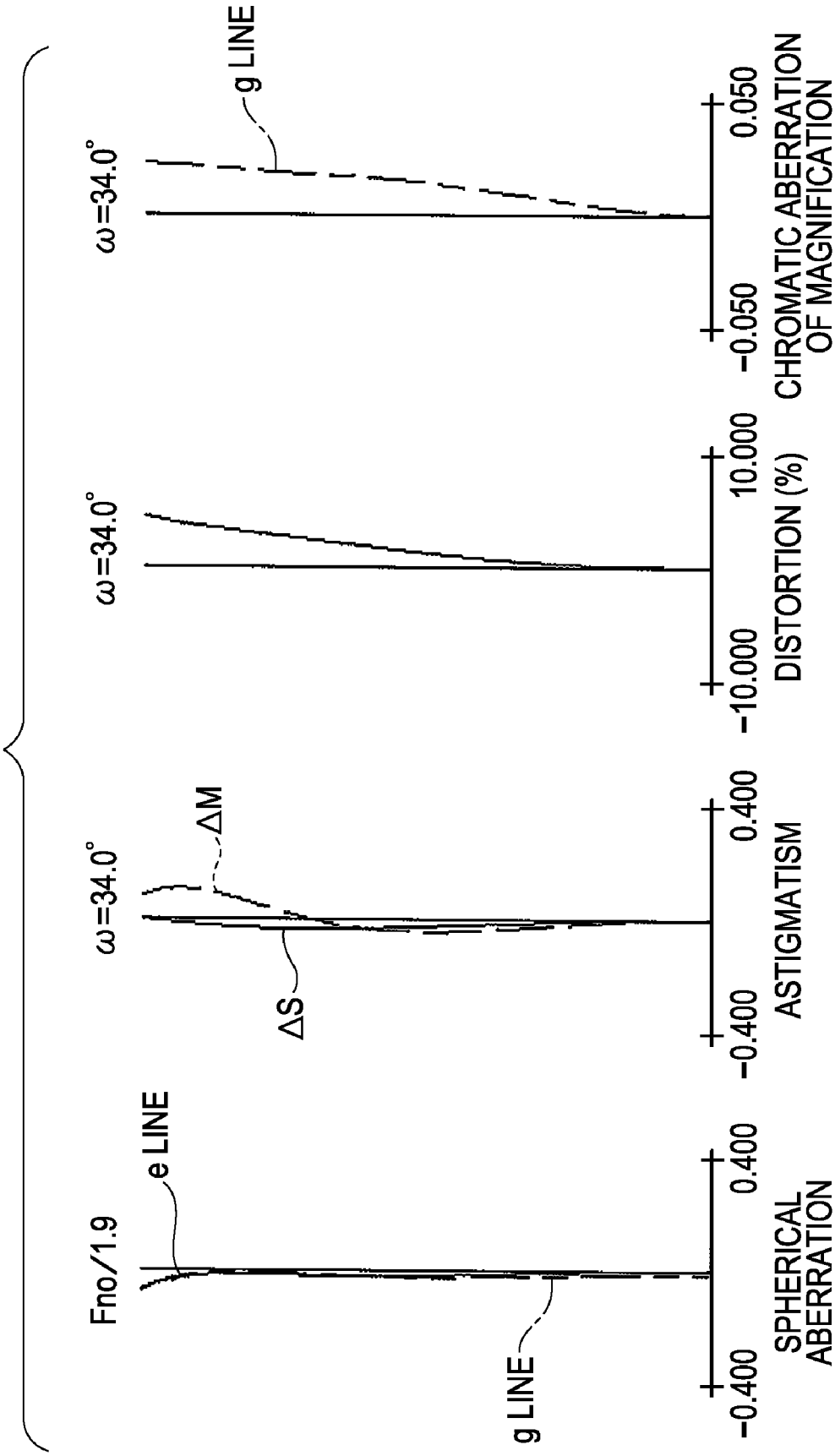
FIG. 28 shows aberration diagrams of the zoom lens according to the sixth embodiment of the present invention, with a focal length f of 8.16 and when focused on an object at infinity.
Figure 29:
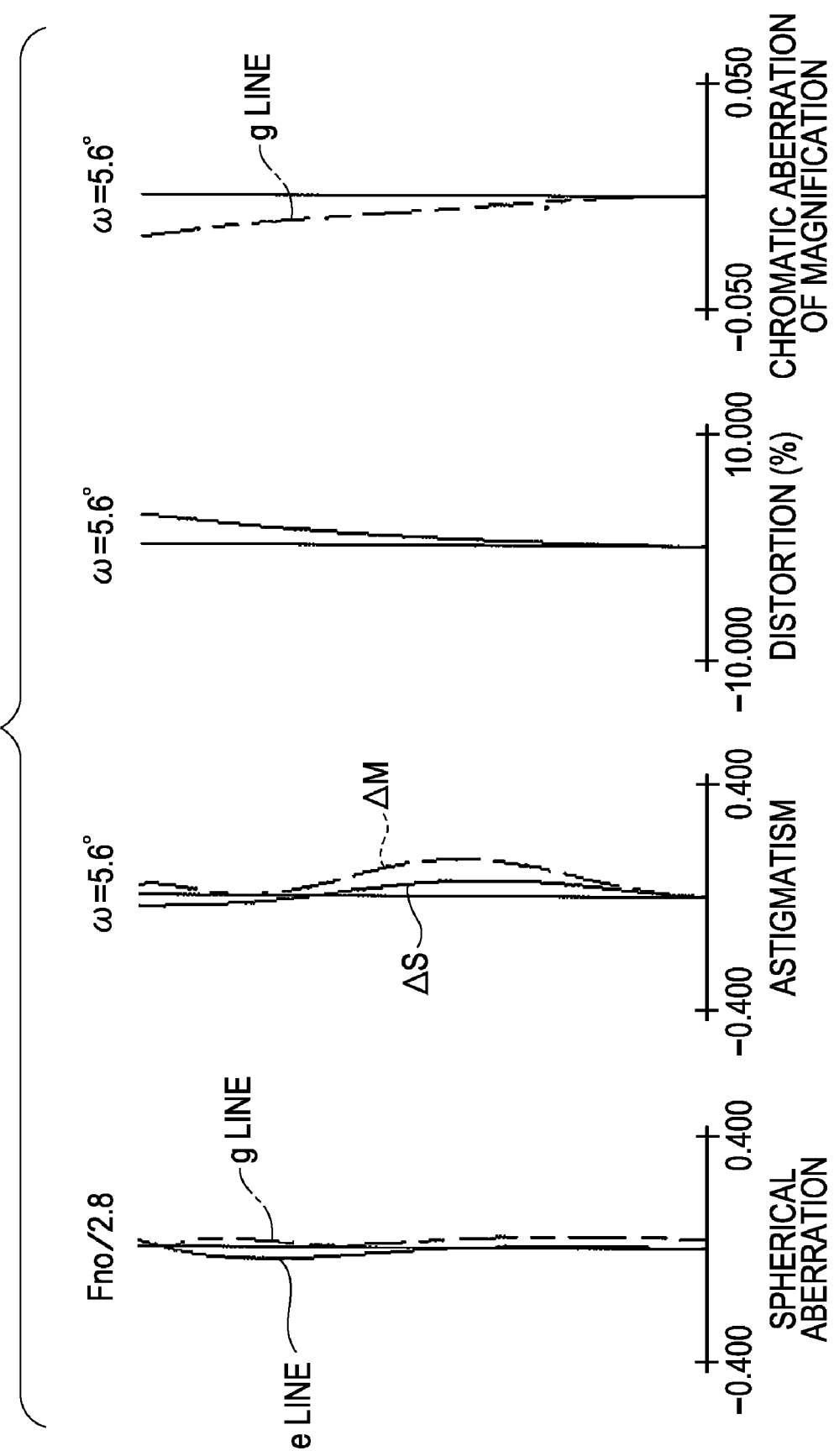
FIG. 29 shows aberration diagrams of the zoom lens according to the sixth embodiment of the present invention, with a focal length f of 55.90 and when focused on an object at infinity.

FIGS. 27, 28, and 29 each show aberration diagrams of the zoom lens according to the sixth embodiment of the present invention, with focal lengths f of 4.30, 8.16, 55.90, respectively, and when focused on an object at infinity.

Figure 30:
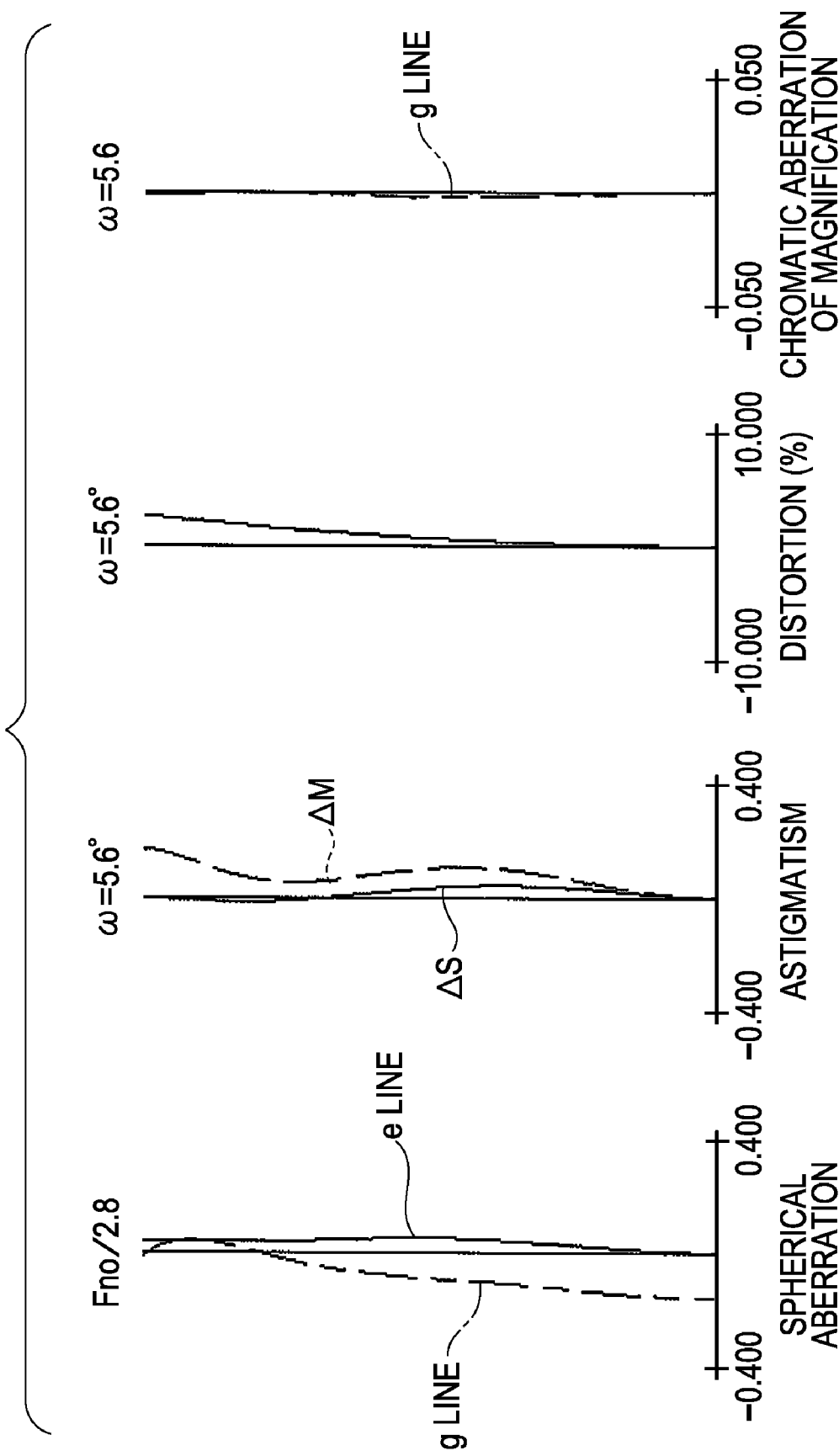
FIG. 30 shows aberration diagrams of the zoom lens according to the sixth embodiment of the present invention, with a focal length f of 55.90 and when focused on an object at a very short distance.

FIG. 30 shows aberration diagrams of the zoom lens according to the sixth embodiment of the present invention, with a focal length f of 55.90 and when focused on an object at a very short distance.

Figure 31:
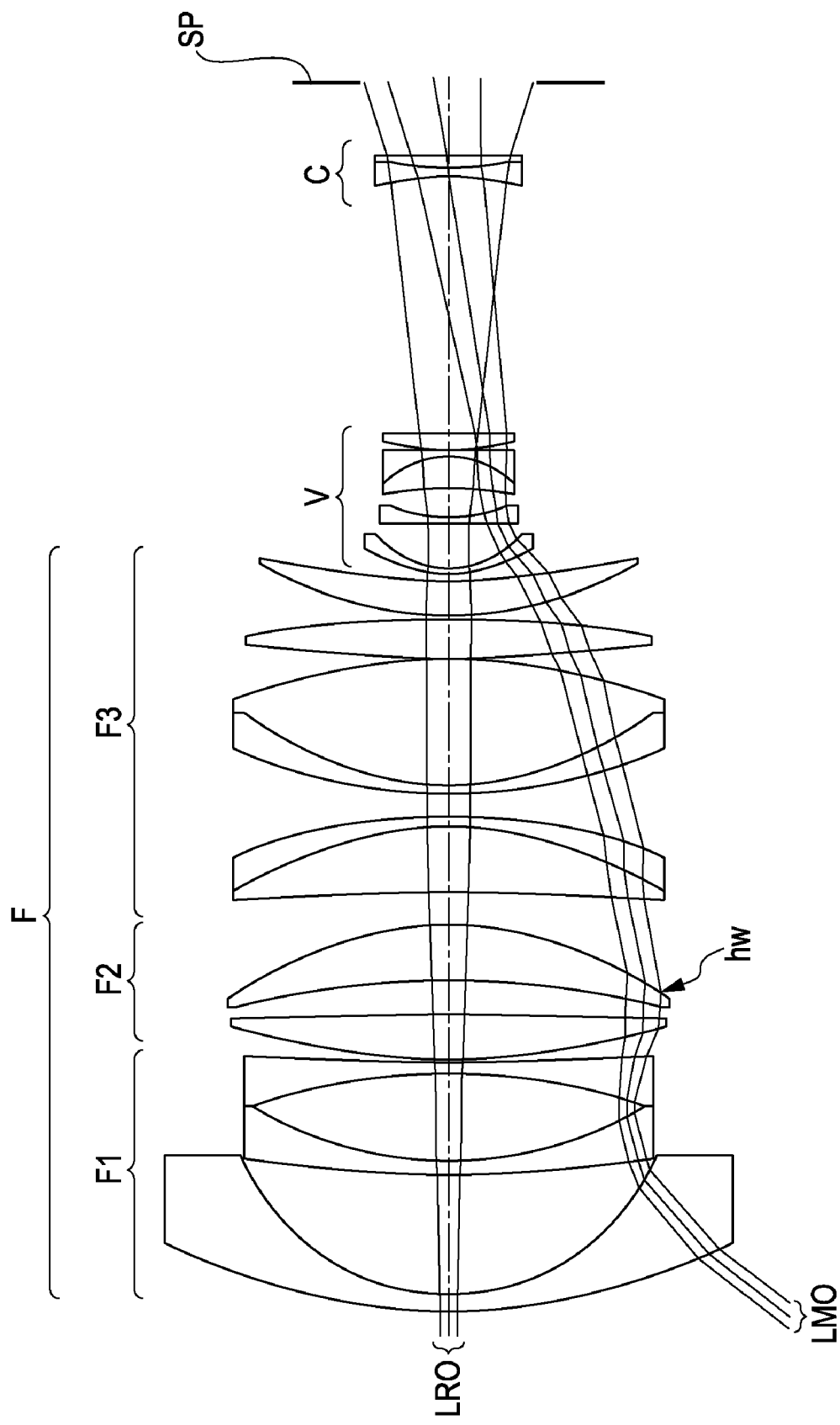
FIG. 31 is a ray diagram of a part of the zoom lens shown in FIG. 1, when set at the wide-angle end and focused on an object at infinity.
Figure 32:
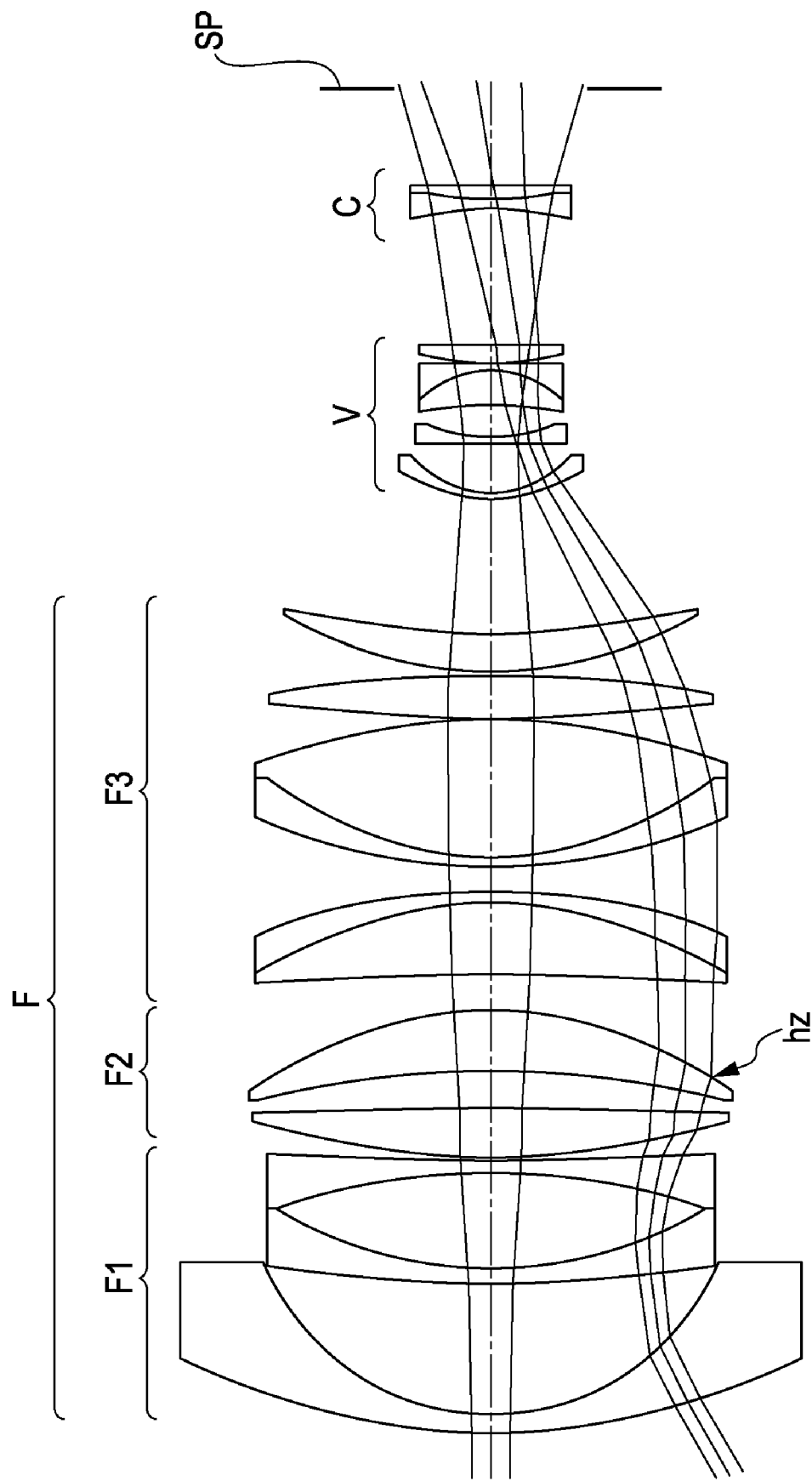
FIG. 32 is a ray diagram of a part of the zoom lens shown in FIG. 1, when set at a zoom ratio of $Z^{1/4}$ and focused on an object at infinity.
Figure 33:
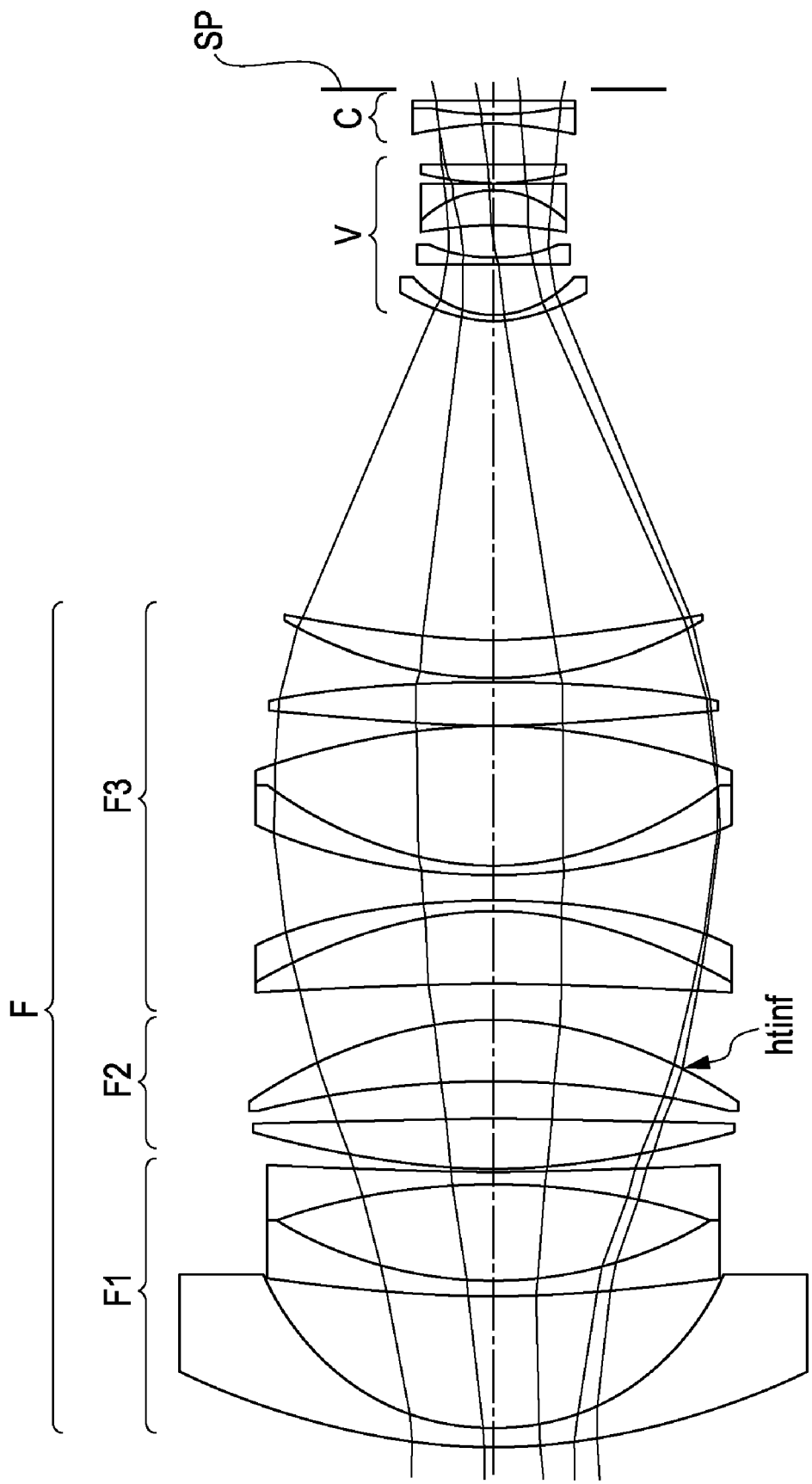
FIG. 33 is a ray diagram of a part of the zoom lens shown in FIG. 1, when set at the telephoto end and focused on an object at infinity.

FIGS. 31, 32, and 33 each are a ray diagram of a part of the zoom lens shown in FIG. 1, when set at the wide-angle end, at a zoom ratio of $Z^{1/4}$, and at the telephoto end, respectively, and focused on an object at infinity.

Figure 34:
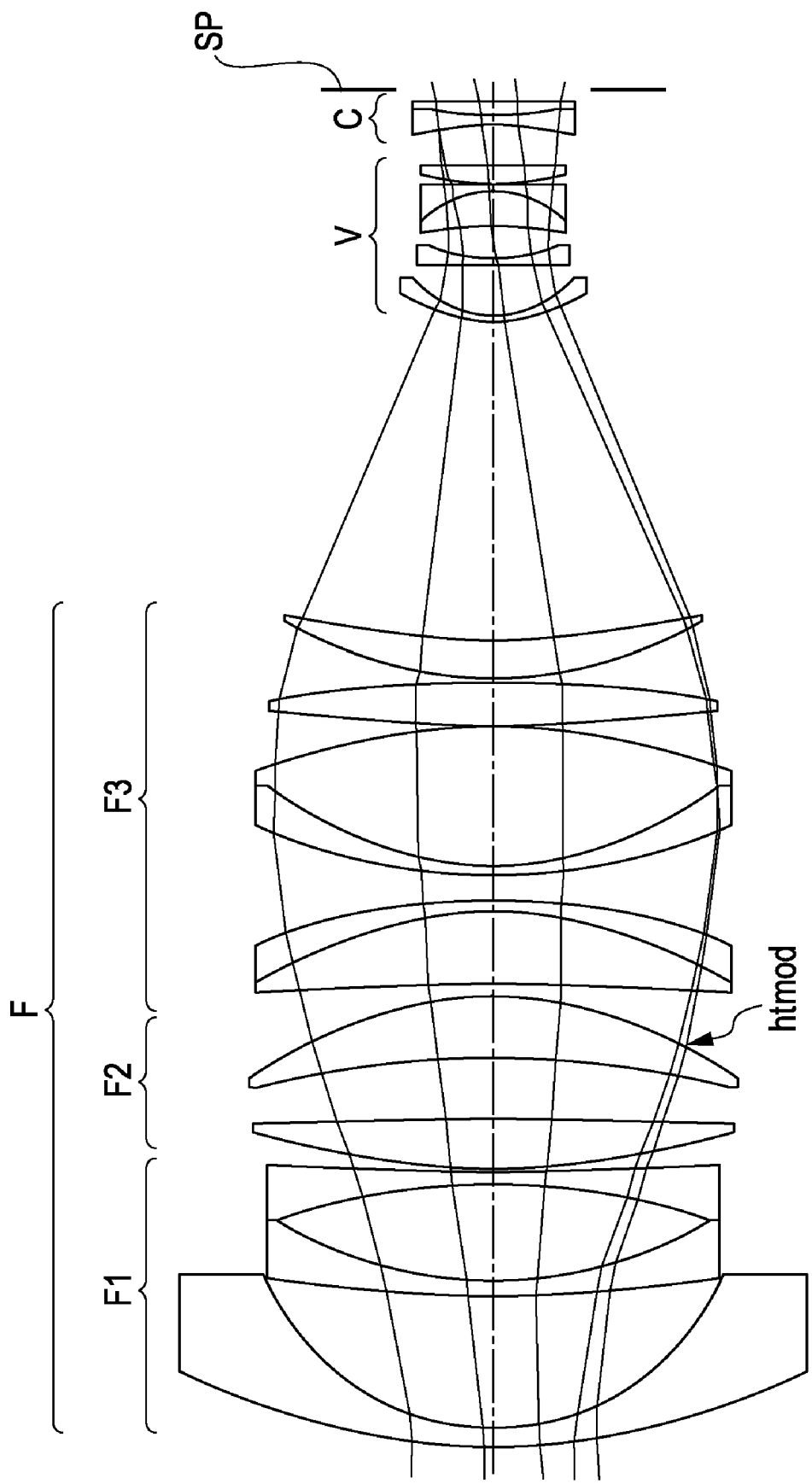
FIG. 34 is a ray diagram of a part of the zoom lens shown in FIG. 1, when set at the telephoto end and focused on an object at a very short distance.

FIG. 34 is a ray diagram of a part of the zoom lens shown in FIG. 1, when set at the telephoto end and focused on an object at a very short distance.

Figure 35:
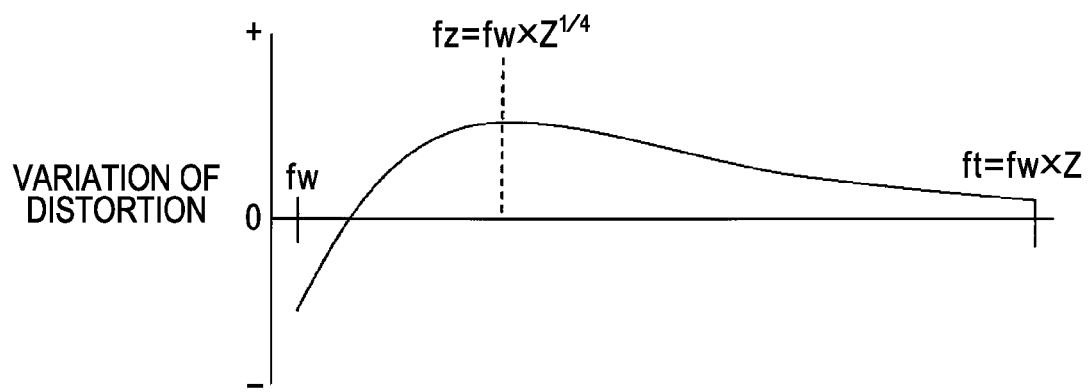
FIG. 35 is a diagram showing variation of distortion caused by zooming of the zoom lens.
Figure 36:
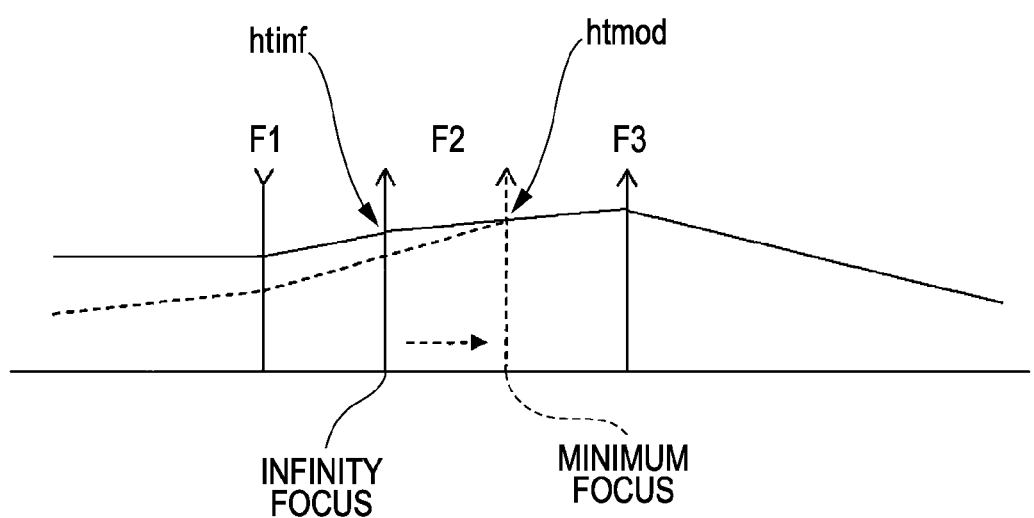
FIG. 36 is a diagram showing a change in height of a ray entering the focusing movable unit, caused by a change in object distance.

FIG. 35 is a diagram showing variation of distortion caused by zooming of the zoom lens. FIG. 36 is a diagram showing a change in height of a ray entering the focusing movable unit, caused by a change in object distance. FIG. 37 is a schematic view of a relevant part of an image pickup apparatus of the present invention.

In the sectional views of the zoom lens, "F" denotes the first lens unit that does not move during zooming and has positive refractive power, "V" denotes the second lens unit (variator lens unit) that moves during zooming and has negative refractive power, and "C" denotes the third lens unit (compensator lens unit) that moves during zooming, corrects variation of the position of an image plane caused by zooming, and has negative refractive power.

An aperture stop SP is located to the image side of the third lens unit C. A fourth lens unit (relay lens unit) R forms an image and has positive refractive power. A color separation prism or an optical filter P is shown as a glass block. An image plane IP corresponds to an imaging plane of a solid-state image pickup element (photoelectric conversion element, not shown).

When the zoom lens zooms from the wide-angle end to the telephoto end of its zooming range, the second lens unit V moves monotonically (monotonously) along the optical axis toward the image plane.

When the zoom lens zooms from the wide-angle end to the telephoto end, at least a part of the third lens unit C moves along the optical axis toward the object side to correct image plane variation caused by zooming.

In the embodiments, the second lens unit V and the third lens unit C together constitute a zoom lens unit (zooming portion).

The first lens unit F has, in order from the object side to the image side, a first lens subunit F1 that does not move during focusing and has negative refractive power, a second lens subunit F2 that moves along the optical axis during focusing and has positive refractive power, and a third lens subunit F3 that does not move during focusing and has positive refractive power.

The aberration diagrams show the spherical aberrations with respect to the g line and the e line, the astigmatisms on the meridional image plane ΔM and the sagittal image plane ΔS, and the chromatic aberration of magnification with respect to the g line. In the aberration diagrams, Fno is the F number, and ω is the half field angle.

In the aberration diagrams, the spherical aberrations are shown in a scale of 0.4 mm, the astigmatisms are shown in a scale of 0.4 mm, the distortions are shown in a scale of 10%, and the chromatic aberrations of magnification are shown in a scale of 0.05 mm.

In the following embodiments, the terms "wide-angle end" and "telephoto end" refer to the zooming positions in which the second lens unit V for zooming is positioned at the left end and the right end, respectively, of the optical axis along which the second lens unit V can mechanically move.

Now, characteristics of the embodiments will be described. The second lens subunit F2 that satisfies the following Conditional Expressions has at least one aspherical lens surface AS12:

$$0.95 < hz/htinf < 1.50 \quad (1)$$

$$0.83 < hw/hz < 1.16 \quad (2)$$

$$htmod/htinf > 1.0 \quad (3)$$

where, in the lens surface of the second lens subunit F2, htinf is the maximum height of incidence of the axial rays when the zoom lens is set at the telephoto end and focused on an object at infinity; htmod is the maximum height of incidence of the axial rays when the zoom lens is set at the telephoto end and focused on an object at a very short distance; hw is the maximum height of incidence of the off-axis rays when the zoom lens is set at the wide-angle end and focused on an object at infinity; and hz is the maximum height of incidence of the off-axis rays when the zoom lens is set at the zoom ratio $Z^{1/4}$ (where the maximum zoom ratio is Z) and focused on an object at infinity.

If the aspherical lens surface AS12 has positive refractive power, the aspherical lens surface AS12 is shaped such that the positive refractive power decreases from the center toward the periphery thereof.

If the aspherical lens surface AS12 has negative refractive power, the aspherical lens surface AS12 is shaped such that the negative refractive power increases from the center toward the periphery thereof.

Conditional Expressions (1) to (3) define the conditions regarding the position and shape of the aspherical surface in the first lens unit F, which are the most significant characteristics of the present invention.

Now, characteristics of the present invention will be described with reference to FIGS. 31 to 33.

FIGS. 31 to 33 are ray diagrams that show the paths of axial rays LRO and outermost off-axis rays LMO through the first lens unit F to the third lens unit C of the zoom lens of the present invention.

FIG. 31 is the ray diagram when the zoom lens is set at a wide-angle end fw, FIG. 32 is the ray diagram when the zoom lens is set at a zooming position fz of fw×$Z^{1/4}$ FIGS. 33 and 34 are the ray diagrams when the zoom lens is set at a telephoto end ft, where Z is the maximum zoom ratio.

As shown in FIGS. 31 to 33, the maximum height of incidence of the axial marginal rays on the lens surface increases as the zoom lens zooms from the wide-angle end to the telephoto end. In the first lens unit F, the maximum height of incidence of the axial marginal rays increases as the zoom lens zooms from the position where the F-drop begins toward the telephoto end, and becomes largest at the telephoto end. The maximum height of incidence of the axial marginal rays increases from the first lens subunit F1 to the third lens subunit F3.

Accordingly, in the first lens unit F, the spherical aberration that occurs when the zoom lens is set at the telephoto end decreases from the third lens subunit F3 to the first lens subunit F1.

In contrast, the maximum height of incidence of the off-axis rays (the height of the rays that are farthest from the optical axis among the off-axis rays) on the lens surface is largest in the first lens subunit F1 when the zoom lens is set at the wide-angle end, and is greatly reduced when the zoom lens is set at the zooming position fz.

The maximum height of incidence of the off-axis rays in the second lens subunit F2 is constantly large when the zoom lens is set between the wide-angle end and the zooming position fz. The maximum height of incidence of the off-axis rays in the third lens subunit F3 is larger when the zoom lens is set at the zooming position fz than when the zoom lens is set at the wide-angle end.

Accordingly, when the zoom lens is set at the wide-angle end, large negative distortion occurs in the first lens subunit F1 having negative refractive power, and when the zoom lens is set at the zooming position fz, large positive distortion occurs in the third lens subunit F3 having positive refractive power.

Further, when the zoom lens is set between the wide-angle end and the zooming position fz, positive distortion occurs in the second lens subunit F2 having the positive refractive power.

Thus, variation of distortion caused by zooming as shown in FIG. 35 occurs. In particular, large positive distortion occurs when the zoom lens is set at the zooming position fz. Accordingly, it is important to correct the distortion. This tendency becomes more significant in zoom lenses having a wider field angle, higher zoom ratio, and smaller size.

As shown in FIG. 32, in the first lens unit F, the height of incidence hz of the off-axis rays that enter the second lens subunit F2 is very large when the zoom lens is set at the zooming position fz.

In the embodiments, the second lens subunit F2 that satisfies Conditional Expression (1) to (3) has at least one aspherical lens surface AS12. When the aspherical lens surface AS12 has negative refractive power, the aspherical lens surface AS12 is shaped such that the negative refractive power increases from the center toward the periphery thereof. When the aspherical lens surface AS12 has positive refractive power, the aspherical lens surface AS12 is shaped such that the positive refractive power decreases from the center toward the periphery thereof. This serves to effectively correct the positive distortion that occurs when the zoom lens is set near the zooming position fz.

This also serves to effectively correct the spherical aberration that occurs when the zoom lens is focused on an object at a very short distance from the lens.

Conditional Expression (1) defines that the ratio of the maximum height of incidence hz of the off-axis rays when the zoom lens is set at the zooming position fz to the maximum height of incidence htinf of the axial rays when the zoom lens is set at the telephoto end and focused on an object at infinity is larger than 0.95. By the second lens subunit F2 satisfying Conditional Expression (1), the positive distortion that occurs when the zoom lens is set at the wide-angle end and the spherical aberration that occurs when the zoom lens is set at the telephoto end are effectively corrected.

If hz/htinf is smaller than the lower limit of the Conditional Expression (1), correction of the positive distortion that occurs when the zoom lens is set at the zooming position fz is insufficient. If hz/htinf larger than the upper limit of the Conditional Expression (1), correction of the negative spherical aberration that occurs when the zoom lens is set at the telephoto end is insufficient.

Conditional Expression (2) defines that the ratio of the maximum height of incidence hw of the off-axis rays when the zoom lens is set at the wide-angle end and focused on an object at infinity to the maximum height of incidence hz of the off-axis rays when the zoom lens is set at the zooming position fz is small.

By the second lens subunit F2 satisfying Conditional Expression (2), the positive distortion that occurs when the zoom lens is set at the zooming position fz and the negative distortion that occurs when the zoom lens is set at the wide-angle end are effectively corrected.

Because the maximum heights of incidence hw and hz in the second lens subunit F2 are large, the provision of the aspherical surface with negative refractive power that increases toward the periphery thereof serves to effectively correct the positive distortion that occurs when the zoom lens is set at the zooming position fz. However, this in turn increases the negative distortion that occurs when the zoom lens is set at the wide-angle end.

If hw/hz is larger than the upper limit of Conditional Expression (2), the negative distortion that occurs when the zoom lens is set at the wide-angle end increases. If hw/hz is smaller than the lower limit of Conditional Expression (2), correction of the positive distortion that occurs when the zoom lens is set at the zooming position fz is insufficient.

Conditional Expression (3) defines an appropriate ratio of the height of incidence of the axial rays onto the lens surfaces when the zoom lens is set at the telephoto end and focused on an object at infinity to the height of incidence of the axial rays onto the lens surface when the zoom lens is set at the telephoto end and focused on an object at a very short distance, in the second lens subunit F2, for effectively correcting variation of the spherical aberration that occurs when the zoom lens is set at the telephoto end and focused on an object at a very short distance.

As shown in FIG. 36, the second lens subunit F2 moves toward the image side when the zoom lens is focused on an object at a very short distance. The first lens subunit F1 has negative refractive power and diverges the beams of the axial rays exiting therefrom. Thus, when the zoom lens is focused on an object at a very short distance, negative spherical aberration remains for the following reasons:

(i) The height of incidence of the axial rays on the first lens subunit F1 having negative refractive power decreases, and the amount of positive spherical aberration that occurs in the first lens subunit F1 decreases.

(ii) The height of incidence of the axial rays on the second lens subunit F2 having positive refractive power increases, and the amount of the negative spherical aberration that occurs in the second lens subunit F2 increases.

In the embodiments, htinf is the maximum height of incidence of the axial rays onto the lens surfaces of the second lens subunit F2 when the zoom lens is set at the telephoto end and focused on an object at infinity, and htmod is the maximum height of incidence of the axial rays onto the lens surfaces when the zoom lens is set at the telephoto end and focused on an object at a very short distance.

The second lens subunit F2 that satisfies both "htmod>htinf" and Conditional Expression (3) has at least one aspherical lens surface AS12. When the aspherical lens surface AS12 has positive refractive power, the aspherical lens surface AS12 is shaped such that the positive refractive power decreases from the center toward the periphery thereof. When the aspherical lens surface AS12 has negative refractive power, the aspherical lens surface AS12 is shaped such that the negative refractive power increases from the center toward the periphery thereof.

Thus, the negative spherical aberration that occurs when the zoom lens is focused on an object at a very short distance is corrected.

If htmod/htinf is smaller than the lower limit of Conditional Expression (3), the negative spherical aberration that occurs when the zoom lens is focused on an object at a very short distance increases.

It is more desirable that the value ranges of Conditional Expressions (1) and (3) be set as follows:

$$1.06 < hz/htinf < 1.45 \tag{1a}$$

$$htmod/htinf < 1.030 \tag{3a}$$

It is desirable that the shape of the aspherical surface provided in the second lens subunit F2 satisfies at least one of the following conditions:

$$0.0025 < |\Delta 10/f1| < 0.0550 \tag{4}$$

$$0.0018 < |\Delta 9/f1| < 0.0360 \tag{5}$$

$$0.0005 < |\Delta 7/f1| < 0.0130 \tag{6}$$

where $\Delta 10$, $\Delta 9$, and $\Delta 7$ are the amount of asphericity in the aspherical lens surface AS12 at positions corresponding to 100%, 90%, and 70% of the effective diameter of the lens, respectively; and f1 is the focal length of the first lens unit F. Herein, the amount of asphericity means the amount of displacement from the reference sphericity.

Conditional Expressions (4) to (6) define appropriate amounts of asphericity in the aspherical lens surface AS12 for effectively correcting the positive distortion that occurs when the zoom lens is set at the zooming position fz and variation of the spherical aberration that occurs when the zoom lens is set at the telephoto end and focused on an object at a very short distance.

If $|\Delta 10/f1|$, $|\Delta 9/f1|$, and $|\Delta 7/f1|$ are larger than the upper limits of Conditional Expressions (4), (5), and (6), respectively, correction of the positive distortion that occurs when the zoom lens is set at the zooming position fz is excessive, whereby the negative distortion that occurs when the zoom lens is set at the wide-angle end increases. Further, correction of the negative spherical aberration that occurs when the zoom lens is set at the telephoto end and focused on an object at a very short distance is excessive, whereby the positive spherical aberration remains.

If $|\Delta 10/f1|$, $|\Delta 9/f1|$, and $|\Delta 7/f1|$ are smaller than the lower limits of Conditional Expressions (4), (5), and (6), respectively, correction of the positive distortion that occurs when the zoom lens is set at the zooming position fz is insufficient, and correction of the negative spherical aberration that occurs when the zoom lens is set at the telephoto end and focused on an object at a very short distance is insufficient.

It is more desirable that the value ranges of Conditional Expressions (4) to (6) be set as follows:

$$0.0026<|\Delta 10/f1|<0.050 \quad (4a)$$

$$0.0019<|\Delta 9/f1|<0.032 \quad (5a)$$

$$0.0006<|\Delta 7/f1|<0.012 \quad (6a)$$

In the embodiments, it is more desirable that the following conditions be satisfied:

$$0.8<|f11/f1|<1.5 \quad (7)$$

$$2.5<f12/f1<5.5 \quad (8)$$

where f11 is the focal length of the first lens subunit F1; f12 is the focal length of the second lens subunit F2; f1 is the focal length of the first lens unit F; and fw is the focal length of the entire zoom lens set at the wide-angle end.

Conditional Expressions (7) and (8) define the conditions regarding the focal length and the field angle when the zoom lens is set at the wide-angle end, and the power arrangement of the first lens unit F.

Conditional Expression (7) defines an appropriate ratio of the focal length of the first lens subunit F1 to the focal length of the first lens unit F for minimizing the negative distortion that occurs when the zoom lens is set at the wide-angle end, while reducing the size of the first lens unit F.

If |f11/f1| is larger than the upper limit of Conditional Expression (7), the refractive power of the first lens subunit F1 decreases. To reduce the negative distortion that occurs when the zoom lens is set at the wide-angle end, the size of the first lens unit F needs to be increased.

If |f11/f1| is smaller than the lower limit of Conditional Expression (7), the refractive power of the first lens subunit F1 increases. Although this is desirable in reducing the size of the first lens unit F, the negative distortion that occurs when the zoom lens is set at the wide-angle end increases.

Conditional Expression (8) defines an appropriate ratio of the focal length of the second lens subunit F2 to the focal length of the first lens unit F. This minimizes variation of the spherical aberration that occurs when the zoom lens is focused on an object at a very short distance, while reducing the amount by which the second lens subunit F2 advances during focusing and reducing the size of the first lens unit F.

If f12/f1 is larger than the upper limit of Conditional Expression (8), the refractive power of the second lens subunit F2 decreases. Although variation of the spherical aberration that occurs when the zoom lens is set at the telephoto end and focused on an object at a very short distance decreases, the amount by which the second lens subunit F2 advances increases. This results in an increase in size of the first lens unit F.

If f12/f1 is smaller than the lower limit of Conditional Expression (8), the refractive power of the second lens subunit F2 increases. This reduces the amount by which the second lens subunit F2 advances, which is desirable to reduce the size of the first lens unit F. However, the variation of the spherical aberration that occurs when the zoom lens is set at the telephoto end and focused on an object at a very short distance increases.

It is further desirable that the value ranges of Conditional Expressions (7) and (8) be set as follows:

$$0.90<|f11/f1|<1.40 \quad (7a)$$

$$2.72<f12/f1<5.30 \quad (8a)$$

When the aspherical lens surface AS11 has positive refractive power, the aspherical lens surface AS11 is shaped such that the positive refractive power increases from the center toward the periphery thereof.

When the aspherical lens surface AS11 has negative refractive power, the aspherical lens surface AS11 is shaped such that the negative refractive power decreases from the center toward the periphery thereof.

When the first lens subunit F1 has at least one aspherical lens surface AS11, it is desirable that the following conditions be satisfied:

$$0.05<|\Delta 10/f1|<0.20 \quad (9)$$

$$0.03<|\Delta 9/f1|<0.14 \quad (10)$$

$$0.01<|\Delta 7/f1|<0.06 \quad (11)$$

where $\Delta 10$, $\Delta 9$, and $\Delta 7$ are the amount of asphericity in the aspherical lens surface AS11 at positions corresponding to 100%, 90%, and 70% of the effective diameter of the lens, respectively; and f1 is the focal length of the first lens unit F.

Conditional Expressions (9) to (11) define conditions for further improving variation of distortion caused by zooming, by correcting the negative distortion that occurs when the zoom lens is set at the wide-angle end with the aspherical surface provided in the first lens subunit F1.

In the below-described Numerical Examples 2 to 6, the first lens subunit F1 has the aspherical surface that satisfies Conditional Expressions (9) to (11).

As shown in FIGS. 31 to 33, in the first lens subunit F1, the height of incidence hw of the off-axial rays having the maximum field angle is large when the zoom lens is set at the wide-angle end, and the height of incidence hz of the off-axial rays having the maximum field angle is small when the zoom lens is set at the zooming position fz. Thus, the provision of the aspherical surface with positive refractive power that increases from the center toward the periphery thereof, in other words, the aspherical surface with negative refractive power that decreases from the center toward the periphery thereof, serves to effectively correct the negative distortion that occurs when the zoom lens is set at the wide-angle end.

The combination of the aspherical surface in the first lens subunit F1 and the aspherical surface in the second lens subunit F2 serves to effectively correct the negative distortion that occurs when the zoom lens is set at the wide-angle end, and the positive distortion that occurs when the zoom lens is set at the zooming position fz. Accordingly, variation of distortion caused by zooming is minimized.

By appropriately setting the amount of asphericity in the aspherical surface of the first lens subunit F1 according to Conditional Expressions (9) to (11), the negative distortion that occurs when the zoom lens is set at the wide-angle end is effectively corrected.

If |$\Delta 10$/f1|, |$\Delta 9$/f1|, and |$\Delta 7$/f1| are larger than the upper limits of Conditional Expressions (9), (10), and (11), respectively, the amount of asphericity increases excessively. This increases curvature of field and astigmatism that occur when the zoom lens is set at the wide-angle end.

If |$\Delta 10$/f1|, |$\Delta 9$/f1|, and |$\Delta 7$/f1| are smaller than the lower limit of Conditional Expressions (9), (10), and (11), respectively, correction of the negative distortion that occurs when the zoom lens is set at the wide-angle end is insufficient.

It is further desirable that the value ranges of Conditional Expressions (9) to (11) be set as follows:

$$0.06<|\Delta 10/f1|<0.18 \tag{9a}$$

$$0.035<|\Delta 9/f1|<0.130 \tag{10a}$$

$$0.012<|\Delta 7/f1|<0.055 \tag{11a}$$

As has been described, in the four-unit zoom lens using a three-unit inner-focus system according to the embodiments, the position and shape of the aspherical surface provided in the second lens subunit F2 for focusing are appropriately set. This serves to effectively correct the positive distortion that occurs when the zoom lens is set near the zooming position $Z^{1/4}$ and variation of the spherical aberration that occurs when the zoom lens is set at the telephoto end and focused on an object at a very short distance.

The four-unit zoom lens according to the embodiments has high optical performance over the entire zoom range and focusing range (object distance range), with an F number in the range from about 1.7 to 2.2, a field angle 2ω in the range from about 93° to 115°, and a zoom ratio in the range from about 7× to 15×. In particular, the four-unit zoom lens has high optical performance with a minimum shooting distance in the range from about 0.2 m to 0.5 m.

When the zoom lens of the present invention is used in an image pickup apparatus, it is desirable that the following condition be satisfied:

$$0.32<fw/IS<0.47 \tag{12}$$

where IS is the effective diameter of an image pickup element.

Conditional Expression (12) defines an appropriate ratio of the focal length fw of the entire zoom lens set at the wide-angle end to the effective diameter IS of the image pickup element. This is the condition for using an aspherical surface, when the zoom lens of the present invention is used in an image pickup apparatus.

If fw/IS is larger than the upper limit of Conditional Expression (12), the field angle when the zoom lens is set at the wide-angle end is small, whereby the aberration correction effect produced by the aspherical surface of the present invention is very small.

If fw/IS is smaller than the lower limit of Conditional Expression (12), the field angle when the zoom lens is set at the wide-angle end is too large, whereby correction of the negative distortion that occurs when the zoom lens is set at the wide-angle end is difficult.

It is more desirable that the value ranges of Conditional Expression (12) be set as follows:

$$0.34<fw/IS<0.45 \tag{12a}$$

Now, the characteristics of the zoom lens according to the first to sixth embodiments will be described.

First Embodiment

FIG. 1 is a sectional view of a zoom lens according to a first embodiment (Numerical Example 1), when set at the wide-angle end. The zoom lens according to the first embodiment has a zoom ratio of 13× and a field angle (photographing field angle) 2ω at the wide-angle end of 99.6°.

Hereinafter, i is the lens surface or optical surface (surface) counted from the object side, and Ri is the i-th lens surface or optical surface.

The lens surfaces R1 to R20 constitute the first lens unit (front lens unit) F that does not move during zooming. The lens surfaces R1 to R8 constitute the first lens subunit F1 that does not move during focusing and has negative refractive power.

The lens surfaces R9 and R10 constitute the second lens subunit F2 that moves toward the image plane to perform focusing when the zoom lens shifts focus from an object at infinity to an object at a very short distance, and has positive refractive power.

The minimum shooting distance of the zoom lens according to the first embodiment is 0.3 m from the top of the lens surface R1, and the amount by which the second lens subunit F2 advances toward the image side at this time is 3.42 mm.

The lens surfaces R11 to R20 constitute the third lens subunit F3 that does not move during focusing and has positive refractive power. The lens surfaces R21 to R29 constitute the second lens unit (variator) V that moves monotonically (monotonously) toward the image plane to perform zooming, when the zoom lens zooms from the wide-angle end to the telephoto end.

The lens surfaces R30 to R32 constitute the third lens unit (compensator) C that corrects variation of the image point caused by zooming and has negative refractive power. The third lens unit C moves toward the object side along the optical axis in a manner traveling along a convex-arc-shaped locus, when the zoom lens zooms from the wide-angle end to the telephoto end. The SP (33) is the stop. The lens surfaces R34 to R50 constitute the fourth lens unit (relay unit) R that forms an image. The optical surfaces (surface) R51 to R53 constitute a glass block that is equivalent to a color separation prism.

The first lens subunit F1 includes, in order from the object side to the image side, a meniscus negative lens (concave lens) with the convex surface facing the object side, a meniscus negative lens with the convex surface facing the object side, a double concave negative lens with a surface having a larger curvature facing the object side, and a double convex positive lens with a surface having a larger curvature facing the object side.

Herein, the phrase "a surface having a larger curvature facing the object side" is used in comparison with the surface facing the image side.

The second lens subunit F2 includes a meniscus positive lens with the convex surface facing the image side.

The third lens subunit F3 includes, in order from the object side to the image side, a cemented lens consisting of a meniscus positive lens with the convex surface facing the image side and a meniscus negative lens with the convex surface facing the image side, a cemented lens consisting of a meniscus negative lens with the convex surface facing the object side and a double convex positive lens, a double convex positive lens, and a meniscus positive lens with the convex surface facing the object side.

The lens surface R10 according to Numerical Example 1 is an aspherical surface with positive refractive power that decreases toward the periphery of the lens. The values related to the shape of the aspherical surface are shown in Numerical Example 1.

Second Embodiment

FIG. 6 is a sectional view of a zoom lens according to a second embodiment, when set at the wide-angle end. The zoom lens according to the second embodiment has a zoom ratio of 11× and a field angle 2ω at the wide-angle end of 99.0°. The lens surfaces R1 to R20 constitute the first lens unit F that does not move during zooming.

The lens surfaces R1 to R8 constitute the first lens subunit F1 that does not move during focusing and has negative refractive power.

The lens surfaces R9 to R13 constitute the second lens subunit F2 that moves toward the image plane to perform focusing when the zoom lens shifts focus from an object at infinity to an object at a very short distance, and has positive refractive power. The minimum shooting distance of the zoom lens according to the second embodiment is 0.3 m from the top of the lens surface R1, and the amount by which the second lens subunit F2 advances toward the image side at this time is 2.40 mm.

The lens surfaces R14 to R20 constitute the third lens subunit F3 that does not move during focusing and has positive refractive power. The lens surfaces R21 to R29 constitute the second lens unit (variator) V that moves monotonically (monotonously) toward the image plane to perform zooming, when the zoom lens zooms from the wide-angle end to the telephoto end. The lens surfaces R30 to R32 constitute the third lens unit (compensator) C that corrects variation of the image point caused by zooming and has negative refractive power. The third lens unit C moves toward the object side along the optical axis in a manner traveling along a convex-arc-shaped locus, when the zoom lens zooms from the wide-angle end to the telephoto end.

The SP (33) is the stop. The lens surfaces R34 to R50 constitute the fourth lens unit (relay unit) R that forms an image. The optical surfaces (surface) R51 to R53 constitute a glass block that is equivalent to a color separation prism.

The first lens subunit F1 includes, in order from the object side to the image side, a meniscus negative lens with the convex surface facing the object side, a meniscus negative lens with the convex surface facing the object side, a double concave negative lens with a surface having a larger curvature facing the object side, and a double convex positive lens with a surface having a larger curvature facing the object side.

The second lens subunit F2 includes, in order from the object side to the image side, a meniscus positive lens with the convex surface facing the image side, and a cemented lens consisting of a double convex positive lens and a meniscus negative lens with the convex surface facing the image side.

The third lens subunit F3 includes, in order from the object side to the image side, a cemented lens consisting of a meniscus negative lens with the convex surface facing the object side and a double convex positive lens, a double convex positive lens, and a meniscus positive lens with the convex surface facing the object side.

The lens surface R1 according to the second embodiment is an aspherical surface with positive refractive power that increases toward the periphery of the lens. The lens surface R10 is an aspherical surface with positive refractive power that decreases toward the periphery of the lens. The values related to the aspherical surfaces are shown in Numerical Example 2.

Third Embodiment

FIG. 11 is a sectional view of a zoom lens according to a third embodiment, when set at the wide-angle end. The zoom lens according to the third embodiment has a zoom ratio of 12× and a field angle 2ω at the wide-angle end of 100.8°. The lens surfaces R1 to R20 constitute the first lens unit F that does not move during zooming. The lens surfaces R1 to R8 constitute the first lens subunit F1 that does not move during focusing and has negative refractive power. The lens surfaces R9 to R13 constitute the second lens subunit F2 that moves toward the image plane to perform focusing when the zoom lens shifts focus from an object at infinity to an object at a very short distance, and has positive refractive power.

The minimum shooting distance of the zoom lens according to the third embodiment is 0.4 m from the top of the lens surface R1, and the amount by which the second lens subunit F2 advances toward the image side at this time is 3.80 mm. The lens surfaces R14 to R20 constitute the third lens subunit F3 that does not move during focusing and has positive refractive power. The lens surfaces R21 to R29 constitute the second lens unit (variator) V that moves monotonically (monotonously) toward the image plane to perform zooming, when the zoom lens zooms from the wide-angle end to the telephoto end. The lens surfaces R30 to R32 constitute the third lens unit (compensator) C that corrects variation of the image point caused by zooming and has negative refractive power. The third lens unit C moves toward the object side along the optical axis in a manner traveling along a convex-arc-shaped locus, when the zoom lens zooms from the wide-angle end to the telephoto end.

The SP (33) is the stop. The lens surfaces R34 to R50 constitute the fourth lens unit (relay unit) R that forms an image. The optical surfaces (surface) R51 to R53 constitute a glass block that is equivalent to a color separation prism.

The first lens subunit F1 includes, in order from the object side to the image side, a meniscus negative lens with the convex surface facing the object side, a meniscus negative lens with the convex surface facing the object side, a double concave negative lens with a surface having a larger curvature facing the object side, and a double convex positive lens with a surface having a larger curvature facing the object side.

The second lens subunit F2 includes, in order from the object side to the image side, a double convex positive lens with a surface having a larger curvature facing the image side, and a cemented lens consisting of a double convex positive lens and a meniscus negative lens with the convex surface facing the image side.

The third lens subunit F3 includes, in order from the object side to the image side, a cemented lens consisting of a meniscus negative lens with the convex surface facing the object side and a double convex positive lens, a double convex positive lens, and a double convex positive lens.

The lens surface R1 according to the third embodiment is an aspherical surface with positive refractive power that increases toward the periphery of the lens. The lens surface R13 is an aspherical surface with positive refractive power that decreases toward the periphery of the lens. The values related to the aspherical surfaces are shown in Numerical Example 3.

Fourth Embodiment

FIG. 16 is a sectional view of a zoom lens according to a fourth embodiment, when set at the wide-angle end. The zoom lens according to the fourth embodiment has a zoom ratio of 8× and a field angle 2ω at the wide-angle end of 110.0°. The lens surfaces R1 to R20 constitute the first lens unit F that does not move during zooming. The lens surfaces R1 to R8 constitute the first lens subunit F1 that does not move during focusing and has negative refractive power.

The lens surfaces R9 and R10 constitute the second lens subunit F2 that moves toward the image plane to perform focusing when the zoom lens shifts focus from an object at infinity to an object at a very short distance, and has positive refractive power.

The minimum shooting distance of the zoom lens according to the fourth embodiment is 0.3 m from the top of the lens surface R1, and the amount by which the second lens subunit F2 advances toward the image side at this time is 2.72 mm. The lens surfaces R11 to R20 constitute the third lens subunit F3 that does not move during focusing and has positive refractive power. The lens surfaces R21 to R29 constitute the second lens unit (variator) V that moves monotonically (monotonously) toward the image plane to perform zooming, when the zoom lens zooms from the wide-angle end to the telephoto end. The lens surfaces R30 to R32 constitute the third lens unit (compensator) C that corrects variation of the image point caused by zooming and has negative refractive power. The third lens unit C moves toward the object side along the optical axis in a manner traveling along a convex-arc-shaped locus, when the zoom lens zooms from the wide-angle end to the telephoto end. The SP (33) is the stop. The lens surfaces R34 to R50 constitute the fourth lens unit (relay unit) R that forms an image. The optical surfaces (surface) R51 to R53 constitute a glass block that is equivalent to a color separation prism.

The first lens subunit F1 includes, in order from the object side to the image side, a meniscus negative lens with the convex surface facing the object side, a meniscus negative lens with the convex surface facing the object side, a double concave negative lens with a surface having a larger curvature facing the object side, and a double convex positive lens with a surface having a larger curvature facing the object side.

The second lens subunit F2 includes a double convex positive lens with a surface having a larger curvature facing the image side.

The third lens subunit F3 includes, in order from the object side to the image side, a cemented lens consisting of a double convex positive lens and a meniscus negative lens with the convex surface facing the image side, a cemented lens consisting of a meniscus negative lens with the convex surface facing the object side and a double convex positive lens, a double convex positive lens, and a meniscus positive lens with the convex surface facing the object side.

The lens surface R1 according to the fourth embodiment is an aspherical surface with positive refractive power that increases toward the periphery of the lens. The lens surface R10 is an aspherical surface with positive refractive power that decreases toward the periphery of the lens. The values related to the aspherical surfaces are shown in Numerical Example 4.

Fifth Embodiment

FIG. 21 is a sectional view of a zoom lens according to a fifth embodiment, when set at the wide-angle end. The zoom lens according to the fifth embodiment has a zoom ratio of 13× and a field angle 2ω at the wide-angle end of 101.4°. The lens surfaces R1 to R20 constitute the first lens unit F that does not move during zooming. The lens surfaces R1 to R8 constitute the first lens subunit F1 that does not move during focusing and has negative refractive power. The lens surfaces R9 and R10 constitute the second lens subunit F2 that moves toward the image plane to perform focusing when the zoom lens shifts focus from an object at infinity to an object at a very short distance, and has positive refractive power.

The minimum shooting distance of the zoom lens according to the fifth embodiment is 0.3 m from the top of the lens surface R1, and the amount by which the second lens subunit F2 advances toward the image side at this time is 3.99 mm. The lens surfaces R11 to R20 constitute the third lens subunit F3 that does not move during focusing and has positive refractive power.

The lens surfaces R21 to R29 constitute the second lens unit (variator) V that moves monotonically (monotonously) toward the image plane to perform zooming, when the zoom lens zooms from the wide-angle end to the telephoto end. The lens surfaces R30 to R32 constitute the third lens unit (compensator) C that corrects variation of the image point caused by zooming and has negative refractive power. The third lens unit C moves toward the object side along the optical axis in a manner traveling along a convex-arc-shaped locus, when the zoom lens zooms from the wide-angle end to the telephoto end. The SP (33) is the stop. The lens surfaces R34 to R50 constitute the fourth lens unit (relay unit) R that forms an image. The optical surfaces (surface) R51 to R53 constitute a glass block that is equivalent to a color separation prism.

The first lens subunit F1 includes, in order from the object side to the image side, a meniscus negative lens with the convex surface facing the object side, a meniscus negative lens with the convex surface facing the object side, a meniscus negative lens with the convex surface facing the image side, and a double convex positive lens with a surface having a larger curvature facing the object side.

The second lens subunit F2 includes a double convex positive lens with a surface having a larger curvature facing the image side.

The third lens subunit F3 includes, in order from the object side to the image side, a cemented lens consisting of a double convex positive lens and a meniscus negative lens with the convex surface facing the image side, a cemented lens consisting of a meniscus negative lens with the convex surface facing the object side and a double convex positive lens, a double convex positive lens, and a double convex positive lens.

The lens surface R1 according to the fifth embodiment is an aspherical surface with positive refractive power that increases toward the periphery of the lens. The lens surface R10 is an aspherical surface with positive refractive power that decreases toward the periphery of the lens. The values related to the aspherical surfaces are shown in Numerical Example 5.

Further, in the third lens subunit F3, the lens surface R13 is an aspherical surface with positive refractive power that decreases toward the periphery of the lens. This serves to more effectively correct the positive distortion that occurs when the zoom lens is set at the zooming position fz.

Referring to FIG. 32, the height of incidence hz of the off-axial rays is relatively large at the third lens subunit F3, though it is smaller than the second lens subunit F2, when the zoom lens is set at the zooming position fz. Thus, the third lens subunit F3 has an effect to correct positive distortion. When the aspherical surface provided in the third lens subunit F3 is formed on a positive refractive surface, the aspherical surface is shaped such that the positive refractive power decreases toward the periphery of the lens. When the aspherical surface provided in the third lens subunit F3 is formed on a negative refractive surface, the aspherical surface is shaped such that the negative refractive power increases toward the periphery of the lens.

The combination of the aspherical surface in the third lens subunit F3 and the aspherical surface in the second lens subunit F2 serves to effectively correct the positive distortion that occurs when the zoom lens is set at the zooming position fz.

Sixth Embodiment

FIG. 26 is a sectional view of a zoom lens according to a sixth embodiment, when set at the wide-angle end. The zoom lens according to the sixth embodiment has a zoom ratio of 13× and a field angle 2ω when the zoom lens is set at the wide-angle end of 104.0°. The lens surfaces R1 to R20 constitute the first lens unit F that does not move during zooming. The lens surfaces R1 to R8 constitute the first lens subunit F1 that does not move during focusing and has negative refractive power. The lens surfaces R9 and R10 constitute the second lens subunit F2 that moves toward the image plane to perform focusing when the zoom lens shifts focus from an object at infinity to an object at a very short distance, and has positive refractive power.

The minimum shooting distance of the zoom lens according to the sixth embodiment is 0.3 m from the top of the lens surface R1, and the amount by which the second lens subunit F2 advances toward the image side at this time is 4.11 mm. The lens surfaces R11 to R20 constitute the third lens subunit F3 that does not move during focusing and has positive refractive power. The lens surfaces R21 to R29 constitute the second lens unit (variator) V that moves monotonically (monotonously) toward the image plane to perform zooming, when the zoom lens zooms from the wide-angle end to the telephoto end.

The lens surfaces R30 to R32 constitute the third lens unit (compensator) C that corrects variation of the image point caused by zooming and has negative refractive power. The third lens unit C moves toward the object side along the optical axis in a manner traveling along a convex-arc-shaped locus, when the zoom lens zooms from the wide-angle end to the telephoto end.

The SP (33) is the stop. The lens surfaces R34 to R50 constitute the fourth lens unit (relay unit) R that forms an image. The optical surfaces (surface) R51 to R53 constitute a glass block that is equivalent to a color separation prism.

The first lens subunit F1 includes, in order from the object side to the image side, a meniscus negative lens with the convex surface facing the object side, a meniscus negative lens with the convex surface facing the object side, a meniscus negative lens with the convex surface facing the image side, and a double convex positive lens with a surface having a larger curvature facing the object side.

The second lens subunit F2 includes a double convex positive lens with a surface having a larger curvature facing the image side.

The third lens subunit F3 includes, in order from the object side to the image side, a cemented lens consisting of a double convex positive lens and a meniscus negative lens with the convex surface facing the image side, a cemented lens consisting of a meniscus negative lens with the convex surface facing the object side and a double convex positive lens, a double convex positive lens, and a double convex positive lens.

The lens surface R1 according to the sixth embodiment is an aspherical surface with positive refractive power that increases toward the periphery of the lens. The lens surface R10 is an aspherical surface with positive refractive power that decreases toward the periphery of the lens. The values related to the aspherical surfaces are shown in Numerical Example 6.

Further, in the third lens subunit F3, the lens surface R18 is an aspherical surface with positive refractive power that increases toward the periphery of the lens. This serves to more effectively correct variation of spherical aberration caused by zooming.

Referring to FIG. 33, the maximum height of incidence htinf of the axial rays is large at the third lens subunit F3, when the zoom lens is set at the telephoto end. Thus, the use of the aspherical surface serves to effectively correct the spherical aberration that occurs when the zoom lens is set at the telephoto end.

On the other hand, to correct the positive distortion that occurs when the zoom lens is set at the zooming position fz with the aspherical surface of the second lens subunit F2, the amount of asphericity has to be increased. This, in turn, produces large negative spherical aberration when the zoom lens is set at the telephoto end.

To counter this, when the aspherical surface provided in the third lens subunit F3 is formed on a positive refractive surface, the aspherical surface is shaped such that the positive refractive power increases toward the periphery of the lens.

When the aspherical surface provided in the third lens subunit F3 is formed on a negative refractive surface, the aspherical surface is shaped such that the negative refractive power decreases toward the periphery of the lens.

The combination of the aspherical surface in the third lens subunit F3 and the aspherical surface in the second lens subunit F2 serves to effectively correct variation of spherical aberration, which occurs when the zoom lens is set at the telephoto end, caused by zooming.

Numerical Examples 1 to 6 corresponding to the first to sixth embodiments of the present invention are shown below. In the numerical examples, i is the surface counted from the object side, Ri is the radius of curvature of the i-th surface counted from the object side, Di is the distance between the i-th surface and the i+1-th surface counted from the object side, Ni is the refractive index of the i-th optical component, and vi is the Abbe number of the i-th optical component.

In addition, f, Fno, and 2ω are the focal length, the F number, and the field angle, respectively, of the entire zoom lens when focused on an object at infinity.

The last three surfaces are glass blocks, such as filters.

The shape of the aspherical surface is expressed as follows:

$$X = \frac{H^2/R}{1+\sqrt{1-(1+k)(H/R)^2}} + BH^4 + CH^6 + DH^8 + EH^{10} + FH^{12} + A'H^3 + B'H^5 + C'H^7 + D'H^9 + E'H^{11}$$

[Expression 1]

where the optical axis direction is defined as an X axis, a direction perpendicular to the optical axis is defined as an H axis, a direction in which light travels is defined as positive, R is the paraxial radius of curvature, k is the conic constant, and B, C, D, E, F, A', B', C', D', and E' are the aspherical surface coefficients. For example, E-Z is $\times 10^{-Z}$.

Table 7 lists Conditional Expressions (1) to (12) and the corresponding values in Numerical Examples 1 to 6 of the present invention.

NUMERICAL EXAMPLE 1

| f = 4.65~60.45 Fno = 1.9~2.8 2ω = 99.6°~10.4° | | | |
|---|---|---|---|
| R1 = 91.51 | D1 = 2.50 | N1 = 1.77250 | v1 = 49.6 |
| R2 = 33.03 | D2 = 18.20 | | |
| R3 = 211.83 | D3 = 1.80 | N2 = 1.81600 | v2 = 46.6 |
| R4 = 54.20 | D4 = 13.70 | | |
| R5 = −82.25 | D5 = 1.70 | N3 = 1.81600 | v3 = 46.6 |
| R6 = 628.49 | D6 = 0.20 | | |
| R7 = 110.10 | D7 = 6.61 | N4 = 1.80518 | v4 = 25.4 |
| R8 = −1149.21 | D8 = 5.20(∞) | | |
| R9 = −134.50 | D9 = 8.20 | N5 = 1.60311 | v5 = 60.6 |
| R10 = −52.47 | D10 = 5.18(∞) | | |
| R11 = −461.39 | D11 = 9.91 | N6 = 1.43875 | v6 = 95.0 |

-continued f = 4.65~60.45 Fno = 1.9~2.8 2ω = 99.6°~10.4°

| | | | |
|---|---|---|---|
| R12 = −55.55 | D12 = 1.65 | N7 = 1.80518 | ν7 = 25.4 |
| R13 = −85.34 | D13 = 3.06 | | |
| R14 = 75.56 | D14 = 1.65 | N8 = 1.83400 | ν8 = 37.2 |
| R15 = 49.42 | D15 = 18.80 | N9 = 1.43875 | ν9 = 95.0 |
| R16 = −80.25 | D16 = 0.20 | | |
| R17 = 255.38 | D17 = 5.83 | N10 = 1.43387 | ν10 = 95.1 |
| R18 = −182.79 | D18 = 0.20 | | |
| R19 = 52.84 | D19 = 5.34 | N11 = 1.60311 | ν11 = 60.6 |
| R20 = 108.89 | D20 = VARIABLE | | |
| R21 = 20.56 | D21 = 0.80 | N12 = 1.88300 | ν12 = 40.8 |
| R22 = 13.51 | D22 = 7.04 | | |
| R23 = −287.01 | D23 = 0.80 | N13 = 1.88300 | ν13 = 40.8 |
| R24 = 21.79 | D24 = 4.52 | | |
| R25 = −41.24 | D25 = 4.78 | N14 = 1.80518 | ν14 = 25.4 |
| R26 = −12.78 | D26 = 0.85 | N15 = 1.88300 | ν15 = 40.8 |
| R27 = −91.88 | D27 = 0.21 | | |
| R28 = 42.81 | D28 = 2.55 | N16 = 1.64769 | ν16 = 33.8 |
| R29 = −174.82 | D29 = VARIABLE | | |
| R30 = −32.71 | D30 = 0.80 | N17 = 1.73400 | ν17 = 51.5 |
| R31 = 41.75 | D31 = 2.16 | N18 = 1.80810 | ν18 = 22.8 |
| R32 = 1305.74 | D32 = VARIABLE | | |
| R33 = (STOP) | D33 = 1.46 | | |
| R34 = 248.93 | D34 = 3.79 | N19 = 1.67003 | ν19 = 47.2 |
| R35 = −50.22 | D35 = 0.16 | | |
| R36 = 104.49 | D36 = 2.54 | N20 = 1.64000 | ν20 = 60.1 |
| R37 = −343.35 | D37 = 0.16 | | |
| R38 = 55.38 | D38 = 6.44 | N21 = 1.51633 | ν21 = 64.1 |
| R39 = −36.71 | D39 = 1.00 | N22 = 1.88300 | ν22 = 40.8 |
| R40 = −276.68 | D40 = 28.00 | | |
| R41 = 234.00 | D41 = 4.02 | N23 = 1.56732 | ν23 = 42.8 |
| R42 = −37.57 | D42 = 2.03 | | |
| R43 = −62.50 | D43 = 1.00 | N24 = 1.88300 | ν24 = 40.8 |
| R44 = 17.88 | D44 = 9.22 | N25 = 1.51633 | ν25 = 64.1 |
| R45 = −39.05 | D45 = 0.36 | | |
| R46 = 75.57 | D46 = 7.28 | N26 = 1.48749 | ν26 = 70.2 |
| R47 = −22.00 | D47 = 1.00 | N27 = 1.88300 | ν27 = 40.8 |
| R48 = −126.97 | D48 = 0.29 | | |
| R49 = 71.13 | D49 = 8.18 | N28 = 1.48749 | ν28 = 70.2 |
| R50 = −25.40 | D50 = 4.16 | | |
| R51 = ∞ | D51 = 33.00 | N29 = 1.60859 | ν29 = 46.4 |
| R52 = ∞ | D52 = 13.20 | N30 = 1.51680 | ν30 = 64.2 |
| R53 = ∞ | | | |

TABLE 1

| VARIABLE | FOCAL LENGTH | | |
|---|---|---|---|
| DISTANCE | 4.65 | 8.83 | 60.45 |
| D20 | 0.96 | 18.47 | 43.49 |
| D29 | 38.68 | 18.60 | 5.67 |
| D32 | 10.90 | 13.47 | 1.38 |

| VARIABLE DISTANCE DURING FOCUSING | INFINITY | MINIMUM (0.3 m FROM TOP OF R1) |
|---|---|---|
| R8 | 5.20 | 8.62 |
| R10 | 5.18 | 1.76 |

ASPHERICAL SURFACE
R1 SURFACE
REFERENCE SPHERICITY R = −54.047

| ASPHERICAL SURFACE COEFFICIENT | AMOUNT OF ASPHERICITY (R1) | h | Δ |
|---|---|---|---|
| K = −1.776E−01 | 70% | (22.43 mm) | −0.08 mm |
| A' = 1.442E−07 | 90% | (28.84 mm) | −0.25 mm |
| B = 6.807E−08 | 100% | (32.04 mm) | −0.40 mm |
| B' = 1.526E−09 | | | |
| C = 5.634E−12 | | | |
| C' = 1.692E−12 | | | |
| D = −1.221E−15 | | | |
| D' = 7.685E−17 | | | |
| E = −8.064E−18 | | | |
| E' = 6.959E−19 | | | |
| F = −4.864E−20 | | | |

NUMERICAL EXAMPLE 2 f = 4.70~51.70 Fno = 1.9~2.45 2ω = 99.0°~12.1°

| | | | |
|---|---|---|---|
| R1 = 165.85 | D1 = 2.50 | N1 = 1.77250 | ν1 = 49.6 |
| R2 = 35.66 | D2 = 17.14 | | |
| R3 = 313.07 | D3 = 1.85 | N2 = 1.75500 | ν2 = 52.3 |
| R4 = 73.03 | D4 = 14.14 | | |
| R5 = −71.15 | D5 = 1.75 | N3 = 1.81600 | ν3 = 46.6 |
| R6 = 1331.58 | D6 = 0.20 | | |
| R7 = 128.37 | D7 = 5.44 | N4 = 1.76182 | ν4 = 26.5 |
| R8 = −1469.61 | D8 = 2.59(∞) | | |
| R9 = −856.86 | D9 = 7.10 | N5 = 1.62041 | ν5 = 60.3 |
| R10 = −75.56 | D10 = 0.20 | | |
| R11 = 285.54 | D11 = 11.05 | N6 = 1.49700 | ν6 = 81.5 |
| R12 = −71.55 | D12 = 1.65 | N7 = 1.80100 | ν7 = 35.0 |
| R13 = −110.35 | D13 = 5.63(∞) | | |
| R14 = 92.44 | D14 = 1.65 | N8 = 2.00330 | ν8 = 28.3 |
| R15 = 51.21 | D15 = 13.74 | N9 = 1.49700 | ν9 = 81.5 |
| R16 = −212.52 | D16 = 0.20 | | |
| R17 = 105.20 | D17 = 8.26 | N10 = 1.48749 | ν10 = 70.2 |
| R18 = −130.94 | D18 = 0.20 | | |
| R19 = 86.53 | D19 = 4.76 | N11 = 1.62041 | ν11 = 60.3 |
| R20 = 1175.88 | D20 = VARIABLE | | |
| R21 = 30.09 | D21 = 0.75 | N12 = 1.88300 | ν12 = 40.8 |
| R22 = 19.19 | D22 = 2.63 | | |
| R23 = 48.59 | D23 = 0.75 | N13 = 1.88300 | ν13 = 40.8 |
| R24 = 17.03 | D24 = 5.09 | | |
| R25 = −45.84 | D25 = 6.09 | N14 = 1.76182 | ν14 = 26.5 |
| R26 = −11.66 | D26 = 0.80 | N15 = 1.88300 | ν15 = 40.8 |
| R27 = −159.14 | D27 = 0.20 | | |
| R28 = 36.20 | D28 = 2.20 | N16 = 1.78472 | ν16 = 25.7 |
| R29 = 105.94 | D29 = VARIABLE | | |
| R30 = −25.20 | D30 = 0.75 | N17 = 1.77250 | ν17 = 49.6 |
| R31 = 70.19 | D31 = 2.45 | N18 = 1.80810 | ν18 = 22.8 |
| R32 = −111.78 | D32 = VARIABLE | | |
| R33 = (STOP) | D33 = 1.40 | | |
| R34 = 1033.22 | D34 = 3.32 | N19 = 1.58913 | ν19 = 61.1 |
| R35 = −45.38 | D35 = 0.20 | | |
| R36 = −218.81 | D36 = 1.72 | N20 = 1.64850 | ν20 = 53.0 |
| R37 = −152.23 | D37 = 0.20 | | |
| R38 = 46.65 | D38 = 6.50 | N21 = 1.51742 | ν21 = 52.4 |
| R39 = −31.42 | D39 = 1.20 | N22 = 1.83481 | ν22 = 42.7 |
| R40 = −107.01 | D40 = 32.00 | | |
| R41 = 73.44 | D41 = 4.62 | N23 = 1.64850 | ν23 = 53.0 |
| R42 = −44.92 | D42 = 4.99 | | |
| R43 = −37.28 | D43 = 1.20 | N24 = 1.88300 | ν24 = 40.8 |
| R44 = 23.45 | D44 = 6.23 | N25 = 1.51633 | ν25 = 64.1 |
| R45 = −46.99 | D45 = 0.19 | | |
| R46 = 38.25 | D46 = 7.24 | N26 = 1.48749 | ν26 = 70.2 |
| R47 = −23.41 | D47 = 1.20 | N27 = 1.88300 | ν27 = 40.8 |
| R48 = −194.63 | D48 = 0.20 | | |
| R49 = 104.17 | D49 = 4.96 | N28 = 1.62041 | ν28 = 60.3 |
| R50 = −32.10 | D50 = 4.00 | | |

-continued f = 4.70~51.70 Fno = 1.9~2.45 2ω = 99.0°~12.1°

| R51 = ∞ | D51 = 33.00 | N29 = 1.60859 | ν29 = 46.4 |
|---|---|---|---|
| R52 = ∞ | D52 = 13.20 | N30 = 1.51680 | ν30 = 64.2 |
| R53 = ∞ | | | |

TABLE 2

| VARIABLE | FOCAL LENGTH | | |
|---|---|---|---|
| DISTANCE | 4.70 | 8.56 | 51.70 |
| D20 | 0.91 | 17.83 | 43.89 |
| D29 | 42.24 | 22.98 | 5.61 |
| D32 | 7.50 | 9.83 | 1.15 |

| VARIABLE DISTANCE DURING FOCUSING | INFINITY | MINIMUM (0.3 m FROM TOP OF R1) |
|---|---|---|
| R8 | 2.59 | 4.99 |
| R13 | 5.63 | 3.23 |

ASPHERICAL SURFACE
R1 SURFACE
REFERENCE SPHERICITY R = 125.634

| ASPHERICAL SURFACE COEFFICIENT | AMOUNT OF ASPHERICITY (R1) | h | Δ |
|---|---|---|---|
| K = 6.522E+00 | 70% | (29.41 mm) | −0.43 mm |
| A' = −3.403E−06 | 90% | (37.81 mm) | −1.20 mm |
| B = 4.276E−07 | 100% | (42.01 mm) | −1.82 mm |
| B' = 4.238E−09 | | | |
| C = −1.497E−11 | | | |
| C' = −2.566E−12 | | | |
| D = 9.452E−16 | | | |
| D' = 2.510E−16 | | | |
| E = −1.647E−18 | | | |
| E' = 0.000E+00 | | | |
| F = 0.000E+00 | | | |

ASPHERICAL SURFACE
R10 SURFACE
REFERENCE SPHERICITY R = −81.510

| ASPHERICAL SURFACE COEFFICIENT | AMOUNT OF ASPHERICITY (R10) | h | Δ |
|---|---|---|---|
| K = −1.570E+00 | 70% | (22.38 mm) | −0.13 mm |
| A' = −1.049E−08 | 90% | (28.77 mm) | −0.37 mm |
| B = −9.177E−08 | 100% | (31.97 mm) | −0.57 mm |
| B' = 1.183E−08 | | | |
| C = −1.443E−10 | | | |
| C' = −1.921E−11 | | | |
| D = 9.726E−13 | | | |
| D' = −1.346E−14 | | | |
| E = −1.192E−17 | | | |
| E' = 0.000E+00 | | | |
| F = 0.000E+00 | | | |

NUMERICAL EXAMPLE 3 f = 4.55~54.60 Fno = 1.9~2.45 2ω = 100.8°~11.5°

| * R1 = 172.83 | D1 = 2.50 | N1 = 1.81600 | ν1 = 46.6 |
|---|---|---|---|
| R2 = 37.70 | D2 = 17.60 | | |
| R3 = 315.25 | D3 = 1.85 | N2 = 1.77250 | ν2 = 49.6 |
| R4 = 61.14 | D4 = 13.12 | | |
| R5 = −150.43 | D5 = 1.75 | N3 = 1.77250 | ν3 = 49.6 |
| R6 = 433.62 | D6 = 0.20 | | |
| R7 = 93.95 | D7 = 6.59 | N4 = 1.76182 | ν4 = 26.5 |
| R8 = −3262.14 | D8 = 1.67(∞) | | |
| R9 = 1225.16 | D9 = 5.96 | N5 = 1.62041 | ν5 = 60.3 |
| R10 = −117.95 | D10 = 11.00 | | |
| R11 = 803.53 | D11 = 8.41 | N6 = 1.49700 | ν6 = 81.5 |
| R12 = −71.55 | D12 = 1.65 | N7 = 1.80100 | ν7 = 35.0 |
| * R13 = −157.04 | D13 = 4.37(∞) | | |
| R14 = 129.91 | D14 = 1.65 | N8 = 2.00330 | ν8 = 28.3 |
| R15 = 54.95 | D15 = 11.65 | N9 = 1.49700 | ν9 = 81.5 |
| R16 = −246.78 | D16 = 0.20 | | |
| R17 = 126.87 | D17 = 7.22 | N10 = 1.61800 | ν10 = 63.3 |
| R18 = −151.76 | D18 = 0.20 | | |
| R19 = 70.80 | D19 = 7.48 | N11 = 1.61800 | ν11 = 63.3 |
| R20 = −499.53 | D20 = VARIABLE | | |
| R21 = 42.44 | D21 = 0.75 | N12 = 1.88300 | ν12 = 40.8 |
| R22 = 12.77 | D22 = 5.53 | | |
| R23 = −61.16 | D23 = 5.92 | N13 = 1.80518 | ν13 = 25.4 |
| R24 = −12.47 | D24 = 0.80 | N14 = 1.81600 | ν14 = 46.6 |
| R25 = 59.11 | D25 = 0.20 | | |
| R26 = 23.67 | D26 = 3.71 | N15 = 1.53172 | ν15 = 48.8 |
| R27 = −128.93 | D27 = 0.49 | | |
| R28 = −59.77 | D28 = 0.80 | N16 = 1.88300 | ν16 = 40.8 |
| R29 = −125.24 | D29 = VARIABLE | | |
| R30 = −24.91 | D30 = 0.75 | N17 = 1.75500 | ν17 = 52.3 |
| R31 = 71.17 | D31 = 2.45 | N18 = 1.80810 | ν18 = 22.8 |
| R32 = −124.70 | D32 = VARIABLE | | |
| R33 = (STOP) | D33 = 1.40 | | |
| R34 = 137.23 | D34 = 4.32 | N19 = 1.58913 | ν19 = 61.1 |
| R35 = −41.12 | D35 = 0.20 | | |
| R36 = 2263.50 | D36 = 2.25 | N20 = 1.64850 | ν20 = 53.0 |
| R37 = −119.01 | D37 = 0.20 | | |
| R38 = 59.41 | D38 = 6.22 | N21 = 1.51742 | ν21 = 52.4 |
| R39 = −33.24 | D39 = 1.20 | N22 = 1.83481 | ν22 = 42.7 |
| R40 = −23001.92 | D40 = 32.00 | | |
| R41 = 70.09 | D41 = 4.75 | N23 = 1.64850 | ν23 = 53.0 |
| R42 = −48.64 | D42 = 4.23 | | |
| R43 = −48.09 | D43 = 1.20 | N24 = 1.88300 | ν24 = 40.8 |
| R44 = 24.84 | D44 = 6.31 | N25 = 1.51633 | ν25 = 64.1 |
| R45 = −49.81 | D45 = 0.27 | | |
| R46 = 43.67 | D46 = 7.02 | N26 = 1.48749 | ν26 = 70.2 |
| R47 = −24.03 | D47 = 1.20 | N27 = 1.88300 | ν27 = 40.8 |
| R48 = −812.79 | D48 = 1.22 | | |
| R49 = 84.61 | D49 = 5.10 | N28 = 1.62041 | ν28 = 60.3 |
| R50 = −34.53 | D50 = 4.00 | | |
| R51 = ∞ | D51 = 33.00 | N29 = 1.60859 | ν29 = 46.4 |
| R52 = ∞ | D52 = 13.20 | N30 = 1.51680 | ν30 = 64.2 |
| R53 = ∞ | | | |

TABLE 3

| VARIABLE | FOCAL LENGTH | | |
|---|---|---|---|
| DISTANCE | 4.55 | 8.47 | 54.60 |
| D20 | 0.83 | 18.45 | 44.90 |
| D29 | 42.60 | 22.55 | 5.26 |
| D32 | 8.00 | 10.44 | 1.26 |

| VARIABLE DISTANCE DURING FOCUSING | INFINITY | MINIMUM (0.4 m FROM TOP OF R1) |
|---|---|---|
| R8 | 1.67 | 5.47 |
| R13 | 4.37 | 0.57 |

| ASPHERICAL SURFACE R1 SURFACE REFERENCE SPHERICITY R = 124.797 | | | |
|---|---|---|---|
| ASPHERICAL SURFACE COEFFICIENT | AMOUNT OF ASPHERICITY (R1) | h | Δ |
| K = 9.802E+00 | 70% | (30.57 mm) | −0.57 mm |
| A' = −6.691E−06 | 90% | (39.30 mm) | −1.54 mm |
| B = 6.174E−07 | 100% | (43.66 mm) | −2.28 mm |
| B' = 4.035E−09 | | | |
| C = −1.168E−10 | | | |
| C' = −1.461E−12 | | | |
| D = −1.490E−14 | | | |
| D' = 4.759E−16 | | | |
| E = −1.389E−17 | | | |
| E' = 0.000E+00 | | | |
| F = 0.000E+00 | | | |

| ASPHERICAL SURFACE R13 SURFACE REFERENCE SPHERICITY R = −162.591 | | | |
|---|---|---|---|
| ASPHERICAL SURFACE COEFFICIENT | AMOUNT OF ASPHERICITY (R13) | h | Δ |
| K = 9.788E−01 | 70% | (19.65 mm) | −0.02 mm |
| A' = −4.935E−07 | 90% | (25.27 mm) | −0.06 mm |
| B = 1.903E−07 | 100% | (28.07 mm) | −0.09 mm |
| B' = 2.496E−09 | | | |
| C = −5.249E−11 | | | |
| C' = −4.198E−12 | | | |
| D = 1.340E−13 | | | |
| D' = −3.715E−16 | | | |
| E = −2.220E−17 | | | |
| E' = 0.000E+00 | | | |
| F = 0.000E+00 | | | |

NUMERICAL EXAMPLE 4

| f = 3.85~30.8  Fno = 1.9~2.0  2ω = 110.0°~20.2° | | | |
|---|---|---|---|
| * R1 = 165.46 | D1 = 2.50 | N1 = 1.88300 | ν1 = 40.8 |
| R2 = 34.85 | D2 = 18.29 | | |
| R3 = 529.68 | D3 = 1.85 | N2 = 1.75500 | ν2 = 52.3 |
| R4 = 48.30 | D4 = 14.09 | | |
| R5 = −103.40 | D5 = 1.75 | N3 = 1.75500 | ν3 = 52.3 |
| R6 = 169.59 | D6 = 3.33 | | |
| R7 = 108.78 | D7 = 8.50 | N4 = 1.80518 | ν4 = 25.4 |
| R8 = −154.10 | D8 = 0.66(∞) | | |
| R9 = 279.43 | D9 = 9.89 | N5 = 1.51633 | ν5 = 64.1 |
| * R10 = −57.22 | D10 = 9.14(∞) | | |
| R11 = 1124.15 | D11 = 7.15 | N6 = 1.48749 | ν6 = 70.2 |
| R12 = −70.62 | D12 = 1.65 | N7 = 2.00330 | ν7 = 28.3 |
| R13 = −282.24 | D13 = 0.20 | | |
| R14 = 162.11 | D14 = 1.65 | N8 = 2.00330 | ν8 = 28.3 |
| R15 = 48.08 | D15 = 10.17 | N9 = 1.49700 | ν9 = 81.5 |
| R16 = −370.64 | D16 = 0.20 | | |
| R17 = 99.92 | D17 = 8.82 | N10 = 1.72916 | ν10 = 54.7 |
| R18 = −78.32 | D18 = 0.20 | | |
| R19 = 111.95 | D19 = 3.93 | N11 = 1.72916 | ν11 = 54.7 |
| R20 = 1145.23 | D20 = VARIABLE | | |
| R21 = 34.31 | D21 = 0.75 | N12 = 1.88300 | ν12 = 40.8 |
| R22 = 12.66 | D22 = 3.86 | | |
| R23 = 199.89 | D23 = 0.75 | N13 = 1.88300 | ν13 = 40.8 |
| R24 = 95.18 | D24 = 2.08 | | |
| R25 = −49.87 | D25 = 4.94 | N14 = 1.80810 | ν14 = 22.8 |
| R26 = −12.03 | D26 = 0.80 | N15 = 1.88300 | ν15 = 40.8 |
| R27 = 262.19 | D27 = 0.20 | | |
| R28 = 26.38 | D28 = 2.40 | N16 = 1.53172 | ν16 = 48.8 |
| R29 = 137.75 | D29 = VARIABLE | | |

-continued

| f = 3.85~30.8  Fno = 1.9~2.0  2ω = 110.0°~20.2° | | | |
|---|---|---|---|
| R30 = −25.64 | D30 = 0.75 | N17 = 1.77250 | ν17 = 49.6 |
| R31 = 63.84 | D31 = 2.45 | N18 = 1.80518 | ν18 = 25.4 |
| R32 = −124.67 | D32 = VARIABLE | | |
| R33 = (STOP) | D33 = 1.40 | | |
| R34 = 1405.06 | D34 = 2.65 | N19 = 1.74950 | ν19 = 35.3 |
| R35 = −55.05 | D35 = 0.20 | | |
| R36 = 217.12 | D36 = 2.82 | N20 = 1.51742 | ν20 = 52.4 |
| R37 = −63.46 | D37 = 0.20 | | |
| R38 = 57.95 | D38 = 5.16 | N21 = 1.53172 | ν21 = 48.8 |
| R39 = −32.00 | D39 = 1.20 | N22 = 1.88300 | ν22 = 40.8 |
| R40 = −173.83 | D40 = 30.00 | | |
| R41 = 1388.98 | D41 = 3.31 | N23 = 1.48749 | ν23 = 70.2 |
| R42 = −42.98 | D42 = 0.15 | | |
| R43 = 86.36 | D43 = 1.20 | N24 = 1.88300 | ν24 = 40.8 |
| R44 = 18.24 | D44 = 6.60 | N25 = 1.48749 | ν25 = 70.2 |
| R45 = −73.04 | D45 = 0.16 | | |
| R46 = 26.38 | D46 = 6.71 | N26 = 1.48749 | ν26 = 70.2 |
| R47 = −27.04 | D47 = 1.20 | N27 = 1.88300 | ν27 = 40.8 |
| R48 = 41.53 | D48 = 5.70 | | |
| R49 = 57.27 | D49 = 5.53 | N28 = 1.62041 | ν28 = 60.3 |
| R50 = −28.09 | D50 = 4.00 | | |
| R51 = ∞ | D51 = 33.00 | N29 = 1.60859 | ν29 = 46.4 |
| R52 = ∞ | D52 = 13.20 | N30 = 1.51680 | ν30 = 64.2 |
| R53 = ∞ | | | |

TABLE 4

| VARIABLE DISTANCE | FOCAL LENGTH | | |
|---|---|---|---|
| | 3.85 | 6.47 | 30.80 |
| D20 | 0.92 | 15.77 | 41.13 |
| D29 | 42.23 | 25.21 | 2.90 |
| D32 | 2.00 | 4.17 | 1.11 |

| VARIABLE DISTANCE DURING FOCUSING | INFINITY | MINIMUM (0.3 m FROM TOP OF R1) |
|---|---|---|
| R8 | 0.66 | 3.38 |
| R10 | 9.14 | 6.42 |

| ASPHERICAL SURFACE R1 SURFACE REFERENCE SPHERICITY R = 104.370 | | | |
|---|---|---|---|
| ASPHERICAL SURFACE COEFFICIENT | AMOUNT OF ASPHERICITY (R1) | h | Δ |
| K = 5.310E+00 | 70% | (29.40 mm) | −0.84 mm |
| A' = −2.377E−05 | 90% | (37.80 mm) | −2.27 mm |
| B = 2.505E−06 | 100% | (42.00 mm) | −3.41 mm |
| B' = −2.331E−08 | | | |
| C = −1.674E−10 | | | |
| C' = 7.043E−12 | | | |
| D = −1.869E−13 | | | |
| D' = 2.416E−15 | | | |
| E = −3.805E−18 | | | |
| E' = 0.000E+00 | | | |
| F = 0.000E+00 | | | |

-continued

ASPHERICAL SURFACE
R10 SURFACE
REFERENCE SPHERICITY R = −65.349

| ASPHERICAL SURFACE COEFFICIENT | AMOUNT OF ASPHERICITY (R10) | h | Δ |
|---|---|---|---|
| K = −2.279E+00 | 70% | (20.42 mm) | −0.25 mm |
| A' = −2.829E+06 | 90% | (26.26 mm) | −0.72 mm |
| B = −1.544E−08 | 100% | (29.17 mm) | −1.12 mm |
| B' = −2.138E−10 | | | |
| C = 4.243E−10 | | | |
| C' = −1.045E−11 | | | |
| D = 6.344E−15 | | | |
| D' = 5.283E−15 | | | |
| E = −9.135E−17 | | | |
| E' = 0.000E+00 | | | |
| F = 0.000E+00 | | | |

NUMERICAL EXAMPLE 5 f = 4.50~58.50  Fno = 1.9~3.0  2ω = 101.4°~10.7°

| | | | |
|---|---|---|---|
| * R1 = 497.52 | D1 = 2.50 | N1 = 1.77250 | ν1 = 49.5 |
| R2 = 32.17 | D2 = 15.86 | | |
| R3 = 135.37 | D3 = 1.85 | N2 = 1.77250 | ν2 = 49.5 |
| R4 = 57.50 | D4 = 12.06 | | |
| R5 = −120.19 | D5 = 1.75 | N3 = 1.77250 | ν3 = 49.5 |
| R6 = 318.88 | D6 = 0.15 | | |
| R7 = 87.28 | D7 = 6.75 | N4 = 1.80515 | ν4 = 25.5 |
| R8 = −2477.50 | D8 = 1.50(∞) | | |
| R9 = 1284.95 | D9 = 7.05 | N5 = 1.60311 | ν5 = 60.6 |
| * R10 = −87.47 | D10 = 5.37(∞) | | |
| R11 = 242.24 | D11 = 10.44 | N6 = 1.43875 | ν6 = 95.0 |
| R12 = −54.35 | D12 = 1.65 | N7 = 1.64769 | ν7 = 33.8 |
| * R13 = −208.11 | D13 = 0.15 | | |
| R14 = 235.97 | D14 = 1.65 | N8 = 1.72047 | ν8 = 34.7 |
| R15 = 52.82 | D15 = 12.11 | N9 = 1.43875 | ν9 = 95.0 |
| R16 = −174.62 | D16 = 0.18 | | |
| R17 = 212.48 | D17 = 9.56 | N10 = 1.49700 | ν10 = 81.5 |
| R18 = −74.43 | D18 = 0.18 | | |
| R19 = 76.17 | D19 = 8.76 | N11 = 1.61800 | ν11 = 63.3 |
| R20 = −233.56 | D20 = VARIABLE | | |
| R21 = 35.96 | D21 = 0.75 | N12 = 1.88300 | ν12 = 40.8 |
| R22 = 13.77 | D22 = 3.91 | | |
| R23 = −5552.73 | D23 = 0.75 | N13 = 1.83400 | ν13 = 37.2 |
| R24 = 43.19 | D24 = 3.12 | | |
| R25 = −34.98 | D25 = 5.48 | N14 = 1.78472 | ν14 = 25.7 |
| R26 = −10.96 | D26 = 0.80 | N15 = 1.88300 | ν15 = 40.8 |
| R27 = −96.35 | D27 = 0.14 | | |
| R28 = 46.68 | D28 = 2.60 | N16 = 1.59270 | ν16 = 35.3 |
| R29 = −88.17 | D29 = VARIABLE | | |
| R30 = −28.22 | D30 = 0.75 | N17 = 1.74100 | ν17 = 52.6 |
| R31 = 47.25 | D31 = 2.30 | N18 = 1.80810 | ν18 = 22.8 |
| R32 = −274.87 | D32 = VARIABLE | | |
| R33 = (STOP) | D33 = 1.40 | | |
| R34 = 464.16 | D34 = 2.72 | N19 = 1.72000 | ν19 = 43.7 |
| R35 = −73.84 | D35 = 0.15 | | |
| R36 = 234.26 | D36 = 3.21 | N20 = 1.64000 | ν20 = 60.1 |
| R37 = −72.79 | D37 = 0.22 | | |
| R38 = 52.81 | D38 = 6.61 | N21 = 1.51633 | ν21 = 64.1 |
| R39 = −39.65 | D39 = 1.00 | N22 = 1.88300 | ν22 = 40.8 |
| R40 = −562.71 | D40 = 34.00 | | |
| R41 = 167.08 | D41 = 4.14 | N23 = 1.56732 | ν23 = 42.8 |
| R42 = −43.83 | D42 = 0.30 | | |
| R43 = −158.58 | D43 = 1.00 | N24 = 1.88300 | ν24 = 40.8 |
| R44 = 18.05 | D44 = 7.79 | N25 = 1.51633 | ν25 = 64.1 |
| R45 = −71.92 | D45 = 0.20 | | |
| R46 = 41.32 | D46 = 6.90 | N26 = 1.51633 | ν26 = 64.1 |
| R47 = −25.55 | D47 = 1.00 | N27 = 1.88300 | ν27 = 40.8 |
| R48 = 151.29 | D48 = 0.88 | | |
| R49 = 46.00 | D49 = 7.16 | N28 = 1.51633 | ν28 = 64.1 |

-continued f = 4.50~58.50  Fno = 1.9~3.0  2ω = 101.4°~10.7°

| | | | |
|---|---|---|---|
| R50 = −29.05 | D50 = 4.00 | | |
| R51 = ∞ | D51 = 33.00 | N29 = 1.60859 | ν29 = 46.4 |
| R52 = ∞ | D52 = 13.20 | N30 = 1.51680 | ν30 = 64.2 |
| R53 = ∞ | | | |

TABLE 5

| VARIABLE DISTANCE | FOCAL LENGTH | | |
|---|---|---|---|
| | 4.50 | 8.55 | 58.50 |
| D20 | 0.87 | 18.80 | 44.54 |
| D29 | 41.26 | 20.84 | 6.81 |
| D32 | 10.97 | 13.45 | 1.73 |

| VARIABLE DISTANCE DURING FOCUSING | INFINITY | MINIMUM (0.3 m FROM TOP OF R1) |
|---|---|---|
| R8 | 1.50 | 5.49 |
| R10 | 5.37 | 1.38 |

ASPHERICAL SURFACE
R1 SURFACE
REFERENCE SPHERICITY R = 154.567

| ASPHERICAL SURFACE COEFFICIENT | AMOUNT OF ASPHERICITY (R1) | h | Δ |
|---|---|---|---|
| K = 1.19E+02 | 70% | (28.90 mm) | −1.12 mm |
| A' = −1.55E−06 | 90% | (37.15 mm) | −2.72 mm |
| B = 2.30E−06 | 100% | (41.28 mm) | −3.90 mm |
| B' = −2.45E−08 | | | |
| C = −2.93E−10 | | | |
| C' = 1.01E−11 | | | |
| D = −2.84E−13 | | | |
| D' = 9.364E−15 | | | |
| E = −1.097E−16 | | | |
| E' = −1.513E−18 | | | |
| F = 2.268E−20 | | | |

ASPHERICAL SURFACE
R10 SURFACE
REFERENCE SPHERICITY R = −89.481

| ASPHERICAL SURFACE COEFFICIENT | AMOUNT OF ASPHERICITY (R10) | h | Δ |
|---|---|---|---|
| K = 2.11E+00 | 70% | (20.12 mm) | −0.05 mm |
| A' = 1.146E−07 | 90% | (25.87 mm) | −0.10 mm |
| B = 6.414E−07 | 100% | (28.74 mm) | −0.12 mm |
| B' = 1.902E−08 | | | |
| C = −5.035E−10 | | | |
| C' = −1.004E−11 | | | |
| D = 1.602E−14 | | | |
| D' = −4.975E−15 | | | |
| E = 5.781E−16 | | | |
| E' = 7.233E−18 | | | |
| F = −4.668E−19 | | | |

ASPHERICAL SURFACE
R13 SURFACE
REFERENCE SPHERICITY R = −260.409

| ASPHERICAL SURFACE COEFFICIENT | AMOUNT OF ASPHERICITY (R13) | h | Δ |
|---|---|---|---|
| K = −6.382E+00 | 70% | (18.84 mm) | −0.08 mm |
| A' = −2.480E−07 | 90% | (24.22 mm) | −0.22 mm |
| B = 6.170E−07 | 100% | (26.91 mm) | −0.35 mm |
| B' = −1.124E−08 | | | |
| C = 3.285E−10 | | | |
| C' = 1.035E−12 | | | |
| D = 3.831E−13 | | | |
| D' = −6.945E−15 | | | |
| E = −3.157E−16 | | | |
| E' = −6.892E−18 | | | |
| F = 4.069E−19 | | | |

NUMERICAL EXAMPLE 6 f = 4.30~55.90  Fno = 1.9~2.8  2ω = 104.0°~11.2°

| | | | |
|---|---|---|---|
| * R1 = 674.40 | D1 = 2.70 | N1 = 1.77250 | ν1 = 49.5 |
| R2 = 32.70 | D2 = 16.62 | | |
| R3 = 135.26 | D3 = 1.85 | N2 = 1.81600 | ν2 = 46.6 |
| R4 = 53.23 | D4 = 13.76 | | |
| R5 = −88.38 | D5 = 1.75 | N3 = 1.81600 | ν3 = 46.6 |
| R6 = −283.44 | D6 = 1.30 | | |
| R7 = 124.37 | D7 = 8.08 | N4 = 1.80518 | ν4 = 25.4 |
| R8 = −307.15 | D8 = 0.58(∞) | | |
| R9 = 1538.27 | D9 = 8.80 | N5 = 1.48749 | ν5 = 70.2 |
| * R10 = −64.23 | D10 = 7.88(∞) | | |
| R11 = 321.44 | D11 = 9.74 | N6 = 1.49700 | ν6 = 81.5 |
| R12 = −64.54 | D12 = 1.65 | N7 = 1.88300 | ν7 = 40.8 |
| R13 = −139.13 | D13 = 1.25 | | |
| R14 = 174.21 | D14 = 1.65 | N8 = 2.00330 | ν8 = 28.3 |
| R15 = 54.83 | D15 = 11.19 | N9 = 1.49700 | ν9 = 81.5 |
| R16 = −234.20 | D16 = 0.20 | | |
| R17 = 217.33 | D17 = 7.92 | N10 = 1.60311 | ν10 = 60.6 |
| * R18 = −103.02 | D18 = 0.20 | | |
| R19 = 85.96 | D19 = 7.83 | N11 = 1.59240 | ν11 = 68.3 |
| R20 = −203.02 | D20 = VARIABLE | | |
| R21 = 47.99 | D21 = 0.75 | N12 = 1.88300 | ν12 = 40.8 |
| R22 = 14.90 | D22 = 2.65 | | |
| R23 = 46.57 | D23 = 0.75 | N13 = 1.88300 | ν13 = 40.8 |
| R24 = 25.79 | D24 = 3.62 | | |
| R25 = −34.30 | D25 = 4.75 | N14 = 1.80518 | ν14 = 25.4 |
| R26 = −11.52 | D26 = 0.80 | N15 = 1.88300 | ν15 = 40.8 |
| R27 = −205.25 | D27 = 0.20 | | |
| R28 = 46.22 | D28 = 2.42 | N16 = 1.71736 | ν16 = 29.5 |
| R29 = −162.88 | D29 = VARIABLE | | |
| R30 = −29.47 | D30 = 0.75 | N17 = 1.75500 | ν17 = 52.3 |
| R31 = 43.39 | D31 = 2.17 | N18 = 1.80810 | ν18 = 22.8 |
| R32 = −545.39 | D32 = VARIABLE | | |
| R33 = (STOP) | D33 = 1.40 | | |
| R34 = 522.34 | D34 = 3.56 | N19 = 1.58913 | ν19 = 61.1 |
| R35 = −50.33 | D35 = 0.20 | | |
| R36 = 99.96 | D36 = 3.30 | N20 = 1.51742 | ν20 = 52.4 |
| R37 = −100.81 | D37 = 0.20 | | |
| R38 = 53.61 | D38 = 6.99 | N21 = 1.51823 | ν21 = 58.9 |
| R39 = −33.02 | D39 = 1.20 | N22 = 1.88300 | ν22 = 40.8 |
| R40 = −256.73 | D40 = 28.00 | | |
| R41 = 483.49 | D41 = 4.38 | N23 = 1.51742 | ν23 = 52.4 |
| R42 = −37.34 | D42 = 3.64 | | |
| R43 = 969.51 | D43 = 1.20 | N24 = 1.88300 | ν24 = 40.8 |
| R44 = 21.43 | D44 = 6.58 | N25 = 1.51823 | ν25 = 58.9 |
| R45 = −204.64 | D45 = 0.24 | | |
| R46 = 38.54 | D46 = 7.45 | N26 = 1.48749 | ν26 = 70.2 |
| R47 = −18.73 | D47 = 1.20 | N27 = 1.88300 | ν27 = 40.8 |
| R48 = −414.30 | D48 = 0.70 | | |
| R49 = 70.32 | D49 = 5.97 | N28 = 1.51633 | ν28 = 64.1 |
| R50 = −27.97 | D50 = 4.00 | | |
| R51 = ∞ | D51 = 33.00 | N29 = 1.60859 | ν29 = 46.4 |
| R52 = ∞ | D52 = 13.20 | N30 = 1.51680 | ν30 = 64.2 |
| R53 = ∞ | | | |

TABLE 6

| VARIABLE DISTANCE | FOCAL LENGTH | | |
|---|---|---|---|
| | 4.30 | 8.16 | 55.90 |
| D20 | 0.47 | 18.18 | 43.93 |
| D29 | 42.08 | 21.91 | 6.57 |
| D32 | 9.00 | 11.46 | 1.05 |

| VARIABLE DISTANCE DURING FOCUSING | INFINITY | MINIMUM (0.3 m FROM TOP OF R1) |
|---|---|---|
| R8 | 0.58 | 4.69 |
| R10 | 7.88 | 3.77 |

ASPHERICAL SURFACE
R1 SURFACE
REFERENCE SPHERICITY R = 157.076

| ASPHERICAL SURFACE COEFFICIENT | AMOUNT OF ASPHERICITY (R1) | h | Δ |
|---|---|---|---|
| K = 2.055E+02 | 70% | (30.10 mm) | −1.35 mm |
| A' = −6.652E−06 | 90% | (38.70 mm) | −3.24 mm |
| B = 2.954E−06 | 100% | (43.00 mm) | −4.63 mm |
| B' = −3.656E−08 | | | |
| C = −3.319E−10 | | | |
| C' = 7.850E−12 | | | |
| D = −2.496E−13 | | | |
| D' = 1.284E−14 | | | |
| E = −1.174E−16 | | | |
| E' = −2.292E−18 | | | |
| F = 2.355E−20 | | | |

ASPHERICAL SURFACE
R10 SURFACE
REFERENCE SPHERICITY R = −70.319

| ASPHERICAL SURFACE COEFFICIENT | AMOUNT OF ASPHERICITY (R10) | h | Δ |
|---|---|---|---|
| K = −2.054E+00 | 70% | (20.86 mm) | −0.20 mm |
| A' = 3.322E−06 | 90% | (26.82 mm) | −0.50 mm |
| B = −6.412E−08 | 100% | (29.80 mm) | −0.70 mm |
| B' = 2.331E−09 | | | |
| C = 8.889E−12 | | | |
| C' = −1.268E−11 | | | |
| D = 2.364E−13 | | | |
| D' = 5.596E−15 | | | |
| E = −4.795E−17 | | | |
| E' = −7.723E−18 | | | |
| F = 5.411E−21 | | | |

-continued

ASPHERICAL SURFACE
R18 SURFACE
REFERENCE SPHERICITY R = −101.116

| ASPHERICAL SURFACE COEFFICIENT | AMOUNT OF ASPHERICITY (R18) | h | Δ |
|---|---|---|---|
| K = 5.658E−01 | 70% | (19.20 mm) | 0.02 mm |
| A' = −3.064E−06 | 90% | (24.69 mm) | 0.06 mm |
| B = 1.010E−07 | 100% | (27.43 mm) | 0.08 mm |
| B' = −2.065E−09 | | | |
| C = −1.051E−11 | | | |
| C' = 1.022E−12 | | | |
| D = 1.435E−14 | | | |
| D' = −9.169E−16 | | | |
| E = −2.295E−17 | | | |
| E' = 6.727E−19 | | | |
| F = 1.545E−20 | | | |

Table 7 also lists, for the purpose of reference, the above-described Conditional Expressions and the corresponding values in Numerical Example 3 of U.S. Pat. No. 5,745,300. As shown in Table 7, Numerical Example 3 of U.S. Pat. No. 5,745,300 does not satisfy Conditional Expressions (7), (9), and (12) of the present invention. Accordingly, effect of correcting the positive distortion that occurs when the zoom lens is set at the zoom ratio $Z^{1/4}$ of the present invention is insufficient. It is difficult to produce a zoom lens that satisfies Conditional Expression (12) at the wide-angle end.

TABLE 7

| CONDITIONAL EXPRESSION | NUMERICAL EXAMPLES | | | | | | US PATENT NO. 5745300 NUMERICAL EXAMPLE 3 |
|---|---|---|---|---|---|---|---|
| | 1 | 2 | 3 | 4 | 5 | 6 | |
| (1) hz/htinf | 1.236 | 1.337 | 1.066 | 1.325 | 1.171 | 1.158 | 1.045 |
| (2) hw/hz | 1.058 | 1.041 | 0.913 | 1.051 | 1.035 | 1.034 | 1.000 |
| (3) htmod/htinf | 1.027 | 1.011 | 1.026 | 1.002 | 1.025 | 1.019 | 1.045 |
| (7) \|f11/f1\| | 1.058 | 0.915 | 1.28 | 1.285 | 1.172 | 1.337 | 0.797 |
| (8) f12/f1 | 4.908 | 2.764 | 4.946 | 3.99 | 5.00 | 4.857 | 2.633 |
| (12) fw/IS | 0.423 | 0.427 | 0.414 | 0.35 | 0.409 | 0.391 | 0.788 |
| (4) \|Δ10/f1\| | 0.01420 | 0.01883 | 0.00308 | 0.04840 | 0.00426 | 0.02710 | 0.00023 |
| (5) \|Δ9/f1\| | 0.00886 | 0.01227 | 0.00207 | 0.03108 | 0.00383 | 0.01919 | 0.00023 |
| (6) \|Δ7/f1\| | 0.00284 | 0.00432 | 0.00077 | 0.01085 | 0.00196 | 0.00766 | 0.00013 |
| (9) \|Δ10/f1\| | — | 0.06077 | 0.08004 | 0.14677 | 0.14390 | 0.17803 | — |
| (10) \|Δ9/f1\| | — | 0.03993 | 0.05417 | 0.09793 | 0.10025 | 0.12454 | — |
| (11) \|Δ7/f1\| | — | 0.01422 | 0.01999 | 0.03617 | 0.04129 | 0.05189 | — |

FIG. 37 is a schematic view of a relevant part of an exemplary image pickup apparatus (television camera system) that uses the zoom lens according to the embodiments as an imaging optical system. FIG. 37 shows a zoom lens 101 according to any one of the first to sixth embodiments and a camera 124. The zoom lens 101 is removable from the camera 124. An image pickup apparatus 125 includes the camera 124 and the zoom lens 101 attached to the camera 124.

The zoom lens 101 includes a first lens unit F, a zooming portion LZ, and a fourth lens unit R for forming an image. The first lens unit F includes a focusing lens unit. The zooming portion LZ includes a second lens unit V that moves along the optical axis to perform zooming, and a third lens unit C that moves along the optical axis to correct image plane variation caused by zooming.

An SP is the aperture stop. The fourth lens unit R includes a front unit 4F, a rear unit 4B, and a lens unit IE that can be inserted into or removed from the optical path.

The lens unit IE varies the focal length range of the entire zoom lens 101.

Driving mechanisms 114 and 115, such as helicoids or cams, respectively drive the lens unit F and the zooming portion LZ in the optical axis direction.

Motors (driving units) 116, 117, and 118 electrically drive the driving mechanism 114, 115, and the aperture stop SP, respectively.

Detectors 119, 120 and 121, such as encoders, potentiometers, or photo-sensors detect the positions of the first lens unit F and the zooming portion LZ on the optical axis, and the diameter of the aperture stop SP.

The camera 124 includes a glass block 109 equivalent to an optical filter or a color separation prism in the camera 124, and a solid-state image pickup element (photoelectric conversion element) 110, such as a charge-coupled device (CCD) sensor or a complementary metal oxide semiconductor (CMOS) sensor, which receives an image of an object formed by the zoom lens 101.

Central processing units (CPU) 111 and 122 control various operations of the camera 124 and the zoom lens 101.

As has been described, according to the present embodiment, it is possible to provide a zoom lens having high optical performance over the entire object distance range, and an image pickup apparatus having the zoom lens.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-205097 filed Aug. 7, 2007, which is hereby incorporated by reference herein in its entirety.

What is claimed is:

1. A zoom lens comprising, in order from an object side to an image side:
   a first lens unit that does not move for zooming and has positive refractive power;
   a second lens unit that is configured to move during zooming and has negative refractive power;
   a third lens unit that is configured to move during zooming and has negative refractive power; and
   a fourth lens unit that does not move for zooming and has positive refractive power,
   wherein the first lens unit has, in order from the object side to the image side, a first lens subunit that does not move during focusing and has negative refractive power, a second lens subunit that is configured to move along an optical axis during focusing and has positive refractive power, and a third lens subunit that does not move during focusing and has positive refractive power, wherein the second lens subunit satisfies the conditions $$0.95 < hz/htinf < 1.50,$$

$$0.83 < hw/hz < 1.16, \text{ and}$$

$$htmod/htinf > 1.0$$

and has at least one aspherical lens surface AS12, where, in lens surfaces of the second lens subunit, htinf is the maximum height of incidence of axial rays when the zoom lens is set at a telephoto end of the zooming range and focused on an object at infinity, htmod is the maximum height of incidence of the axial rays when the zoom lens is set at the telephoto end of the zooming range and focused on an object at a very short distance, hw is the maximum height of incidence of off-axis rays when the zoom lens is set at a wide-angle end and focused on an object at infinity, and hz is the maximum height of incidence of the off-axis rays when the zoom lens is set at a zoom ratio of $Z^{1/4}$ and focused on an object at infinity, where Z is the maximum zoom ratio, wherein, if the aspherical lens surface AS12 has positive refractive power, the aspherical lens surface AS12 is shaped such that the positive refractive power decreases from the center toward the periphery thereof, and wherein, if the aspherical lens surface AS12 has negative refractive power, the aspherical lens surface AS12 is shaped such that the negative refractive power increases from the center toward the periphery thereof.

2. The zoom lens according to claim 1, wherein the aspherical lens surface AS12 satisfies the following conditions:

$$0.0025 < |\Delta 10/f1| < 0.0550$$

$$0.0018 < |\Delta 9/f1| < 0.0360$$

$$0.0005 < |\Delta 7/f1| < 0.0130$$

where $\Delta 10$, $\Delta 9$, and $\Delta 7$ are the amount of asphericity at positions corresponding to 100%, 90%, and 70% of the effective diameter of the lens, respectively, and f1 is the focal length of the first lens unit.

3. The zoom lens according to claim 1, satisfying the following conditions:

$$0.8 < |f11/f1| < 1.5$$

$$2.5 < f12/f1 < 5.5$$

where f11 is the focal length of the first lens subunit, f12 is the focal length of the second lens subunit, f1 is the focal length of the first lens unit, and fw is the focal length of the entire zoom lens set at the wide-angle end.

4. The zoom lens according to claim 1,
wherein the first lens subunit has at least one aspherical lens surface AS11,
wherein, if the aspherical lens surface AS11 has positive refractive power, the aspherical lens surface AS11 is shaped such that the positive refractive power increases from the center toward the periphery thereof,
wherein, if the aspherical lens surface AS11 has negative refractive power, the aspherical lens surface AS11 is shaped such that the negative refractive power decreases from the center toward the periphery thereof, and wherein the aspherical lens surface AS11 satisfies the following conditions:

$$0.05 < |\Delta 10/f1| < 0.20$$

$$0.03 < |\Delta 9/f1| < 0.14$$

$$0.01 < |\Delta 7/f1| < 0.06$$

where $\Delta 10$, $\Delta 9$, and $\Delta 7$ are the amount of asphericity at positions corresponding to 100%, 90%, and 70% of the effective diameter of the lens, respectively, and f1 is the focal length of the first lens unit.

5. An image pickup apparatus comprising:
a zoom lens; and
an image pickup element configured to perform photoelectric conversion on an image formed by the zoom lens to provide an electrical signal,
wherein the zoom lens includes, in order from an object side to an image side, a first lens unit that does not move for zooming and has positive refractive power, a second lens unit that is configured to move during zooming and has negative refractive power, a third lens unit that is configured to move during zooming and has negative refractive power, and a fourth lens unit that does not move for zooming and has positive refractive power,
wherein the first lens unit has, in order from the object side to the image side, a first lens subunit that does not move during focusing and has negative refractive power, a second lens subunit that is configured to move along the optical axis during focusing and has positive refractive power, and a third lens subunit that does not move during focusing and has positive refractive power,
wherein the second lens subunit satisfies conditions $0.95 < hz/htinf < 1.50$, $0.83 < hw/hz < 1.16$, and $htmod/htinf > 1.0$ and has at least one aspherical lens surface AS12, where, in lens surfaces of the second lens subunit, htinf is the maximum height of incidence of axial rays when the zoom lens is set at a telephoto end of the zooming range and focused on an object at infinity, htmod is the maximum height of incidence of the axial rays when the zoom lens is set at the telephoto end of the zooming range and focused on an object at a very short distance, hw is the maximum height of incidence of off-axis rays when the zoom lens is set at a wide-angle end and focused on an object at infinity, and hz is the maximum height of incidence of the off-axis rays when the zoom lens is set at a zoom ratio of $Z^{1/4}$ and focused on an object at infinity, where Z is the maximum zoom ratio,
wherein, if the aspherical lens surface AS12 has positive refractive power, the aspherical lens surface AS12 is shaped such that the positive refractive power decreases from the center toward the periphery thereof, and
wherein, if the aspherical lens surface AS12 has negative refractive power, the aspherical lens surface AS12 is shaped such that the negative refractive power increases from the center toward the periphery thereof.

6. The image pickup apparatus according to claim 5, satisfying the following condition:

$$0.32 < fw/IS < 0.47$$

where IS is the effective diameter of the image pickup element, and fw is the focal length of the entire zoom lens set at the wide-angle end.

* * * * *